(12) United States Patent
Silbert et al.

(10) Patent No.: US 12,736,552 B2
(45) Date of Patent: Sep. 15, 2026

(54) GRIPPER APPARATUS WITH REDUCED CONTAMINATION RISK

(71) Applicant: GEN-PROBE INCORPORATED, San Diego, CA (US)

(72) Inventors: Rolf Silbert, Del Mar, CA (US); David H. Combs, Sa Diego, CA (US)

(73) Assignees: GEN-PROBE INCORPORATED, San Diego, CA (US); GRIFOLS, S.A, Barcelona (ES)

( * ) Notice: Subject to any disclaimer, the term of this patent is extended or adjusted under 35 U.S.C. 154(b) by 920 days.

(21) Appl. No.: 17/996,924

(22) PCT Filed: Apr. 22, 2021

(86) PCT No.: PCT/US2021/028721
§ 371 (c)(1),
(2) Date: Oct. 21, 2022

(87) PCT Pub. No.: WO2021/216931
PCT Pub. Date: Oct. 28, 2021

(65) Prior Publication Data

US 2023/0176084 A1 Jun. 8, 2023

Related U.S. Application Data

(60) Provisional application No. 63/014,624, filed on Apr. 23, 2020.

(51) Int. Cl.
*G01N 35/00* (2006.01)
*B25J 9/02* (2006.01)
(Continued)

(52) U.S. Cl.
CPC .......... *G01N 35/0099* (2013.01); *B25J 9/026* (2013.01); *B25J 13/086* (2013.01); *B25J 15/0033* (2013.01); *B25J 15/10* (2013.01)

(58) Field of Classification Search
CPC ..... G01N 35/0099; G01N 35/02; B25J 9/026; B25J 13/086; B25J 15/0033; B25J 15/10
See application file for complete search history.

(56) References Cited

U.S. PATENT DOCUMENTS 5,775,755 A 7/1998 Covert et al.
6,060,022 A 5/2000 Pang et al.
(Continued)

FOREIGN PATENT DOCUMENTS

CN 104407160 A 3/2015
EP 3029468 6/2016
(Continued)

OTHER PUBLICATIONS

Notice of Reasons for Rejection issued for Japanese Patent Application No. 2022-564256 on Oct. 25, 2024, 6 pages.
(Continued)

*Primary Examiner* — Stephen A Vu
(74) *Attorney, Agent, or Firm* — Rothwell, Figg, Ernst & Manbeck, P.C.; Charles B. Cappellari

(57) ABSTRACT

A gripper apparatus is configured to grasp a closed receptacle having a closure affixed to an open top end of a receptacle. Opposed jaw members capable of lateral movement between an open position, a first closed position, and a second closed position are configured to grasp the closed receptacle when the closed receptacle is situated between the jaw members at the first closed position and to release the closed receptacle at the open position. The gripper apparatus further includes a plurality of fingers configured to grasp a sidewall of the closure beneath a top surface of the closure when the closure is situated between the plurality of fingers and beneath a base of each of the jaw members as the jaw members move laterally toward each other from the open position to the second closed position.

19 Claims, 54 Drawing Sheets

(51) Int. Cl.

| | |
|---|---|
| ***B25J 13/08*** | (2006.01) |
| ***B25J 15/00*** | (2006.01) |
| ***B25J 15/10*** | (2006.01) |

(56) References Cited

U.S. PATENT DOCUMENTS

| | | | | |
|---|---|---|---|---|
| 6,332,636 | B1 | 12/2001 | Cohen et al. | |
| 7,892,504 | B2 * | 2/2011 | Taike | B01L 3/50855 422/561 |
| 8,271,138 | B2 | 9/2012 | Eliuk et al. | |
| 9,085,413 | B2 | 7/2015 | Rosmarin et al. | |
| 9,164,113 | B2 | 10/2015 | Friedman et al. | |
| 9,845,263 | B2 * | 12/2017 | Morgan | B08B 9/42 |
| 10,386,381 | B2 * | 8/2019 | Lair | B01L 9/06 |
| 10,456,925 | B2 | 10/2019 | Paavilainen et al. | |
| 10,502,751 | B2 | 12/2019 | Jaeggi | |
| D894,423 | S * | 8/2020 | Bantug | D24/227 |
| 2005/0207945 | A1 * | 9/2005 | Itoh | B01L 9/06 211/74 |
| 2012/0134769 | A1 | 5/2012 | Friedman et al. | |
| 2012/0283867 | A1 | 11/2012 | Gelbman et al. | |
| 2014/0106386 | A1 | 4/2014 | Umeno et al. | |
| 2016/0154017 | A1 | 6/2016 | Oguri et al. | |
| 2019/0126497 | A1 | 5/2019 | Onal et al. | |

FOREIGN PATENT DOCUMENTS

| | | | |
|---|---|---|---|
| EP | 2776848 | B1 | 12/2019 |
| JP | H04-235746 | A | 8/1992 |
| JP | H1-099064 | A | 4/1998 |
| JP | 05-039887 | B2 | 10/2012 |
| JP | 2013-501633 | A | 1/2013 |
| JP | 2013-512437 | A | 4/2013 |
| WO | 2014192712 | A1 | 12/2014 |
| WO | 2015198707 | A1 | 12/2015 |
| WO | 2016/170623 | A1 | 10/2016 |
| WO | 2018/153691 | A1 | 8/2018 |

OTHER PUBLICATIONS

European Examination Report dated Aug. 23, 2024 in related European Application No. 21725626.2 (9 pages).

PCT, Notification of Transmittal of the International Search Report and the Written Opinion, International application No. PCT/US2021/028721, Jul. 22, 2021.

PCT, International Preliminary Report on Patentability, International Application No. PCT/US2021/028721, Oct. 25, 2022.

CIPO Examination Report, Canadian Application No. 3,176,900, Jan. 31, 2024.

CNIPA Office Action No. 1, Chinese Application No. 202180042466.6, Jul. 24, 2025.

CNIPA Search Report No. 1, Chinese Application No. 202180042466.6, Jul. 21, 2025.

IPA Examination Report No. 1, Australian Application No. 2021260963, Jun. 13, 2025.

Examination Report issued for Canadian Patent Application No. 3,176,900 on Nov. 28, 2024, 12 pages.

Examination Report received for European Patent Application No. 21725626.2, mailed on Jun. 29, 2026, 10 pages.

* cited by examiner

10
WORK MANAGEMENT SYSTEM (WMS)
34
42
CONVEYOR CONTROLLER
ANALYZER MODULE
30b
ANALYZER MODULE
30b
SAMPLE TRANSFER MODULE
30c
DE-CAPPING MODULE
30e
32
ANALYZER MODULE
30b
CAPPING MODULE
30f
RECEPTACLE STORAGE MODULE
30d
UNLOADING MODULE
30g
RECEPTACLE CARRIER FEEDING MODULE
30h
LOADING MODULE
30a
18
44
46
46a
46b
47
48
50
52a
52b
53a
53b
62
2
2

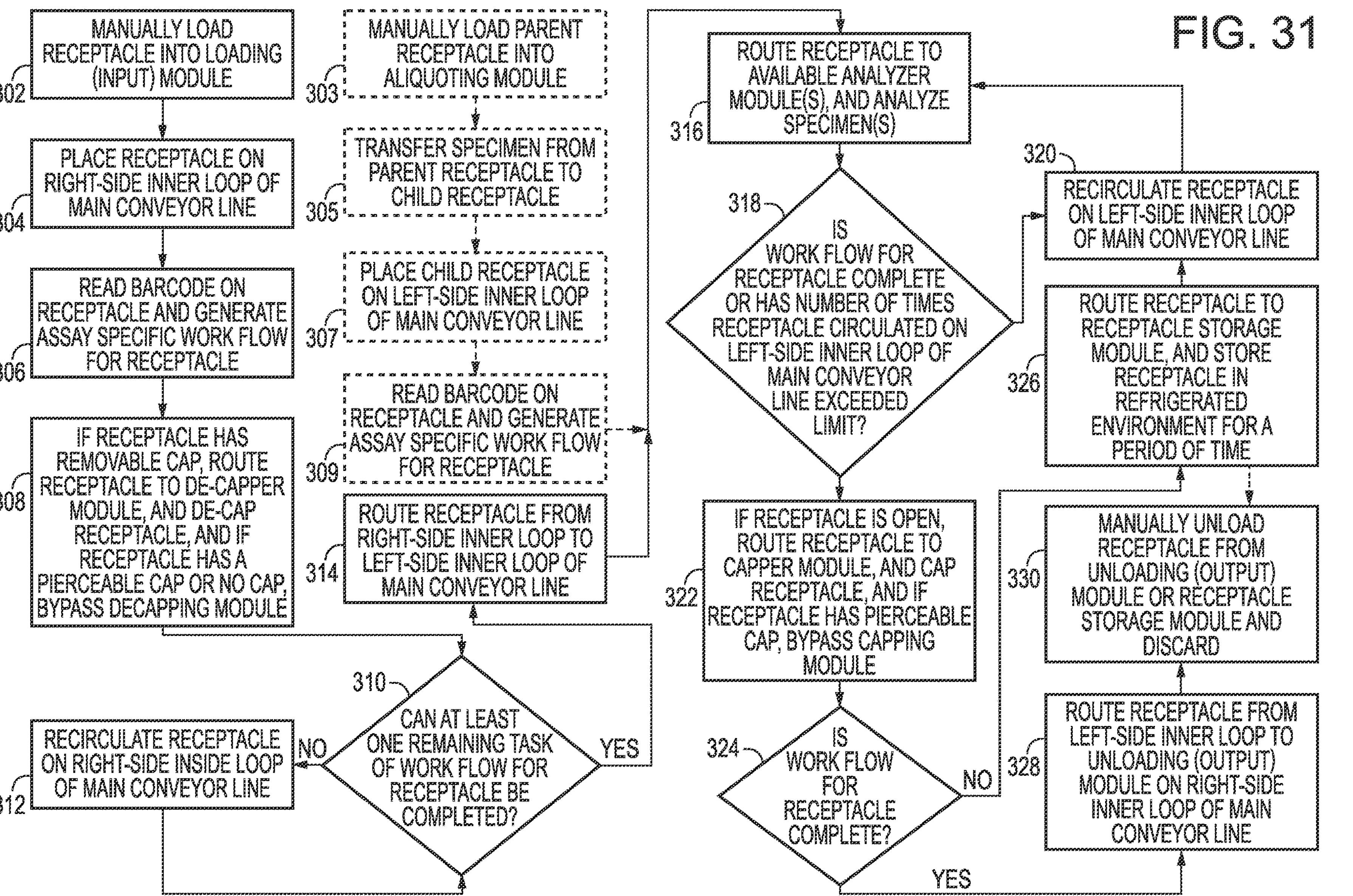

FIG. 31
MANUALLY LOAD RECEPTACLE INTO LOADING (INPUT) MODULE
302
PLACE RECEPTACLE ON RIGHT-SIDE INNER LOOP OF MAIN CONVEYOR LINE
304
READ BARCODE ON RECEPTACLE AND GENERATE ASSAY SPECIFIC WORK FLOW FOR RECEPTACLE
306
IF RECEPTACLE HAS REMOVABLE CAP, ROUTE RECEPTACLE TO DE-CAPPER MODULE, AND DE-CAP RECEPTACLE, AND IF RECEPTACLE HAS A PIERCEABLE CAP OR NO CAP, BYPASS DECAPPING MODULE
308
CAN AT LEAST ONE REMAINING TASK OF WORK FLOW FOR RECEPTACLE BE COMPLETED?
310
NO
YES
RECIRCULATE RECEPTACLE ON RIGHT-SIDE INSIDE LOOP OF MAIN CONVEYOR LINE
312
MANUALLY LOAD PARENT RECEPTACLE INTO ALIQUOTING MODULE
303
TRANSFER SPECIMEN FROM PARENT RECEPTACLE TO CHILD RECEPTACLE
305
PLACE CHILD RECEPTACLE ON LEFT-SIDE INNER LOOP OF MAIN CONVEYOR LINE
307
READ BARCODE ON RECEPTACLE AND GENERATE ASSAY SPECIFIC WORK FLOW FOR RECEPTACLE
309
ROUTE RECEPTACLE FROM RIGHT-SIDE INNER LOOP TO LEFT-SIDE INNER LOOP OF MAIN CONVEYOR LINE
314
ROUTE RECEPTACLE TO AVAILABLE ANALYZER MODULE(S), AND ANALYZE SPECIMEN(S)
316
IS WORK FLOW FOR RECEPTACLE COMPLETE OR HAS NUMBER OF TIMES RECEPTACLE CIRCULATED ON LEFT-SIDE INNER LOOP OF MAIN CONVEYOR LINE EXCEEDED LIMIT?
318
IF RECEPTACLE IS OPEN, ROUTE RECEPTACLE TO CAPPER MODULE, AND CAP RECEPTACLE, AND IF RECEPTACLE HAS PIERCEABLE CAP, BYPASS CAPPING MODULE
322
IS WORK FLOW FOR RECEPTACLE COMPLETE?
324
NO
YES
RECIRCULATE RECEPTACLE ON LEFT-SIDE INNER LOOP OF MAIN CONVEYOR LINE
320
ROUTE RECEPTACLE TO RECEPTACLE STORAGE MODULE, AND STORE RECEPTACLE IN REFRIGERATED ENVIRONMENT FOR A PERIOD OF TIME
326
MANUALLY UNLOAD RECEPTACLE FROM UNLOADING (OUTPUT) MODULE OR RECEPTACLE STORAGE MODULE AND DISCARD
330
ROUTE RECEPTACLE FROM LEFT-SIDE INNER LOOP TO UNLOADING (OUTPUT) MODULE ON RIGHT-SIDE INNER LOOP OF MAIN CONVEYOR LINE
328

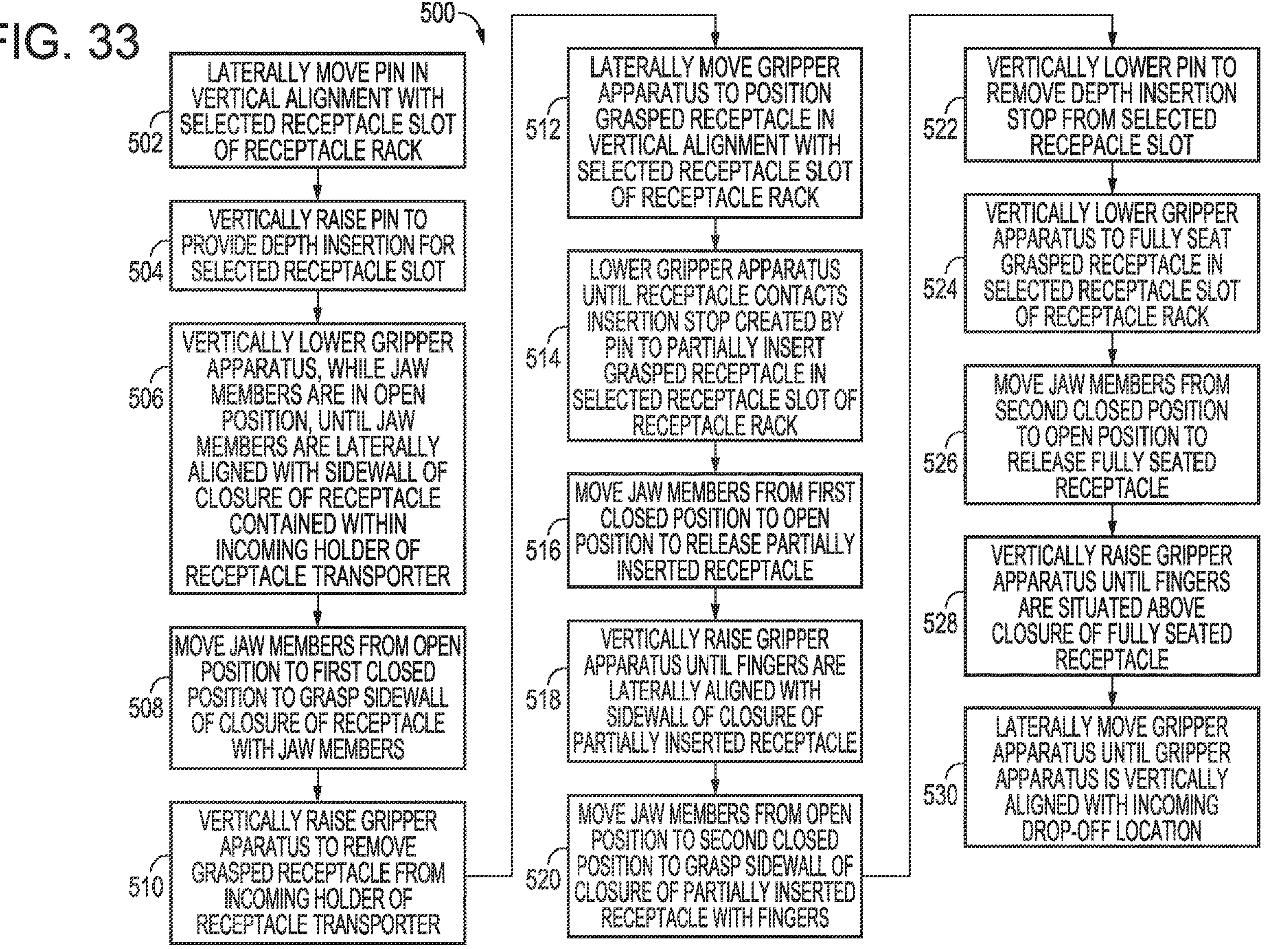
FIG. 33
500
502 LATERALLY MOVE PIN IN VERTICAL ALIGNMENT WITH SELECTED RECEPTACLE SLOT OF RECEPTACLE RACK
504 VERTICALLY RAISE PIN TO PROVIDE DEPTH INSERTION FOR SELECTED RECEPTACLE SLOT
506 VERTICALLY LOWER GRIPPER APPARATUS, WHILE JAW MEMBERS ARE IN OPEN POSITION, UNTIL JAW MEMBERS ARE LATERALLY ALIGNED WITH SIDEWALL OF CLOSURE OF RECEPTACLE CONTAINED WITHIN INCOMING HOLDER OF RECEPTACLE TRANSPORTER
508 MOVE JAW MEMBERS FROM OPEN POSITION TO FIRST CLOSED POSITION TO GRASP SIDEWALL OF CLOSURE OF RECEPTACLE WITH JAW MEMBERS
510 VERTICALLY RAISE GRIPPER APPARATUS TO REMOVE GRASPED RECEPTACLE FROM INCOMING HOLDER OF RECEPTACLE TRANSPORTER
512 LATERALLY MOVE GRIPPER APPARATUS TO POSITION GRASPED RECEPTACLE IN VERTICAL ALIGNMENT WITH SELECTED RECEPTACLE SLOT OF RECEPTACLE RACK
514 LOWER GRIPPER APPARATUS UNTIL RECEPTACLE CONTACTS INSERTION STOP CREATED BY PIN TO PARTIALLY INSERT GRASPED RECEPTACLE IN SELECTED RECEPTACLE SLOT OF RECEPTACLE RACK
516 MOVE JAW MEMBERS FROM FIRST CLOSED POSITION TO OPEN POSITION TO RELEASE PARTIALLY INSERTED RECEPTACLE
518 VERTICALLY RAISE GRIPPER APPARATUS UNTIL FINGERS ARE LATERALLY ALIGNED WITH SIDEWALL OF CLOSURE OF PARTIALLY INSERTED RECEPTACLE
520 MOVE JAW MEMBERS FROM OPEN POSITION TO SECOND CLOSED POSITION TO GRASP SIDEWALL OF CLOSURE OF PARTIALLY INSERTED RECEPTACLE WITH FINGERS
522 VERTICALLY LOWER PIN TO REMOVE DEPTH INSERTION STOP FROM SELECTED RECEPACLE SLOT
524 VERTICALLY LOWER GRIPPER APPARATUS TO FULLY SEAT GRASPED RECEPTACLE IN SELECTED RECEPTACLE SLOT OF RECEPTACLE RACK
526 MOVE JAW MEMBERS FROM SECOND CLOSED POSITION TO OPEN POSITION TO RELEASE FULLY SEATED RECEPTACLE
528 VERTICALLY RAISE GRIPPER APPARATUS UNTIL FINGERS ARE SITUATED ABOVE CLOSURE OF FULLY SEATED RECEPTACLE
530 LATERALLY MOVE GRIPPER APPARATUS UNTIL GRIPPER APPARATUS IS VERTICALLY ALIGNED WITH INCOMING DROP-OFF LOCATION

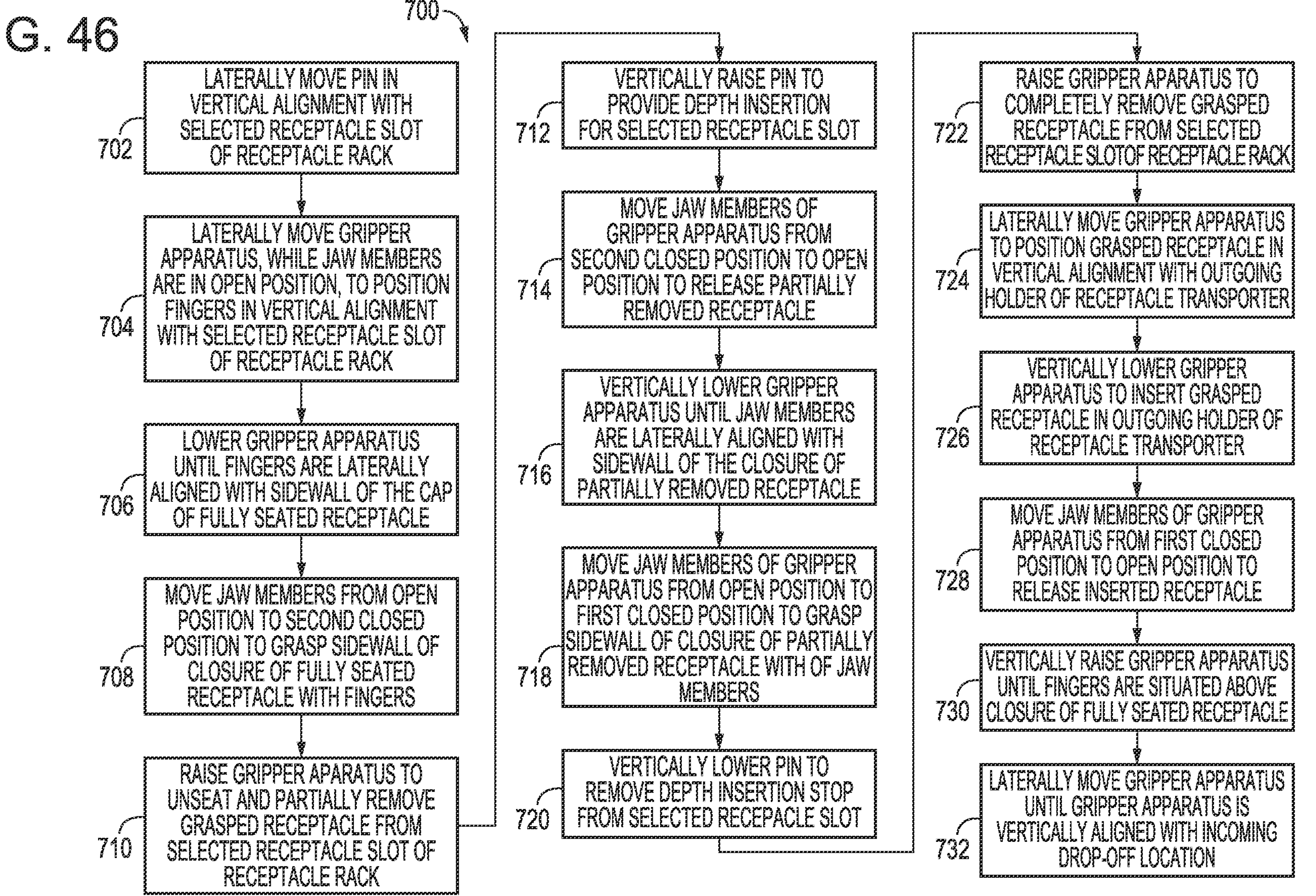
FIG. 46
700
LATERALLY MOVE PIN IN VERTICAL ALIGNMENT WITH SELECTED RECEPTACLE SLOT OF RECEPTACLE RACK
702
LATERALLY MOVE GRIPPER APPARATUS, WHILE JAW MEMBERS ARE IN OPEN POSITION, TO POSITION FINGERS IN VERTICAL ALIGNMENT WITH SELECTED RECEPTACLE SLOT OF RECEPTACLE RACK
704
LOWER GRIPPER APPARATUS UNTIL FINGERS ARE LATERALLY ALIGNED WITH SIDEWALL OF THE CAP OF FULLY SEATED RECEPTACLE
706
MOVE JAW MEMBERS FROM OPEN POSITION TO SECOND CLOSED POSITION TO GRASP SIDEWALL OF CLOSURE OF FULLY SEATED RECEPTACLE WITH FINGERS
708
RAISE GRIPPER APPARATUS TO UNSEAT AND PARTIALLY REMOVE GRASPED RECEPTACLE FROM SELECTED RECEPTACLE SLOT OF RECEPTACLE RACK
710
VERTICALLY RAISE PIN TO PROVIDE DEPTH INSERTION FOR SELECTED RECEPTACLE SLOT
712
MOVE JAW MEMBERS OF GRIPPER APPARATUS FROM SECOND CLOSED POSITION TO OPEN POSITION TO RELEASE PARTIALLY REMOVED RECEPTACLE
714
VERTICALLY LOWER GRIPPER APPARATUS UNTIL JAW MEMBERS ARE LATERALLY ALIGNED WITH SIDEWALL OF THE CLOSURE OF PARTIALLY REMOVED RECEPTACLE
716
MOVE JAW MEMBERS OF GRIPPER APPARATUS FROM OPEN POSITION TO FIRST CLOSED POSITION TO GRASP SIDEWALL OF CLOSURE OF PARTIALLY REMOVED RECEPTACLE WITH OF JAW MEMBERS
718
VERTICALLY LOWER PIN TO REMOVE DEPTH INSERTION STOP FROM SELECTED RECEPACLE SLOT
720
RAISE GRIPPER APPARATUS TO COMPLETELY REMOVE GRASPED RECEPTACLE FROM SELECTED RECEPTACLE SLOTOF RECEPTACLE RACK
722
LATERALLY MOVE GRIPPER APPARATUS TO POSITION GRASPED RECEPTACLE IN VERTICAL ALIGNMENT WITH OUTGOING HOLDER OF RECEPTACLE TRANSPORTER
724
VERTICALLY LOWER GRIPPER APPARATUS TO INSERT GRASPED RECEPTACLE IN OUTGOING HOLDER OF RECEPTACLE TRANSPORTER
726
MOVE JAW MEMBERS OF GRIPPER APPARATUS FROM FIRST CLOSED POSITION TO OPEN POSITION TO RELEASE INSERTED RECEPTACLE
728
VERTICALLY RAISE GRIPPER APPARATUS UNTIL FINGERS ARE SITUATED ABOVE CLOSURE OF FULLY SEATED RECEPTACLE
730
LATERALLY MOVE GRIPPER APPARATUS UNTIL GRIPPER APPARATUS IS VERTICALLY ALIGNED WITH INCOMING DROP-OFF LOCATION
732

176'
200a'
200b'
206'
206'
212'
212'
213a'
213a'
213b'
213b'
213c'
213c'
214a'
214b'
214c'
214d'
12
16
22

176'
200a'
200b'
219'
212'
213a'
213b'
213c'
214a'
214b'
214c'
214d'
206'
12
16
22

GRIPPER APPARATUS WITH REDUCED CONTAMINATION RISK

CROSS REFERENCE OF RELATED APPLICATION

This application is a National Stage of International Application No. PCT/US2021/028721, filed Apr. 22, 2021, which claims the benefit of U.S. Provisional Application No. 63/014,624, filed Apr. 23, 2020, the respective disclosures of which are incorporated herein by reference.

TECHNICAL FIELD

The present disclosure relates to a gripper apparatus for use in an automated system for transferring specimen-containing receptacles within an automated specimen processing system.

BACKGROUND

Clinical laboratories are set up to analyze and/or detect various components of a large number of different specimen types, such as whole blood, blood serum, blood plasma, interstitial fluid, phlegm, urine, fecal matter, semen, mucus, pus, tissue, etc. These laboratories can be equipped with automated specimen processing systems that transport specimen-containing receptacles (e.g., test tubes) between various modules for preparing and processing a specimen (e.g., loading/unloading modules, cappers/de-cappers, centrifuges, analyzers, storage modules, etc.). Such automated systems may include a conveyor or track system for transporting the specimen-containing receptacles via carriers (e.g., pucks) between the various modules, and robotic handlers may be included for grasping and moving the specimen-containing receptacles. Pick-and-place devices may be used, for example, to insert the specimen-containing receptacles into the carriers, remove the specimen-containing receptacles from the carriers and deliver them to the modules, and, in some cases, transport the specimen-containing receptacles within the modules.

Specimen storage units may be utilized to store closed specimen-containing receptacles for a predetermined period of time (e.g., five days) in a refrigerated environment to allow for subsequent analysis, such as repeat testing if the original results are inconclusive or performing a new test based on the results of the original test (e.g., reflex test or testing for a different analyte). To maximize the number of receptacles that can be stored, a sample storage unit may include several tightly-spaced, vertically arranged, storage levels (each level being defined by a least one shelf or one or more pairs of support rails), where each storage level is capable of supporting one or more racks, and each rack is capable of holding multiple receptacles. In general, the receptacles must be seated in the racks to avoid interference with a robotic handler used to insert and remove receptacles from the racks. In some applications, headspace constraints require that laterally expending jaw members of a robotic handler within the specimen storage unit grip the sides of a cap (e.g., screw-cap or stopper) associated with a specimen-containing receptacle. While grasped by the jaw members, a closed specimen-containing receptacle can be inserted into a respective receptacle-receiving slot of a receptacle rack.

Typically, there is an insertion force associated with a receptacle-receiving slot that must be overcome when inserting the closed specimen-containing receptacle into the receptacle-receiving slot. For example, the receptacle-receiving slot may have retention springs for stabilizing the closed specimen-containing receptacle when inserted therein. As another example, the tolerance between the receptacle-receiving slot and the closed specimen-containing receptacle may be relatively tight, such that the closed specimen-containing receptacle can be stabilized within the receptacle-receiving slot without the use of the separate mechanisms, such as retention springs. Although, under optimal conditions, there might not be insertion forces associated with these tightly toleranced receptacle-receiving slots, there may be cases where barcode labels on closed specimen-containing receptacles may delaminate (creating a “flagging” condition), whereby insertion forces will be associated with the receptacle-receiving slots due to these flagged barcode labels. Thus, a properly designed robotic handler must be able to overcome an insertion force associated a receptacle-receiving slot so that a closed specimen-containing receptacle can be properly seated within a corresponding respective receptacle-receiving slot.

When a closed specimen-containing receptacle is grasped by the jaw members, the jaw members may be incapable of descending beyond the tops of neighboring specimen-containing receptacles seated in the receptacle rack. Thus, a seating device must be used to push down on a top surface of the cap of each specimen-containing receptacle with sufficient force to overcome the anticipated insertion forces associated with the receptacle-receiving slot, so that the specimen-containing receptacles can be seated within the receptacle-receiving slot. In one exemplary technique, the jaw members may be opened to release a partially inserted specimen-containing receptacle, moved vertically upward to a position immediately above the cap of the specimen-containing receptacle, closed to create an integrated abutting unit, and then moved vertically downward to push on a top surface of the cap, thereby seating the specimen-containing receptacle in the respective receptacle-receiving slot against the anticipated insertion force associated with the receptacle-receiving slot. Alternatively, a separate seating member may be used to push down on the top surface of the specimen-containing receptacle after the specimen-containing receptacle has been released by the jaw members.

This approach is appropriate when the specimen-containing receptacles have fresh caps or the caps are removed from the specimen-containing receptacles prior to extracting (e.g., pipetting) a specimen for testing. However, in instances where the caps are designed to be pierced during sample extraction, contact between the jaw members and the top surfaces of the caps could be a source of cross-contamination, especially if further testing is to be performed.

Examples of receptacles with pierceable caps are the Aptima® Specimen Collection Kits (Hiologic, Inc.). This is particularly an issue where the test to be performed involves nucleic acid amplification, because the amplification of a single nucleic acid can result in millions of copies of the nucleic acid.

Thus, after specimen extraction, it is important to avoid contacting the top surfaces of pierceable caps while associated specimen-containing receptacles are being transported within an automated specimen processing system. Avoiding contact can be particularly challenging when inserting closed specimen-containing receptacles into a receptacle rack supported by a specimen storage unit, which may require applying a downward force on closed specimen-containing receptacles (conventionally by pushing down on the top surfaces of the closed specimen-containing receptacles) sufficient to overcome the insertion forces of the receptacle-receiving slots in order to seat the closed specimen-containing receptacles within the receptacle racks.

Thus, there remains a need to seat specimen-containing receptacles closed with pierceable closures (e.g., pierceable caps) within a specimen storage unit of an automated specimen processing system without contacting the top surfaces of the closed specimen-receiving receptacles.

SUMMARY

One embodiment of a gripper apparatus is configured to grasp a closed receptacle having a closure affixed to an open top end of a receptacle. The gripper apparatus includes opposed jaw members capable of lateral movement between an open position, a first closed position, and a second closed position. The jaw members are configured to grasp the closed receptacle (e.g., the sidewall of the closure) when the closed receptacle is situated between the jaw members at the first closed position, and further configured to release the closed receptacle at the open position. Each of the jaw members may have a contoured engagement face for grasping the sidewall of the closure, in which case, the closure and the receptacle may each have a cylindrical shape. The contoured engagement face of each of the jaw members may include a plurality of laterally oriented grooves, where each adjacent pair of grooves forms a lateral edge. The contoured engagement face of each of the jaw members may be a rounded recess. In one embodiment, the contoured engagement face of each of the jaw members is a generally V-shaped recess. Whatever their shape, the contoured engagement faces of the jaw members may be mirror images of each other. The jaw members may be capable of contacting each other in the absence of the closed receptacle being situated between the jaw members, and the contoured engagement faces may define an opening when the jaw members are in contact with each other. The jaw members may not contact each other when the closed receptacle is situated between the jaw members and the jaw members are at the first closed position.

The gripper apparatus of this embodiment further includes a plurality of fingers. Each of the jaw members has at least one of the plurality of fingers depending from a base thereof. For example, each of the jaw members may have two or more of the plurality of fingers depending from the base thereof. In one embodiment, each of the jaw members has only two fingers depending from the base thereof. The plurality of fingers are configured to grasp the sidewall of the closure at the second closed position beneath a top surface of the closure when the closure is situated (i) between the plurality of fingers and (ii) beneath the base of each of the jaw members as the jaw members move laterally toward each other from the open position. The plurality of fingers may have a grasping force greater than one pound, and preferably at least five pounds. In another embodiment, the plurality of fingers are configured to be in contact or near contact with the receptacle when the jaw members grasp the sidewall of the closure at the first closed position. In this embodiment, each of the plurality of fingers may be within about 0.25 mm of the receptacle when the receptacle is centered between the plurality of fingers.

Each of the fingers may include an inner surface having a contact face (which may be serrated) configured to engage the sidewall of the closure when the closure is situated (i) beneath the base of each of the jaw members and (ii) between the plurality of fingers at the second closed position. The contact face of each of the fingers may be oriented toward an axial center of the closure when the sidewall of the closure is grasped by the plurality of fingers at the second closed position. The inner surface of each of the fingers may include a recess situated adjacent to and above the contact face. The recess may be configured so that there is no contact between the recess and the closure at the second closed position. An upper region of the inner surface of each of the plurality of fingers may slope inward from the recess toward the base of one of the jaw members, such that when the sidewall of the closure is grasped by the plurality of fingers at the second closed position, at least a portion of the upper region of the inner surface is situated directly above the top surface of the closure. Each of the plurality of fingers may include an outer surface having a generally vertical upper region and a tapered lower region.

Another embodiment of a gripper apparatus is configured to grasp a closed receptacle. The gripper apparatus includes a pair of opposed, translatable support members, and a plurality of fingers depending from the support members. Each of the support members has at least one of the plurality of fingers depending therefrom. In one embodiment, each of the support members has only two fingers depending therefrom. Each of the plurality of fingers includes an inner surface having a generally vertical lower region (which may be serrated) and a recess situated between the generally vertical lower region and the corresponding support member. Each finger may include an upper region (which may be inwardly sloping) situated between each recess and the corresponding support member. Each of the plurality of fingers may include an outer surface having a generally vertical upper region and a tapered lower region. The plurality of fingers may be configured so that the vertical lower region of the inner surface of each of the plurality of fingers contacts a cylindrical surface of an object grasped by the plurality of fingers. The plurality of fingers may have a grasping force greater than one pound, and preferably at least five pounds.

Another embodiment of a gripper apparatus may include a proximity sensor situated above the jaw members for detecting a position of the closed receptacle with respect to the jaw members.

An embodiment of a closed receptacle grasped by the gripper apparatus described above includes a receptacle and a closure affixed to an open top end of the receptacle, and the closure is grasped between the plurality of fingers with the lower region of the inner surface of each finger contacting a sidewall of the closure beneath a top surface of the closure. In another embodiment, the top surface of the closure is piercable, may, in some embodiments, be pierced.

A method of grasping a closed receptacle with the gripper apparatus described above is presented. The closed receptacle includes a receptacle and a closure affixed to an open top end of the receptacle. In some embodiments, the method includes the steps of positioning the support members so that the lower region of the inner surface of each finger is aligned with a sidewall of the closure and translating the support members toward each other to grasp the closure between the plurality of fingers with the lower region of the inner surface of each finger contacting the sidewall of the closure beneath a top surface of the closure.

One embodiment of a robotic handler includes any of the gripper apparatuses described above and a gantry operatively supporting the gripper apparatus and configured to provide the gripper apparatus with XYZ movement.

One embodiment of a receptacle storage module includes a housing defining a chamber (which may be refrigerated) and a plurality of vertically spaced levels (e.g., shelves) contained within the chamber. Each of the levels is configured to support one or more receptacle racks. The receptacle storage module further includes a plurality of the robotic handlers, where each of the robotic handlers being one of the robotic handlers described above, and where each of the robotic handlers is operatively associated with one of the levels. A front of the housing may include one or more pairs of doors for accessing the levels. A back of the housing may include one or more openings configured to receive a receptacle therethrough.

The receptacle storage module may further include a pick-and-place device associated with each of the one or more openings for grasping the receptacle and transporting the receptacle through the respective opening and into the housing. The receptacle storage module may further include a receptacle transporter associated with at least one of the openings. The receptacle transporter may be configured to receive a single receptacle from the respective pick-and-place device and to transport the receptacle to multiple, different pick-up locations. Each of the pick-up locations may be associated with one of the plurality of levels of the receptacle storage module. The receptacle may be accessible by an associated one of the plurality of robotic handlers at each of the pick-up locations. At least one of the levels may support a receptacle rack holding a plurality of receptacles in linear rows.

One embodiment of an automated specimen processing system includes the receptacle storage module described above, an analyzer for analyzing a specimen contained within a receptacle, and a conveyor for transporting the receptacle between the analyzer and the receptacle storage module on a carrier for supporting the receptacle in an upright orientation. A magnetic attraction between the carrier and the conveyor may be used to propel the carrier. The automated specimen processing system may further include a capping module for closing a top end of the receptacle with a closure after a specimen contained in the receptacle has been processed in the analyzer. The capping module may be situated along the conveyor and between the analyzer and the receptacle storage module. The automated specimen processing system may further include a de-capping module for removing a closure from the receptacle prior to processing the specimen in the analyzer. The de-capping module may be situated along the conveyor before the analyzer. The automated specimen processing system may further include a stop feature configured to maintain the carrier in a stationary position on the conveyor at a location adjacent the receptacle storage module.

One method of transferring a closed receptacle from a pickup location to a receptacle rack contained within a housing of a receptacle storage module using a robotic handler described above includes, at the pickup location moving the jaw members of the gripper apparatus from the open position to the first closed position to grasp the closed receptacle, where the closed receptacle is supported by a receptacle holder (which may be a component of a receptacle transporter) at the pickup location. The method further includes, while the jaw members are in the first closed position, (i) removing the receptacle from the receptacle holder, (ii) positioning the receptacle in vertical alignment with a receptacle slot formed in a receptacle rack contained within the receptacle storage module, where the receptacle slot is configured to receive and support the closed receptacle in an upright orientation, and (iii) partially inserting the closed receptacle into the receptacle slot.

The method further includes (i) moving the jaw members from the first closed position to the open position, (ii) raising the jaw members until the plurality of fingers are laterally aligned with a sidewall of a closure of the closed receptacle, (iii) moving the jaw members from the open position to the second closed position until the plurality of fingers engage the sidewall of the closure, and, while the jaw members are in the second closed position, (iv) lowering the gripper apparatus until the closed receptacle is seated in the receptacle slot. Each of the plurality of fingers may grasp the sidewall of the closure at a position beneath a rim of the closure, such that there is no contact between any of the plurality of the fingers and the top surface of the closure during the method.

The method may further include (i) providing a depth insertion stop to the receptacle slot, where the depth insertion stop supports the partially inserted receptacle within the receptacle slot when the jaw members have been moved from the first closed position to the open position, (ii) removing the depth insertion stop from the receptacle slot after moving the jaw members from the open position to the second closed position, and, while the jaw members are in the second closed position, (iii) lowering the gripper apparatus until the closed receptacle is seated in the receptacle slot of the receptacle rack.

The method may further include, after seating the closed receptacle in the receptacle slot of the receptacle rack, (i) moving the jaw members to the open position, (ii) raising the jaw members until the plurality of fingers are situated above the closed receptacle, and (iii) moving the gripper apparatus to the pick-up location. The receptacle rack may include multiple rows of receptacle slots for receiving receptacles. In this case, as the gripper apparatus is being lowered to seat the closed receptacle in the receptacle slot, the fingers may be configured such that each finger is situated between a pair of neighboring receptacles when the closed receptacle is seated in the receptacle slot. The method may further include transporting the closed receptacle, such as by a pick-and-place device, from a receptacle carrier positioned on a conveyor situated outside of the receptacle storage module to the receptacle holder, which may be at a drop-off location situated outside of the housing of the receptacle storage module. The receptacle holder may be a component of a receptacle transporter, which may be moved within the receptacle storage module, such that the closed receptacle is transported from the drop-off location to the pick-tip location.

The method may further include conveying the closed receptacle from an analyzer to the receptacle storage module on a track connecting the analyzer and the receptacle storage module. The closed receptacle may be supported in an upright orientation by a receptacle carrier during the conveying step. The method may further include, in the analyzer, piercing the closure with a pipettor and removing a specimen from the closed receptacle with the pipettor.

A method for seating a closed receptacle in a receptacle slot with the gripper apparatus described above includes grasping the closure of the closed receptacle between the jaw members, with the jaw members in the first closed, extending an insertion stop pin partially into the receptacle slot from a bottom end of the receptacle slot, lowering the jaw members and the closed receptacle grasped thereby relative to the receptacle slot until the closed receptacle is partially inserted into the receptacle slot with a bottom end of the closed receptacle situated within the receptacle slot above the bottom end of the receptacle slot, moving the jaw members from the first closed position to the open position to release the closed receptacle with the closed receptacle being retained in a partially inserted position within the receptacle slot by the insertion stop pin, raising the jaw members with respect to the partially inserted closed receptacle until the plurality of fingers are laterally aligned with the sidewall of the closure of the closed receptacle, moving the jaw members from the open position to the second closed position to grasp the closure of the closed receptacle between the fingers, withdrawing the insertion stop pin from the receptacle slot, lowering the jaw members and the closed receptacle grasped by the plurality of fingers relative to the receptacle slot until the closed receptacle is fully inserted into the receptacle slot with the bottom end of the closed receptacle situated at the bottom end of the receptacle slot, moving the jaw members from the second closed position to the open position to release the closed receptacle; and raising the jaw members and the plurality of fingers relative to receptacle slot and the closed receptacle seated therein until the jaw members and the plurality of fingers are above the top surface of the closure.

A method for removing a closed receptacle from a receptacle slot with the gripper apparatus described above includes grasping the closure of the closed receptacle between the plurality of fingers, with the jaw members in the second closed position, wherein a bottom end of the closed receptacle is situated at a bottom end of the receptacle slot, and the closure of the closed receptacle is situated at least partially above the receptacle slot, raising the jaw members and the closed receptacle grasped by the plurality of fingers relative to the receptacle slot until the closed receptacle is partially removed from the receptacle slot with the bottom end of the closed receptacle situated within the receptacle slot above the bottom end of the receptacle slot, extending an insertion stop pin partially into the receptacle slot from the bottom end of the receptacle slot, moving the jaw members from the second closed position to the open position to release the closed receptacle with the closed receptacle being retained in a partially removed position within the receptacle slot by the insertion stop pin, lowering the jaw members with respect to the partially removed closed receptacle until the jaw members are laterally aligned with the sidewall of the closure of the closed receptacle, moving the jaw members from the open position to the first closed position to grasp the closure of the closed receptacle between the jaw members, and raising the jaw members and the closed receptacle grasped thereby relative to the receptacle slot until the bottom end the closed receptacle is above the receptacle slot.

DESCRIPTION OF THE DRAWINGS

The accompanying drawings, which are incorporated herein and form part of the specification, illustrate various, non-limiting embodiments of the present disclosure. Where appropriate, reference numerals illustrating like structures, components, materials and/or elements in different drawings are labeled similarly. It should be understood that various combinations of the structures, components, and/or elements, other than those specifically shown in these drawings, are contemplated and are within the scope of the present disclosure.

For simplicity and clarity of illustration, the drawings depict the general structure and/or manner of construction of the described embodiments, as well as associated methods of manufacture. Well-known features (e.g., fasteners, electrical connections, control systems, etc.) are not shown in these drawings (and are not described in the corresponding description for brevity) to avoid obscuring other features, since these features are well known to those of ordinary skill in the art. The features in the drawings are not necessarily drawn to scale. The dimensions of some features may be exaggerated relative to other features to improve understanding of the exemplary embodiments. Cross-sectional views are simplifications provided to help illustrate the relative positioning of various features. One skilled in the art would appreciate that the cross-sectional views are not drawn to scale and should not be viewed as representing proportional relationships between different features. It should be noted that, even if it is not specifically mentioned, aspects and features described with reference to one embodiment may also be applicable to, and may be used with, other embodiments.

FIG. 10 is an internal view of the receptacle storage module of FIG. 7, particularly showing a portion of the receptacle rack of FIG. 9 and a portion of a gantry of the robotic handler of FIG. 9.

FIG. 19 is a perspective view illustrating receptacle racks used in the receptacle storage module of FIG. 7.

FIG. 24A is a perspective view of the gripper apparatus of FIG. 21, particularly showing the jaw members grasping the cap of a receptacle in a first closed position.

FIG. 24B is a top view of the gripper apparatus of FIG. 21, particularly showing the jaw members grasping the cap of the receptacle in the first closed position.

FIG. 30A is a top view of the fingers of the gripper apparatus of FIG. 21 positioned within interstitial spaces between receptacles seated in the receptacle rack when the jaw members are in the open position.

FIG. 30B is a top view of the fingers of the gripper apparatus of FIG. 21 positioned within interstitial spaces between receptacles seated in the receptacle rack when the jaw members are in the second closed position.

FIG. 31 is a flow diagram of one exemplary method of operating the specimen processing system of FIG. 1 to process and store a receptacle.

FIG. 33 is a flow diagram of one exemplary method of transporting a receptacle from a pick-up location in the chamber of the receptacle storage module of FIG. 7 and seating the receptacle in a receptacle slot of a receptacle rack of the receptacle storage module of FIG. 7.

FIG. 34 is a perspective view of the gripper apparatus of FIG. 21, particularly showing the jaw members in the open position and the cap of a receptacle between the jaw members while being held by the receptacle transporter of FIG. 18.

FIG. 35 is a perspective view of the gripper apparatus of FIG. 21, particularly showing the jaw members grasping the cap of the receptacle in the first closed position.

FIG. 36 is a perspective view of the gripper apparatus of FIG. 21, particularly showing the gripper apparatus with the grasped receptacle above the receptacle transporter.

FIG. 38 is a perspective view of the gripper apparatus of FIG. 21, particularly showing the gripper apparatus with the grasped receptacle partially inserted within the selected receptacle slot of the receptacle rack.

FIG. 39 is a perspective view of the gripper apparatus of FIG. 21, particularly showing the jaw members in the open position and the cap of the receptacle between the jaw members while partially inserted within the selected receptacle slot of the receptacle rack.

FIG. 42 is a perspective view of gripper apparatus of FIG. 21, particularly showing the gripper apparatus with the grasped receptacle seated within the selected receptacle slot of the receptacle rack.

FIG. 43 is a perspective view of gripper apparatus of FIG. 21, particularly showing the jaw members in the open position and the cap of the receptacle between the jaw members while seated within the selected receptacle slot of the receptacle rack.

FIG. 46 is a flow diagram of one exemplary method of transporting a seated receptacle from a receptacle slot of a receptacle rack of the receptacle storage module of FIG. 9 to a drop-off location in the chamber of the receptacle storage module.

DETAILED DESCRIPTION

Figure 1:
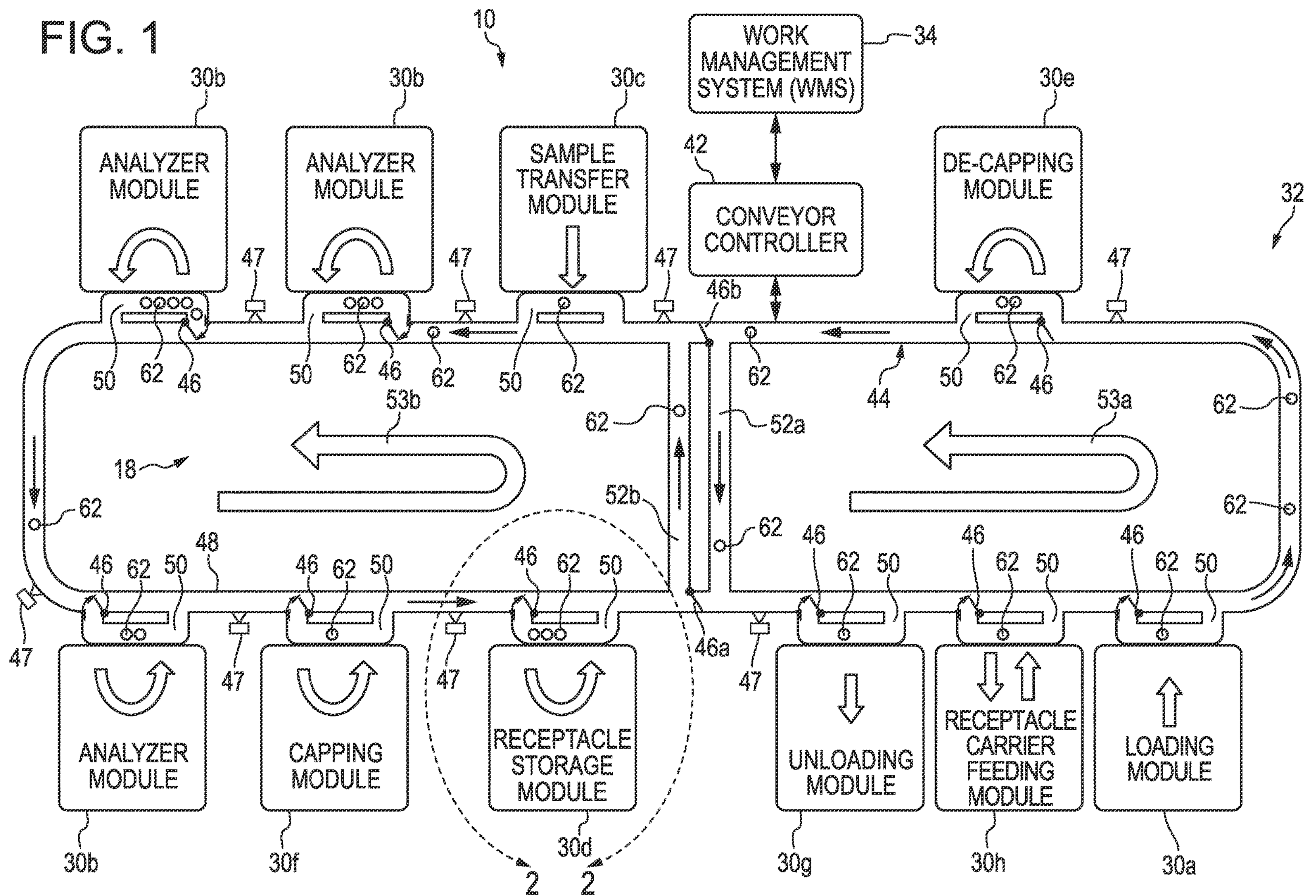
FIG. 1 is a schematic illustration of an exemplary automated specimen processing system.

Unless defined otherwise, all terms of art, notations and other scientific terms or terminology used herein have the same meaning as is commonly understood by one of ordinary skill in the art to which this disclosure belongs. All patents, applications, published applications and other publications referred to herein are incorporated by reference in their entirety. If a definition set forth in this disclosure is contrary to, or otherwise inconsistent with, a definition in these references, the definition set forth in this disclosure prevails over the definitions that are incorporated herein by reference. None of the references described or referenced herein is admitted to be prior art to the current disclosure.

References in the specification to "one embodiment," "an embodiment," a "further embodiment," "an exemplary embodiment," "some aspects," "a further aspect," "aspects," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments whether or not explicitly described. As used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, inside, outside, inner, outer, proximal, distal, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting. Further, relative terms such as, for example, "about," "substantially," "approximately," etc., are used to indicate a possible variation of ±10% in a stated numeric value or range.

Referring to FIG. 1, one embodiment of an automated specimen processing system 10 configured for preparing and processing specimens from specimen-containing receptacles 12 (e.g., test tubes or vials) will be described. The receptacle 12 may be any type of fluid container that is configured to contain a specimen.

Figure 3D:
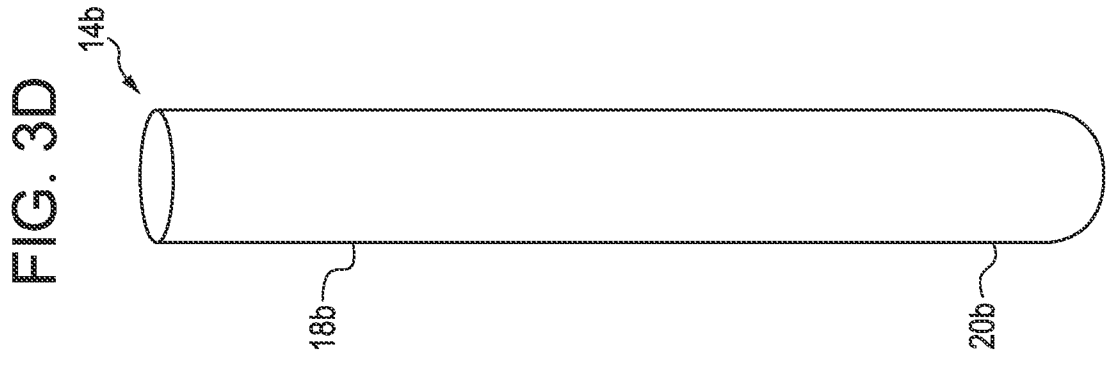
FIG. 3D is a front view of the receptacle of FIG. 3C, without a cap.
Figure 3C:
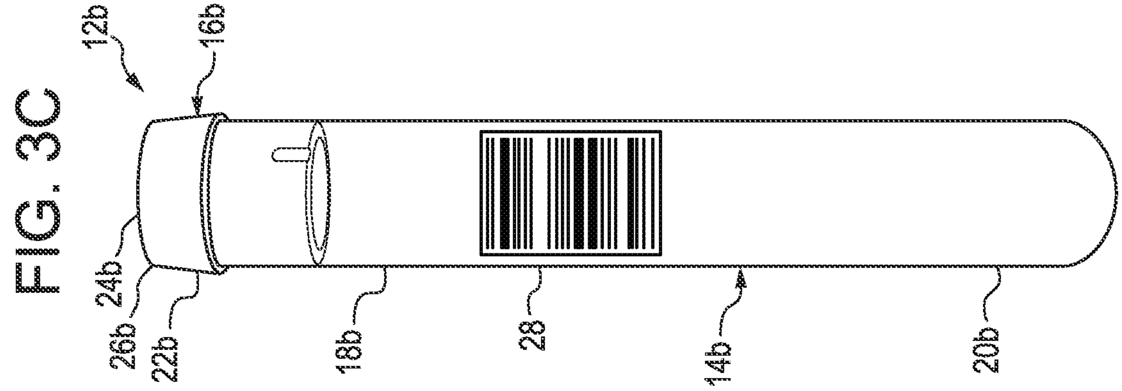
FIG. 3C is a front view of another exemplary receptacle for transport and processing in the automated specimen processing system of FIG. 1.
Figure 3B:
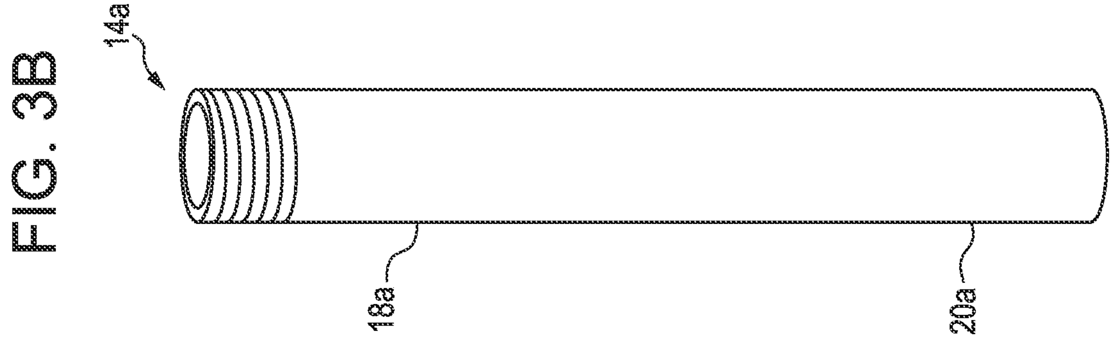
FIG. 3B is a front view of the receptacle of FIG. 3A without a cap.
Figure 3A:
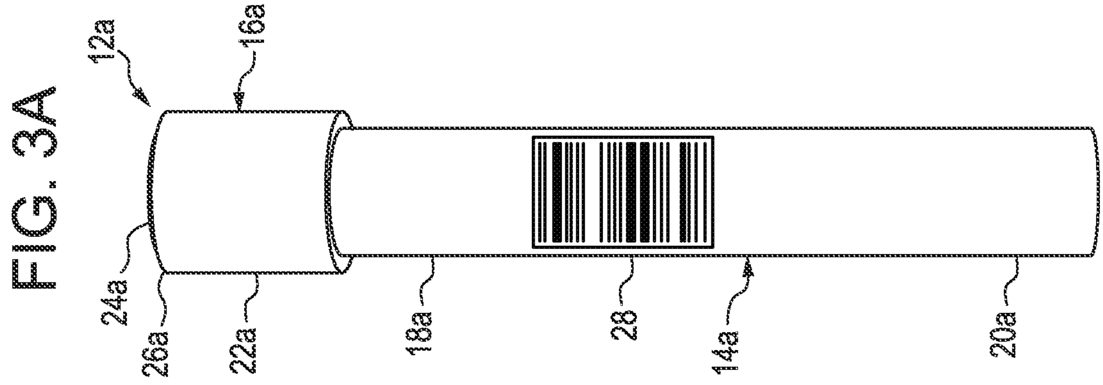
FIG. 3A is a front view of an exemplary receptacle for transport and processing in the automated specimen processing system of FIG. 1.

As illustrated in FIGS. 3A-3), two non-limiting exemplary embodiments of a closed receptacle 12 (12*a* and 12*b*) may be handled by the automated specimen processing system 10.

The receptacle 12*a* illustrated in FIGS. 3A and 3B includes a receptacle 14*a* and a closure 16 (in this case, a pierceable cap 16*a*) affixed to an open top end 18*a* of the receptacle 14*a*. In the illustrated embodiment, the receptacle 14*a* includes a self-standing flat bottom end 20*a*, although in alternative embodiments, the receptacle 14*a* may have, for example, a curved or hemispherical base. The receptacle 14*a* and the cap 16*a* generally have cylindrical shapes, although other geometric shapes are contemplated. The cap 16*a* includes a sidewall 22*a*, a top surface 24*a*, and a rim 26*a* between the sidewall 22*a* and the top surface 24*a*. Further details discussing exemplary receptacles with pierceable caps are set forth in U.S. Pat. Nos. 6,716,396, 7,691,332, and 9,545,632. Commercial embodiments of receptacles having pierceable caps may include, for example, Aptima® specimen transfer tube (Hologic, Inc., Marlborough, MA), and the Abbott multi-Collect Specimen Collection Kit (Abbott Laboratories, Des Plaines, IL).

In contrast, the closed receptacle 12*b* illustrated in FIGS. 3C and 3D includes a receptacle 14*b* and a closure 16 (in this case, a removable cap 16*b*) affixed to an open top end 18*b* of the receptacle 14*b*. In the illustrated embodiment, the receptacle 14*b* includes a curved or hemispherical bottom end 20*b*, although in alternative embodiments, the receptacle 14*b* may include a self-standing flat base. The receptacle 14*b* and the cap 16*b* generally have cylindrical shapes, although other geometric shapes are contemplated. The cap 16*b* includes a sidewall 22*b*, a top surface 24*b*, and an edge 26*b* between the sidewall 22*b* and the top surface 24*b*. A commercial embodiment of a receptacle having a removable cap includes BD Vacutainer® (Becton Dickinson Company, Franklin Lakes, NJ).

Each closed receptacle 12 (either 12*a* or 12*b*) may further include a machine-readable label 28 on the receptacle 14 (either 14*a* or 14*b*). The machine-readable label 28 may include encoded information relevant to the specimen, e.g., type of specimen, type of test(s) to be run, patient identification (e.g., age, sex, address, etc.). In some embodiments, the machine-readable label 28 may include marks or lines (e.g., a barcode) formed (e.g., printed) directly on the sidewall of receptacle 12. In other embodiments, the machine-readable label 28 may be a tag or sticker with an adhesive on one side and a pattern of marks formed on the opposite side.

The specimen may be any substance in its native form or at any stage of processing that is suspected of containing at least one analyte of interest. The analyte of interest may be, for example, a nucleic acid, a protein, a prion, a chemical, or the like. The substance may be derived from any source, including an animal, an industrial process, the environment, a water source, a food product, and a solid surface (e.g., surface in a medical facility). Substances obtained from animals may include, for example, blood or blood products, urine, mucous, sputum, saliva, semen, tears, pus, stool, nasopharyngeal or genitourinary specimen obtained with a swab or other type of collection device, and other bodily fluids or materials.

Referring again to FIG. 1, the automated specimen processing system 10 generally includes a plurality of modules 30, where each module 30 is configured for performing a defined set of actions on the receptacles 12, an automated conveyor system 32 configured for transporting the receptacles 12 between the modules 30, and a workflow management system (WMS) software module 34 configured for generating and managing the workflow of each of the receptacles 12.

In the illustrated embodiment, the modules 30 of the automated specimen processing system 10 include a loading (input) module 30*a*, a plurality of analyzer modules 30*b* (three analyzer modules illustrated, although any suitable number of analyzer modules 30*b* may be employed in the automated specimen processing system 10, including only one), a sample transfer module 30*c*, a receptacle storage module 30*d*, a de-capping module 30*e*, a capping module 30*f*, an unloading (output) module 30*g*, and a receptacle carrier feeding nodule 30*h*. It should be appreciated that the automated specimen processing system 10 may include different numbers and types of modules 30, although an automated specimen processing system 10 will typically include at least one analyzer module 30*b* and, for the purposes of this description, at least one receptacle storage module 30*d*.

The loading module 30*a* serves as an input through which trays of receptacles 12 (e.g., 50 to 100 receptacles 12 per each tray) containing specimens can be manually loaded by an operator through a loading bay (not shown) of the loading module 30*a*. Once a tray of receptacles 12 has been provided to a loading bay of the loading module 30*a*, the receptacles 12 may be automatically transferred from the loading module 30*a* onto the automated conveyor system 32 to be subsequently acted upon by the other modules 30 in accordance with the workflows for the receptacles 12.

Each analyzer module 30*b* is configured for processing specimens contained in selected receptacles 12, e.g., by performing analytical tests on the specimens. Such tests may include molecular tests (e.g., nucleic acid-based assays), sequencing assays, immunoassays, chemistry analyses, etc. Non-limiting examples of such analyzer modules 30*b* include automated analyzers such as, e.g., the Tigris®, Panther®, and Panther Fusion® systems sold by Hologic, Inc., Marlborough, Mass. In the illustrated embodiment, each analyzer module 30*b* may be configured for receiving receptacles 12 via automated loading (using the automated conveyor system 32) or manual loading through a sample bay (not shown). The analyzer modules 30*b* may be specialized (i.e., the analyzer module may be unique in the automated specimen processing system 10) or redundant (i.e., the analyzer module may be identical to at least one other analyzer module in the automated specimen processing system 10) to allow higher throughput of analytical tasks on the specimens contained in the receptacles 12. Typically, an analyzer module 30*b* extracts a liquid or liquified specimen from each of the receptacles 12 and combines the specimens with reagents in reaction vessels, such as cuvettes, tubes, vials, microtiter plates, etc., after which the vessels may be sealed, capped or otherwise closed. After combining the specimens with the reagents, the contents of the reaction vessels are subjected to a series of test conditions.

Like the loading module 30*a*, the sample transfer module 30*c* serves as an input through which trays of receptacles (e.g., 50 to 100 receptacles per each tray) containing specimens can be manually loaded by an operator into a loading bay (not shown) of the sample transfer module 30*c*. However, the sample transfer module 30*c* provides the additional function of transferring at least an aliquot of specimen from each of the manually loaded receptacles (the "parent" receptacles) to at least one empty "child" receptacle 12, where the specimen-containing child receptacle 12 may be automatically transferred from the sample transfer module 30*c* onto the automated conveyor system 32 to be subsequently acted upon by the other modules 30 in accordance with the workflow for the child receptacle 12. The child receptacles 12 may have a configuration that is adapted for use in one or more of the analyzer modules 30*b*, and which is different than the configuration of the parent receptacles. The sample transfer module 30*c* may store a number of empty child receptacles 12, at least a portion of which may receive an aliquot of specimen from a parent receptacle provided to the sample transfer module 30*c*. The sample transfer module 30*c* may include a pipettor (not shown) that aspirates a portion of the specimen from the parent receptacle and dispenses the aspirated specimen into an empty child receptacle(s) 12. A non-limiting example of a sample transfer module 30*c* is the Tomcat® instrument sold by Hologic, Inc., Marlborough, Mass.

The receptacle storage module 30*d* is configured for storing receptacles 12. In some cases, the receptacle storage module 30*d* may be configured for storing completed receptacles 12 (i.e., receptacles 12 containing specimens for which the workflow has been completed) for subsequent manual removal from the receptacle storage module 30*d* by an operator. In other cases, the receptacle storage module 30*d* may be configured for storing non-completed receptacles 12 (i.e., receptacles 12 containing specimens for which the workflow has not been completed) in a controlled environment for subsequent processing by the other modules 30. As one example, non-completed receptacles 12 may contain specimens that are awaiting initial testing (e.g., receptacles 12 containing specimens that are tested at a low frequency can be isolated in the receptacle storage module 30*d* until there is a sufficient number that reside in the automated specimen processing system 10, or receptacles 12 awaiting an opening in an analyzer module 30*b* for a particular test or awaiting loading of appropriate reagents and consumables onto an analyzer module 30*b*). As another example, non-completed receptacles 12 may contain specimens for which reflex testing is required or to offer a physician sufficient time to order additional testing based on initial tests. In the illustrated embodiment, the receptacle storage module 30*d* includes a plurality of vertically spaced levels (not shown in FIG. 1), each of which is configured for supporting one or more receptacle racks (not shown in FIG. 1). Each rack is configured for storing a plurality of closed receptacles 12. The features of the receptacle storage module 30*d* will be described in further detail below.

The de-capping module 30*e* is configured for removing caps 16*b* from closed, specimen-containing receptacles 12*b* (shown in FIG. 3C) prior to processing the specimens in one or more of the analyzer modules 30*b*. In the illustrated embodiment, the de-capping module 30*e* is situated along a conveyor (described in further detail below) of the automated conveyor system 32 before the analyzer modules 30*b*. The de-capping module 30*c* may be capable of removing different types of caps 16*b* from closed receptacles 12*b*, and in some embodiments, the de-capping module 30*e* may only be capable of removing a single type of cap 16*b* from the closed receptacles 12*b*. In the latter case, multiple de-capping modules 30*e*, each being capable of removing a different type of cap 16*b* from closed receptacles 12, may be situated along the conveyor of the automated conveyor system 32. It should be appreciated that receptacles 12*a* having pierceable caps 16*a* (shown in FIG. 3A) may bypass or pass through the de-capping module 30*e* prior to specimen processing by one or more of the analyzer modules 30*b*. Further details discussing exemplary de-capping modules are set forth in U.S. Pat. Nos. 6,321,619 and 7,152,504.

The capping module 30*f* is configured for coupling (e.g., inserting or attaching) caps 16*b* (e.g., replacement caps or stoppers) to open-ended receptacles 12 after extracting specimen from the receptacles 12 in one or more of the analyzer modules 30*b*, and, in many instances, prior to transferring the receptacles 12 to the receptacle storage module 30*d* or the unloading module 30*g*. In the illustrated embodiment, the capping module 30*f* is situated along the conveyor (described in further detail below) of the automated conveyor system 32 between the analyzer modules 30*b* and the receptacle storage module 30*d* and the unloading module 30*g*. The capping module 30*f* may be capable of coupling different types of caps 16*b* to open-ended receptacles 12, and in some embodiments, the capping module 30*f* may only be capable of coupling a single type of cap 16*b* to the open-ended receptacles 12. In the latter case, multiple capping modules 30*f*, each being capable of coupling a different type of cap 16*b* to open-ended receptacles 12, may be provided between the analyzer modules 30*b* and the receptacle storage module 30*d* and the unloading module 30*g*. It should be appreciated that receptacles 12 having pierceable caps 16*a* (shown in FIG. 3A) may bypass or pass through the capping module 30*f* prior to transporting the receptacles 12 to the receptacle storage module 30*d* or unloading module 30*g*. Further details discussing exemplary capping modules are set forth in U.S. Pat. Nos. 6,321,619 and 7,152,504.

The unloading module 30*g* is configured for receiving capped receptacles 12 having contents that were extracted and processed by one or more of the analyzer modules 30*b*. The capped receptacles 12 can be transferred from the conveyor of the automated conveyor system 32 to racks contained in a bay located within a housing of the unloading module 30*g*. After sufficiently filling the racks with capped receptacles 12, an operator can manually remove the racks from the bay of the unloading module 30*g*.

The receptacle carrier feeding module 30*h* is configured for storing and supplying empty carriers that can be used to transport the receptacles 12 within the automated conveyor system 32, as will be described in further detail below.

Referring to FIG. 1, the WMS software module 34 is configured for coordinating workflow and high-level receptacle traffic, and can be conceptualized as a minimum cloud database that maintains the status of all receptacles 12 and modules 30 in the automated specimen processing system 10, and controls assay specific workflows for the receptacles 12. In particular, the WMS software module 34 identifies assays to be run for the specimen in any particular receptacle 12 based on encoded information on machine-readable label 28 read by a scanner or reader (e.g., a barcode reader not shown) of the loading module 30*a*, and generates an assay specific work flow, including pre-analytical and post-analytical steps, such as, e.g., centrifuging, de-capping, aliquoting, storage, reflex testing, capping, etc.

The automated conveyor system 32 includes a conveyor controller 42, a conveyor 44, a plurality of diverters 46, and a plurality of barcode readers 47, each of the barcode readers 47 being associated with one of the modules 30 (with the exception of the loading module 30*a* and the receptacle carrier feeding module 30*h*). As will be described in further detail below, the receptacles 12 are transported from one location to another location in the automated conveyor system 32 via receptacle carriers 62 that support the receptacles 12 in an upright orientation (shown in FIGS. 5 and 6).

The conveyor controller 42 is configured for controlling the low-level functions of the automated conveyor system 32, such as transporting the receptacle carriers 62, along with the supporting specimen-containing receptacles 12 (i.e., the loaded receptacle carriers 62), between the various modules 30 of the automated specimen processing system 10. Thus, the conveyor controller 42 controls which modules 30 the loaded receptacle carriers 62 will be diverted to and which modules 30 the loaded receptacle carriers 62 will bypass. The conveyor controller 42 may also be configured for controlling low-level error handling and basic display of information. The conveyor controller 42 is also configured for managing communication between the various modules 30 of the automated specimen processing system 10 and the WMS software module 34.

The conveyor 44 may be any apparatus for conveying or otherwise facilitating the transportation of loaded receptacle carriers 62 between modules 30 along a defined path. Exemplary conveyors include robots, moving belts, shuttle/carriages moving on a track or rail, magnetic devices, gear systems, cable systems, vacuum systems, automated cars with wheels, etc. In the illustrated embodiment, the conveyor 44 takes the form of a track that includes a main conveyor line 48, a plurality of branch lines 50 respectively associated with the modules 30, and two pass-through lines 52*a*, 52*b*.

The main conveyor line 48 serves as the primary line for transporting the loaded receptacle carriers 62 between the different modules 30 of the automated specimen processing system 10. In the illustrated embodiment, the main conveyor line 48 has a closed geometric shape (e.g., rectangular) that facilitates unidirectional movement of the loaded receptacle carriers 62. In alternative embodiments, the main conveyor line 48 may be linear and bidirectional. Each branch line 50 may provide both input and output to the associated module 30. Thus, with the possible exception of the receptacle carrier feeding module 30*h*, each branch line 50 may serve to receive loaded receptacle carriers 62 from the main conveyor line 48, such that the associated module 30 may remove and act upon the receptacles 12, and to receive receptacles 12 that have been acted upon by the associated module 30 for insertion into receptacle carriers 62 for transport onto the main conveyor line 48.

The branch line 50 associated with the receptacle carrier feeding module 30*h* may serve to receive and store empty receptacle carriers 62 fed to the main conveyor line 48 by the receptacle storage module 30*d* or unloading module 30*g* (after removal of the receptacles 12 from their associated receptacle carriers 62), and may further serve to receive empty receptacle carriers 62 from the receptacle carrier feeding module 30*h* for transport to the loading module 30*a* or the sample transfer module 30*c* (and possibly the receptacle storage module 30*d*) via the main conveyor line 48, where receptacles 12 may be loaded into the empty receptacle carriers 62.

Figure 2:
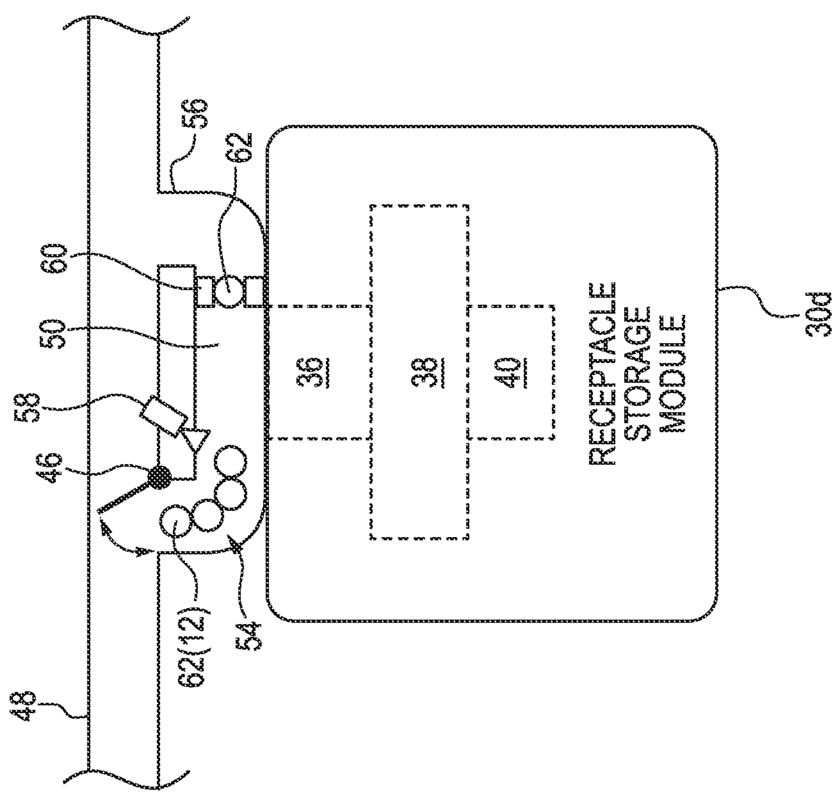
FIG. 2 is a schematic illustration of an exemplary receptacle storage module of the exemplary automated specimen processing system of FIG. 1 and an exemplary branch line associated with the receptacle storage module.

Each module 30 may include or be associated with various apparatuses (e.g., pick-and-place devices, receptacle transporters, and/or robotic handlers) for transferring receptacles 12 from the automated conveyor system 32 to the module 30, transporting and handling the receptacle 12 within the module 30 in accordance with the defined function of the module 30 and, if necessary, returning the receptacle 12 to the automated conveyor system 32 for processing by other modules 30. For example, as illustrated in FIG. 2, the receptacle storage module 30*d* may include or be associated with one or more pick-and-place devices 36 configured for transporting the receptacles 12 between the module 30 and the main conveyor line 48; one or more receptacle transporters 38 configured for transporting the receptacles 12 between one or more of the pick-and-place devices 36 and one or more locations within the receptacle storage module 30*d*; and one or more robotic handlers 40 configured for individually transporting the receptacles 12 between one or more of the receptacle transporters 38 and one or more racks (described in further detail below) contained within the receptacle storage module 30*d* (shown in FIGS. 7 and 8). The apparatuses (including pick-and-place device(s) 36, receptacle transporter(s) 38, and robotic handler(s) 40) used to (i) transfer receptacles 12 from the automated conveyor system 32 into the receptacle storage module 30*d*, (ii) transport and handle the receptacles 12 within the receptacle storage module 30*d* for storage therein, and (iii) transfer the receptacles 12 from the receptacle storage module 30*d* back onto the automated conveyor system 32 for processing by other modules 30 will be described in further detail below.

Each branch line 50 includes various components, such as, e.g., receptacle buffer queues, barcode reader assemblies, receptacle stop features, returns, etc. For example, as illustrated in FIG. 2, the branch line 50 associated with the receptacle storage module 30*d* includes a receptacle buffer queue 54, a return 56, a barcode reader assembly 58, and a stop feature 60.

The receptacle buffer queue 54 is configured for receiving and queueing all of the loaded receptacle carriers 62 that have been diverted onto the branch line 50 from the main conveyor line 48 for subsequent action by the receptacle storage module 30*d*, and the return 56 is configured for returning loaded receptacle carriers 62 that have been acted upon by the receptacle storage module 30*d* back to the main conveyor line 48 for subsequent action by other modules 30. The barcode reader assembly 58 is situated on the branch line 50 downstream from the buffer queue 54 and is configured for reading information encoded on the barcodes 28 affixed to the receptacles 12 supported in the queued receptacle carriers 62. The barcode reader assembly 58 is also configured for individually immobilizing and rotating the loaded receptacle carriers 62, thereby allowing the affixed barcodes 28 to be read. While the loaded receptacle carriers 62 are immobilized, and after the barcode reader assembly 58 has read information encoded on the barcodes 28 affixed to the receptacles 12, the pick-and-place device 36 serially removes each of the receptacles 12 from the associated receptacle carrier 62 in the buffer queue 54 and transfers the receptacles 12 into the receptacle storage module 30*d*. The stop feature 60 is situated on the branch line 50 downstream from the barcode reader assembly 58, but upstream from the return 56, and is configured for individually immobilizing empty receptacle carriers 62 while the pick-and-place device 36 inserts each of the receptacles 12, once acted upon by the receptacle storage module 30*d*, into the receptacle carriers 62 before releasing the newly loaded receptacle carriers 62 to the return 56 of the branch line 50 for transport to the main conveyor line 48.

Although the automated conveyor system 32 has been described as including branch lines 50, it should be appreciated that the automated conveyor system 32 may alternatively include any types of lines that allow loaded receptacle carriers 62 to be transported to and/or from the modules 30. For example, in some embodiments, the receptacles 12 may be transported (e.g., by an associated pick-and-place device) directly from the main conveyor line 48 (i.e., while the loaded receptacle carriers 62 are located on the main conveyor line 48) to a module 30, and transported (e.g., by an associated pick-and-place device) directly back onto the main conveyor line 48 (i.e., while the loaded receptacle carriers 62 are located on the main conveyor line 48).

As another example, loaded receptacle carriers 62 may be directly drawn into a module 30 from the main conveyor line 48 or a branch line 50, thereby eliminating the need to withdraw a receptacle 12 from its corresponding receptacle carrier 62 (e.g., see US. Patent Publication No. 2017/0254827).

Referring back to FIG. 1, a right-side inner loop 53*a* defined by the main conveyor line 48 and the pass-through line 52*a* allows loaded receptacle carriers 62 to circulate until space is available on a left-side inner loop 53*b* defined by the main conveyor line 48 and the pass-through line 52*b*. The left-side inner loop allows loaded receptacle carriers 62 that have been transferred from the right-side inner loop to circulate while they await access to one or more of the modules 30. For example, a branch line 50 may have a full queue of receptacle carriers 62, such that new loaded receptacle carriers 62 cannot be diverted from the main conveyor line 48 onto the branch line 50 until the associated module has extracted specimen from at least a portion of the receptacles 12 supported by the queued loaded receptacle carriers 62, and these loaded receptacle carriers 62 have been removed from the branch line 50 and reintroduced onto the main conveyor line 48.

Figure 4B:
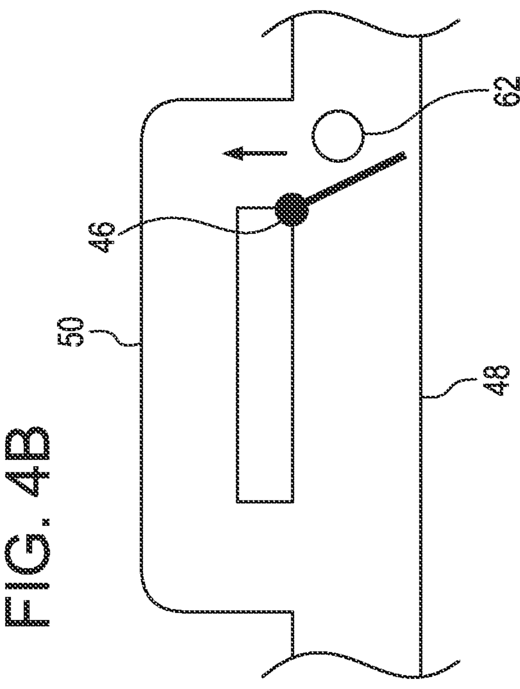
FIG. 4B is a diagram of a portion of automated conveyor system used in the automated specimen processing system, where a diverter is shown in an open state to divert a receptacle from a main conveyor line onto a branch line of the automated specimen processing system.
Figure 4A:
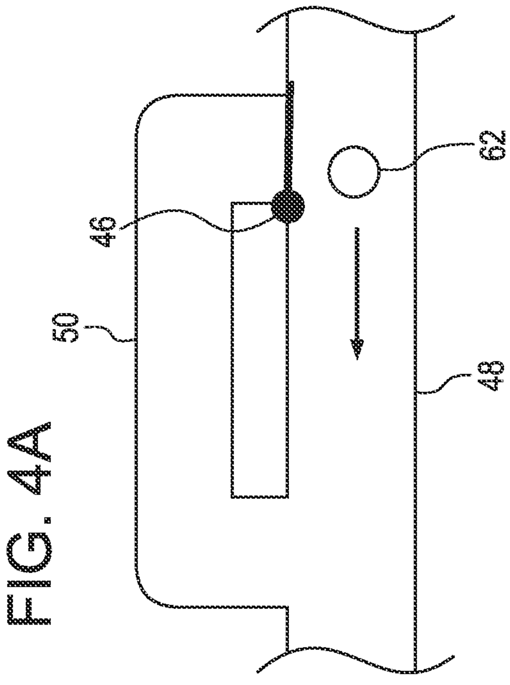
FIG. 4A is a diagram of a portion of automated conveyor system used in the automated specimen processing system of FIG. 1, where a diverter is shown in a closed state to allow a receptacle on a main conveyor line to bypass a branch line associated with a module of the automated specimen processing system.

Each diverter 46 is configured for diverting selected loaded receptacle carriers 62 onto portions of the conveyor 44. For example, each diverter 46 may divert a selected receptacle carrier 62 from the main conveyor line 48 onto corresponding branch line 50 (e.g., via the buffer queue 54) associated with the module 30. Thus, depending upon the state of the diverter 46, some loaded receptacle carriers 62 may proceed along the main conveyor line 48 without being diverted onto a branch line 50 (i.e., those loaded receptacle carriers 62 not tagged by the WMS software module 34), as illustrated in FIG. 4A, and other loaded receptacle carriers 62 may slow down to limit lateral forces and be diverted onto the branch line 50 via the diverter 46, as illustrated in FIG. 41B.

In the illustrated embodiment, each module 30 is configured for controlling its corresponding diverter 46 to direct a loaded receptacle carrier 62 (or empty receptacle carrier 62 in the case of the receptacle carrier feeding module 30_h_) onto its corresponding branch line 50 in accordance with the status of the workflows associated with the receptacles 12. Each of the modules 30 is associated with a corresponding barcode reader 47 that reads information encoded on the barcodes 28 of the receptacles 12 traveling along the main conveyor line 48, such that the respective modules 30 may determine whether workflows of the receptacles 12 require action by that module 30 (i.e., analysis, decapping, capping, sample transfer, storage, etc.), and operates the corresponding diverter 46 in accordance information read by the corresponding barcode reader 47.

In the illustrated embodiment, receptacles 12 may be transferred between the right-side inner loop 53_a_ and the left-side inner loop 53_b_. In particular, the diverters 46_a_, 46_b_ may be selectively activated to recirculate a particular receptacle carrier 62 on the left-side inner loop 53_b_ (e.g., if the number of times a receptacle carrier 62 containing a non-completed receptacle 12 has circulated around the left-side inner loop 53 has not exceeded a limit), recirculate a particular receptacle carrier 62 on the right-side inner loop 53_a_ (e.g., if no analyzer modules 30_b_ required to partially complete or fully complete a non-completed receptacle 12 carried by the receptacle carrier 62 are available), transfer a particular receptacle carrier 62 from the left-side inner loop 53_b_ to the right-side inner loop 53_a_ (e.g., if a receptacle 12 carried by the particular receptacle carrier 62 has been fully completed, or if the number of times a receptacle carrier 62 containing a non-completed receptacle 12 has circulated around the left-side inner loop 53_b_ has exceeded a limit), or transfer a particular receptacle carrier 62 from the right-side inner loop 53_a_ to the left-side loop 53_b_ (e.g., if at least one analyzer module 30_b_ required to partially complete or fully complete a non-completed receptacle 12 carried by the receptacle carrier 62 becomes available). Each diverter 46 may take the form of, e.g., a gate, a switch, or other mechanism suitable for diverting a loaded receptacle carrier 62 between selected portions of the conveyor 44.

The automated conveyor system 32 may provide a motive force for transporting the receptacle carriers 62 in any one of a variety of manners. In one embodiment, a magnetic motion system (not shown) beneath the track (i.e., the main conveyor line 48, branch lines 50, and pass-through lines 52_a_, 52_b_) provides motive forces to the receptacle carriers 62, e.g., by using ferrous coils situated beneath the track and one or more magnets in the receptacle carriers 62 to propel the receptacle carriers 62 along the track. Further details discussing non-limiting exemplary embodiments of magnetic motion systems that can be used in the automated conveyor system 32 are set forth in U.S. Pat. Nos. 9,766,258 and 9,776,811. In another embodiment, the track may include many individually controllable rollers that can be operated to carry the receptacle carriers 62 along the track. In still another embodiment, the track may mechanically constrain the receptacles 12 along a single dimension, in which case, the receptacles 12 may be self-propelled. Exemplary automated conveyor systems that may be used include commercially available systems from FlexLink, Inpeco (Flexlab, FilexLab-HT, etc.), Integrated Drive Systems (e.g., IDS-CLAS-XI), Thermo Fisher Scientific, Hitachi, MagneMotion, GLP, etc.

Figure 6:
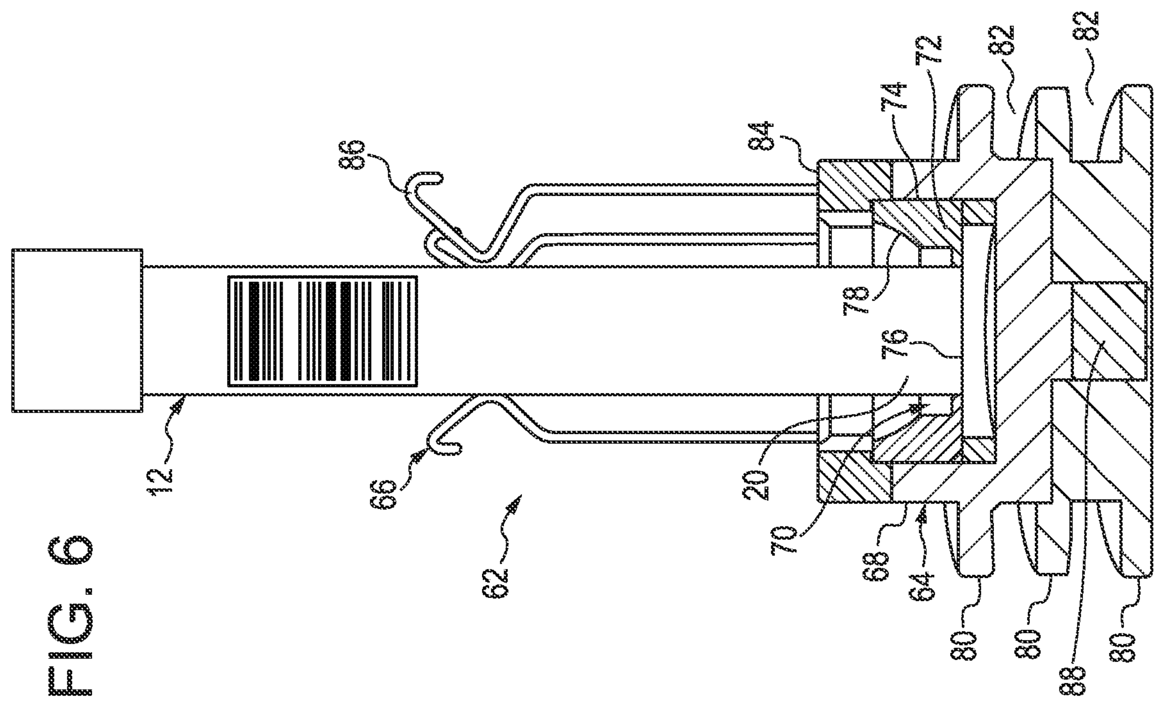
FIG. 6 is a cross-sectional view of the carrier of FIG. 5 and a receptacle supported by the carrier.
Figure 5:
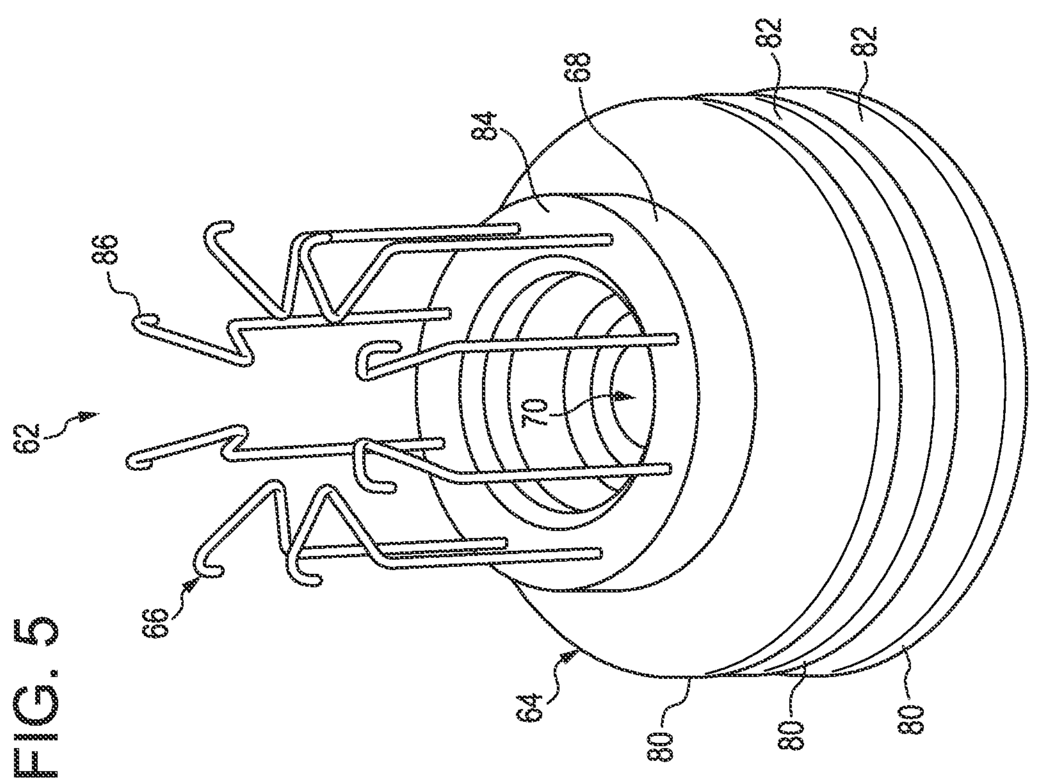
FIG. 5 is a perspective view of an exemplary carrier used by an automated conveyor system of the automated specimen processing system of FIG. 1 for transporting the receptacles of FIGS. 3A-3D.

Referring now to FIGS. 5 and 6, a non-limiting exemplary receptacle carrier 62 for supporting receptacles 12 that are transported by the automated conveyor system 32 will be described. In the illustrated embodiment, the receptacle carrier 62 supports a single receptacle 12, although in alternative embodiments a receptacle carrier 62 may support multiple receptacles 12. In the illustrated embodiment, each receptacle carrier 62 includes a base 64 configured for interfacing with the automated conveyer system 32 and a retention device 66 configured for securing a receptacle 12 to the base 42.

The base 64 takes the form of a "puck." In the illustrated embodiment, the bottom surface of the base 64 includes a magnet 88 configured for operatively coupling with a magnet or ferrous element on automated conveyor system 32. The base 64 may be composed of plastic, e.g., ultra-high molecular weight polyethylene (UHMWPE). In other embodiments, the base 64 is composed of metal, e.g., stainless steel. A top end 68 of the base 64 defines a recess 70 configured for receiving at least a portion of the receptacle 12. In the illustrated embodiment, the recess 70 has a depth configured for receiving the bottom end 20 of the receptacle 12, and a diameter equal to the diameter of the receptacle 14, although in alternative embodiments, the diameter of the recess 70 may be larger than the diameter of the receptacle 14. It should be appreciated that although the base 64 and recess 70 of the receptacle carrier 62 are preferably cylindrical in nature, the base 64 and recess 70 may have any shape, provided the receptacle carrier 62 can stably support a receptacle 12 in a substantially upright orientation.

In the embodiment illustrated in FIG. 6, the base 64 includes a ring-shaped stopper 72 disposed in the recess 70 and abutted against an interior surface 74 of the base 64. The stopper 72 defines a bottom 76 of the recess 70, such that the bottom end 20 of the receptacle 12 contacts the stopper 72. In some embodiments, the stopper 72 includes a tapered surface 78 to promote movement of the bottom end 20 of the receptacle 12 toward the bottom 76 of the recess 70 when the receptacle 12 is initially received in the recess 70 of the base 64. In the illustrated embodiment, the base 64 includes a plurality of spaced apart, radially extending annular flanges 80. The adjacent flanges 80 define an annular groove 82 in the space therebetween. The arrangement of flanges 80 and grooves 82 can be used by the automated conveyor system 32 to transport or handle the receptacle carrier 62. For example, a barcode reader assembly or stop feature of the automated conveyor system 32 (e.g., the barcode reader assembly 58 and stop feature 60 associated with the receptacle storage module 30_d_ shown in FIG. 2) can include protrusions (not shown) that fit within the grooves 82 to immobilize or rotate the receptacle carrier 62. Any of the diverters 46 of the automated conveyor system 32 (shown in FIG. 1) may have similar protuberances that fit within the grooves 82 to facilitate diversion of the receptacle carrier 62 from the main conveyor line 48 to a branch line 50.

In the illustrated embodiment, the retention device 66 includes an annular support 84 and a plurality of wire fingers 86. The wire fingers 86 are preferably resilient, i.e., after any deflection of fingers 86 during normal operation, the wire fingers 86 return to their respective original positions. As such, the wire fingers 86 are configured for flexing, thereby allowing the receptacle 12 to be inserted within the recess 70 of the base 64, while applying a radially inward force to the receptacle 12 to collectively clamp a portion of the receptacle 12, thereby securing the receptacle 12 to the base 64 and maintaining the orientation and position of the receptacle 12 as the carrier 62 moves within the automated conveyance system 32. In alternative embodiments, instead of an annular support 84 and wire fingers 86, a retention device can instead include an elastic cylindrical bore (not shown) that resiliently grips the receptacle 12, thereby allowing the receptacle 12 to be inserted into and gripped by the cylindrical bore.

In an alternative embodiment, each receptacle carrier may include active components, such as processors, motion systems, guidance systems, sensors, etc. In another alternative embodiment, each receptacle carrier may include onboard intelligence that allows the receptacle carrier to be self-guided between points along the main conveyor line 48. Further details discussing the exemplary carrier 62 illustrated in FIGS. 5 and 6 are set forth in U.S. Provisional Application Ser. No. 62/891,728. Other exemplary carriers that can be used to transport receptacles 12 in the automated convey system 32 are described in U.S. Pat. Nos. 7,485,264, 8,147,778, and 10,041,965, and U.S. Patent Publication Nos. 2006/0222573, 2017/0153262, 2017/0248623, and 2018/0052183.

With reference now to FIGS. 7-18, a non-limiting exemplary embodiment of a receptacle storage module **30*d*, together with a branch line 102 (corresponding to the branch line 50 in FIGS. 1 and 2), barcode reader assembly 104, and stop feature 106 (corresponding to the branch line 50, barcode reader assembly 58, and stop feature 60 illustrated in FIG. 2**), will be described.

Figure 7:
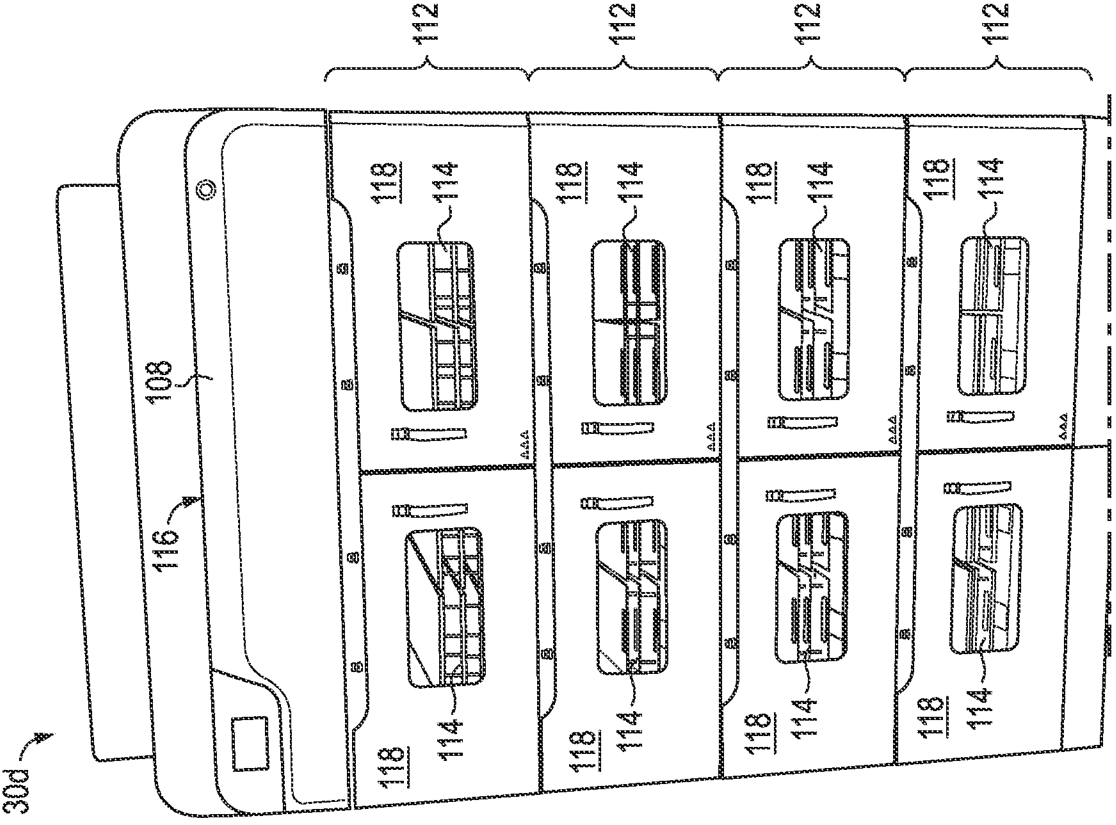
FIG. 7 is a front view of an exemplary receptacle storage module of the automated specimen processing system of FIG. 1.
Figure 8:
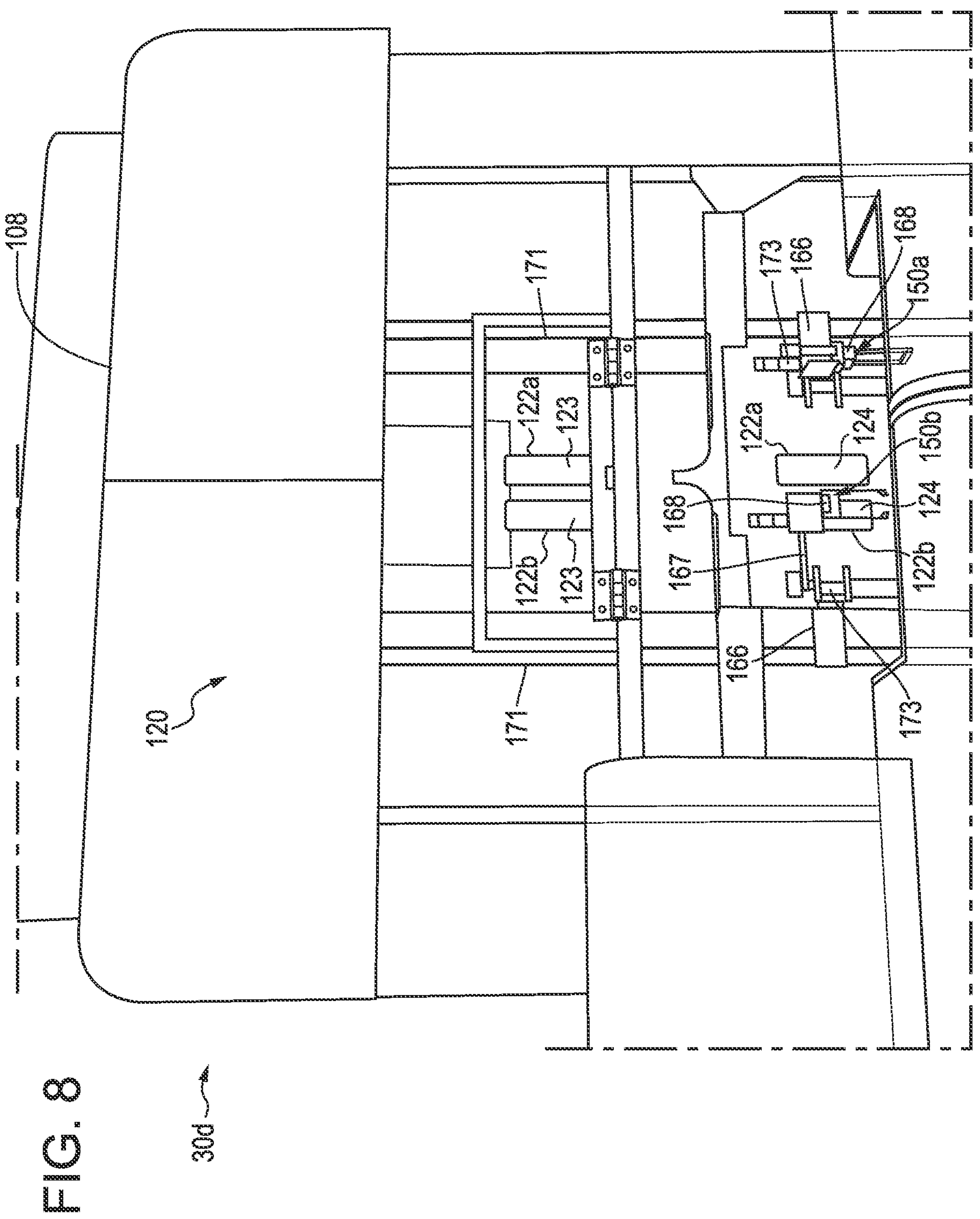
FIG. 8 is a partial back view of the receptacle storage module of the FIG. 7.
Figure 9:
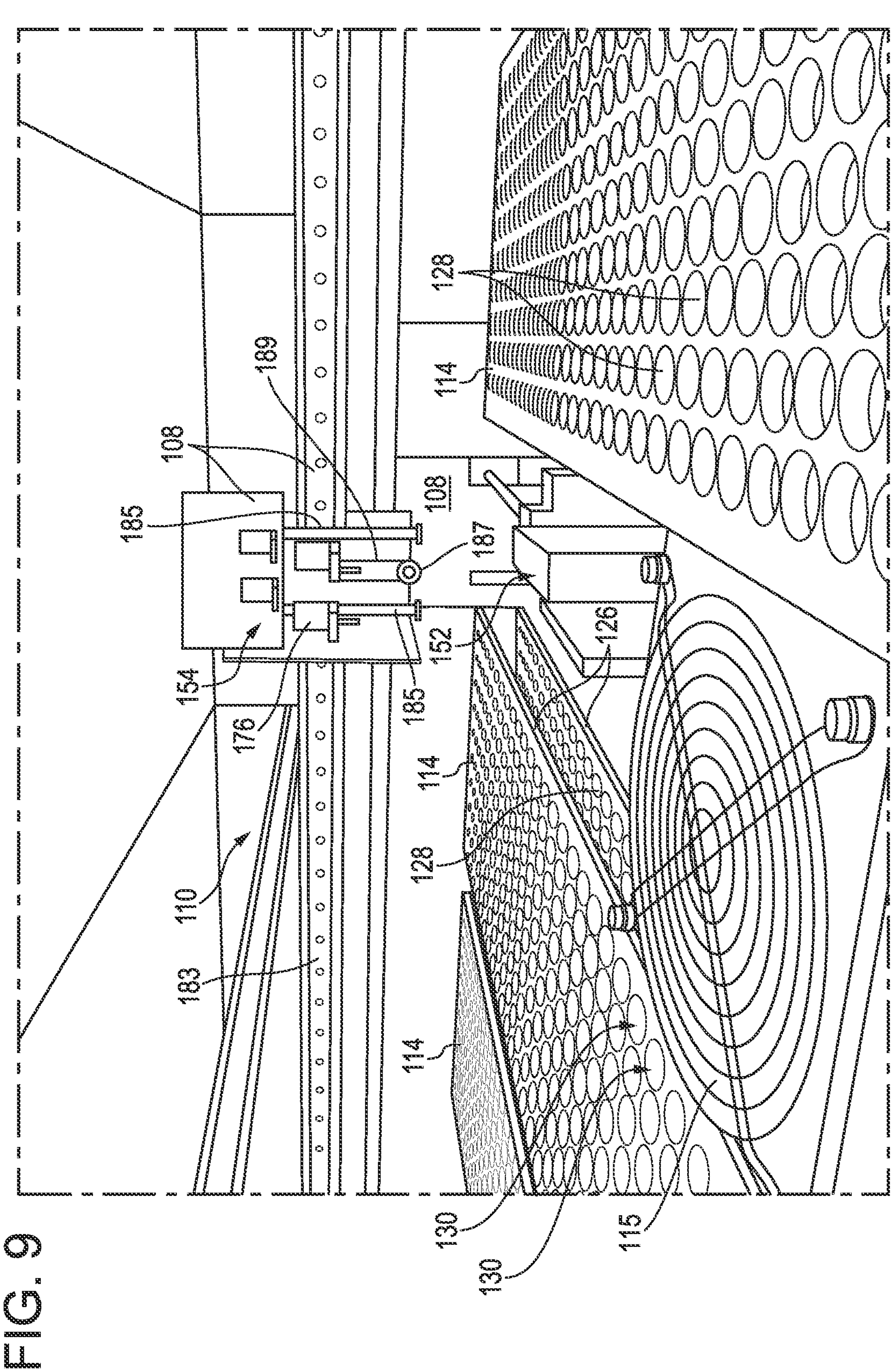
FIG. 9 is an internal view of the receptacle storage module of FIG. 7, particularly illustrating exemplary receptacle racks and an exemplary robotic handler of the receptacle storage module.
Figure 17:
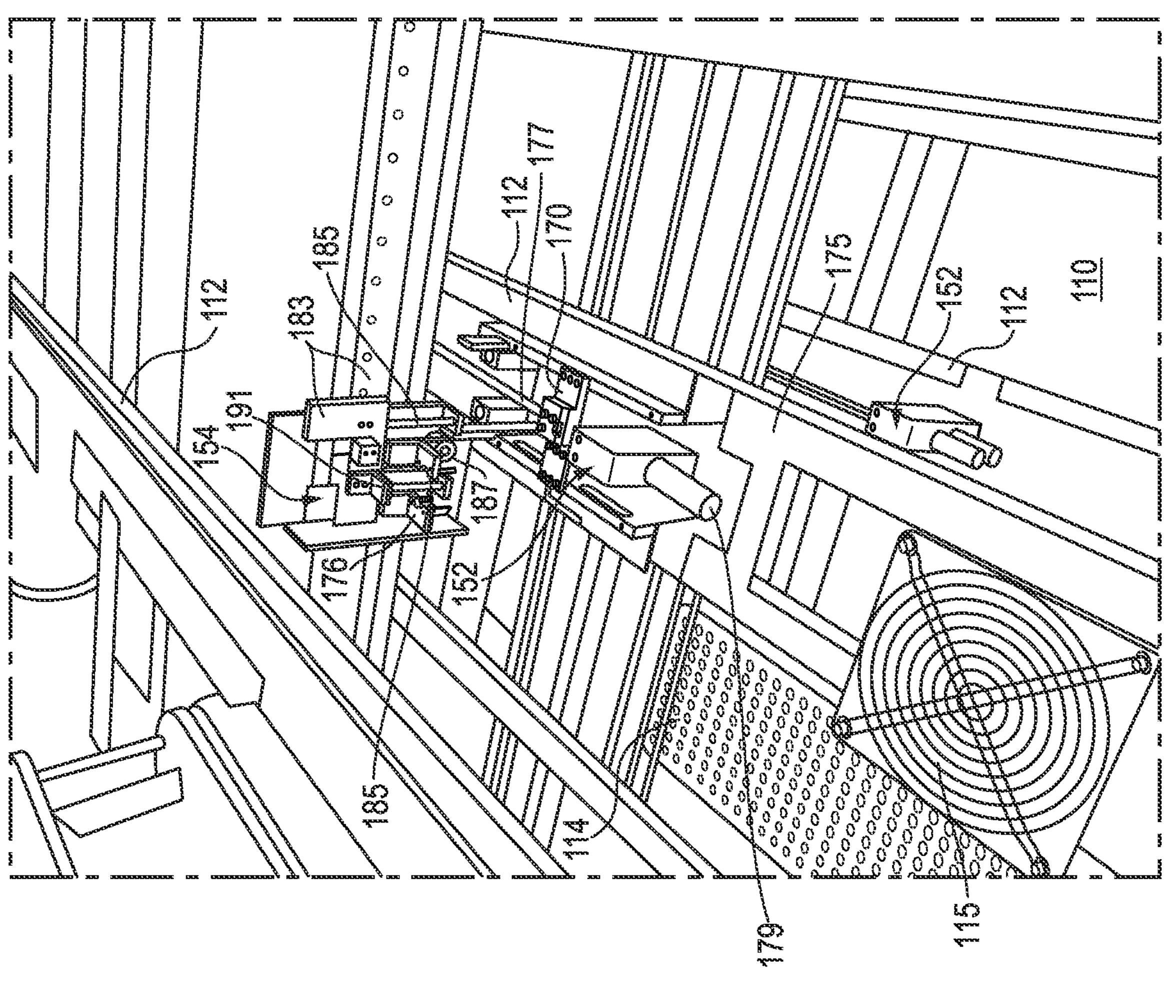
FIG. 17 is an internal view of the receptacle storage module of FIG. 7, particularly showing multiple levels, an exemplary robotic handler, and an exemplary receptacle transporter associated with each shelf of the receptacle storage module.

As best shown in FIG. 7, the receptacle storage module **30*d* includes a housing 108 defining an internal chamber 110 (see FIGS. 9, 10, 15, and 17) and a plurality of vertically spaced levels 112 (in this case, four levels 112) contained within the chamber 110. In the preferred embodiment, the chamber 110 of the housing 108 is refrigerated at a temperature suitable to prevent or delay degradation of the specimens contained in the stored receptacles. As such, the receptacle storage module 30*d* further includes at least one refrigeration unit (not visible), an evaporation fan 115 of which is illustrated in FIGS. 9 and 17. A front 116 of the housing 108 includes at least one door 118 and, in the illustrated embodiment, four pairs of doors 118, each pair of doors 118 configured for providing an operator manual access to a respective one of the levels 112. As illustrated in FIG. 8, a back 120 of the housing 108 includes one or more closable openings 122 through which the receptacles 12 can be transported between an exterior of the housing 108 and the chamber 110 of the housing 108. In the illustrated embodiment, the back 120 of the housing 108 includes multiple pairs of openings 122 (one pair of openings 122 associated with each level 112. In the illustrated embodiment, the back 120 of the housing 108 includes four pairs of openings 122, with two pairs of openings 122 (shown in FIG. 8) disposed above the branch line 102 (shown in FIG. 11), and two pairs of openings 122 (not shown) disposed beneath the branch line 102. Each pair of openings 122 includes an incoming opening 122*a* for receiving receptacles 12 into the chamber 110 of the housing 108 and an outgoing opening 122*b* for removing receptacles 12 from the chamber 110 of the housing 108. The pairs of openings 122 may be selectively opened, under control of the controller, to permit passage of receptacles 12 therethrough. For example, the back 120 of the housing 108 may include one or more doors 123 (in this case, a single door) associated with each opening 122. The door 123 for each opening 122 may be individually placed between an open position to allow passage of a receptacle 12 through the opening 122 (see the incoming opening 122*a* of FIG. 11), and a closed position to prevent passage of a receptacle 12 through the opening 122 (see the outgoing opening 122*b* of FIG. 11**).

Figure 19:
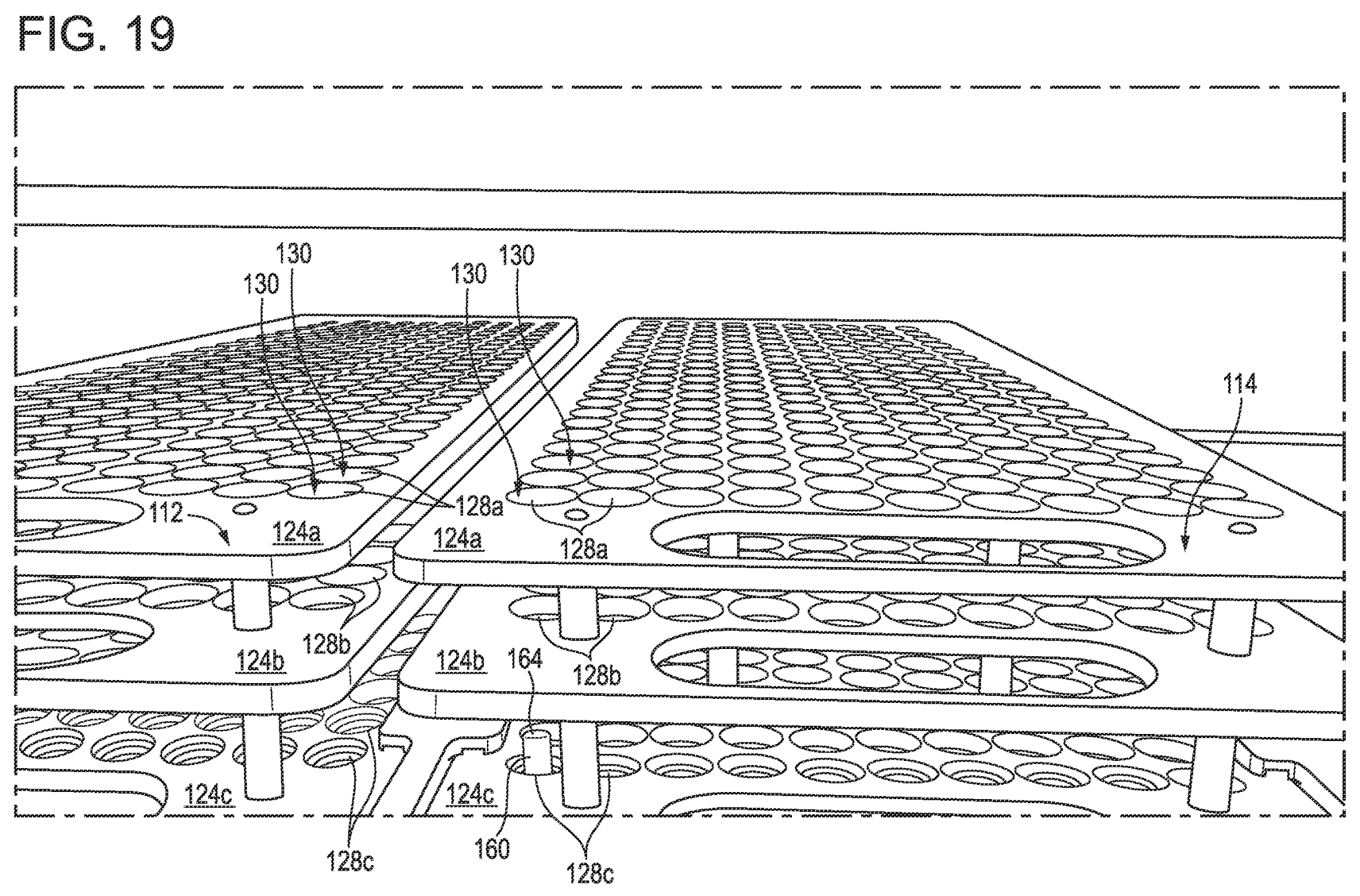

In the illustrated embodiment, as shown in FIGS. 7 and 8, each of the levels 112 supports at least one receptacle rack 114 (in this case, four racks 114) for receiving and holding a plurality of closed receptacles 12, preferably in linear rows. As best shown in FIG. 19, each receptacle rack 114, in one embodiment, includes a pair of spaced-apart support plates 124 (**124*a* and 124*b*) having aligned arrays of openings 128 (128*a* and 128*b*) and a base plate 124*c* having tapered openings 128*c* aligned with the arrays of openings 128*a*, 128*b* in the support plates 124. The openings 128*a*, 128*b* of the support plates 124*a*, 124*b* are sized to allow passage of the receptacle bodies 14 of the receptacles 12 therethrough, while the tapered openings 128*c* of the base plate 124*c* are sized to prevent passage of the receptacle bodies 14 therethrough. The tapered openings 128*c* are also sized to allow vertical movement of a pin 160 of a receptacle insertion stop assembly (described in further detail below) therethrough. The combination of openings 128*a*, 128*b* in the support plates 124*a*, 124*b* and the tapered openings 128*c* in the base plate 124*c* form slots 130 for receiving and supporting the receptacles 12 in substantially vertical orientations. The receptacles 12 are seated within the slots 130 when the bottom ends 20 of the receptacles 12 are in contact with the tapered openings 128*c* of the base plate 124*c*. In the illustrated embodiment, the openings 128 are circular; however, the openings 128 may be any suitable shape that is capable of receiving and supporting the receptacles 12** in substantially vertical orientations.

Figure 12:
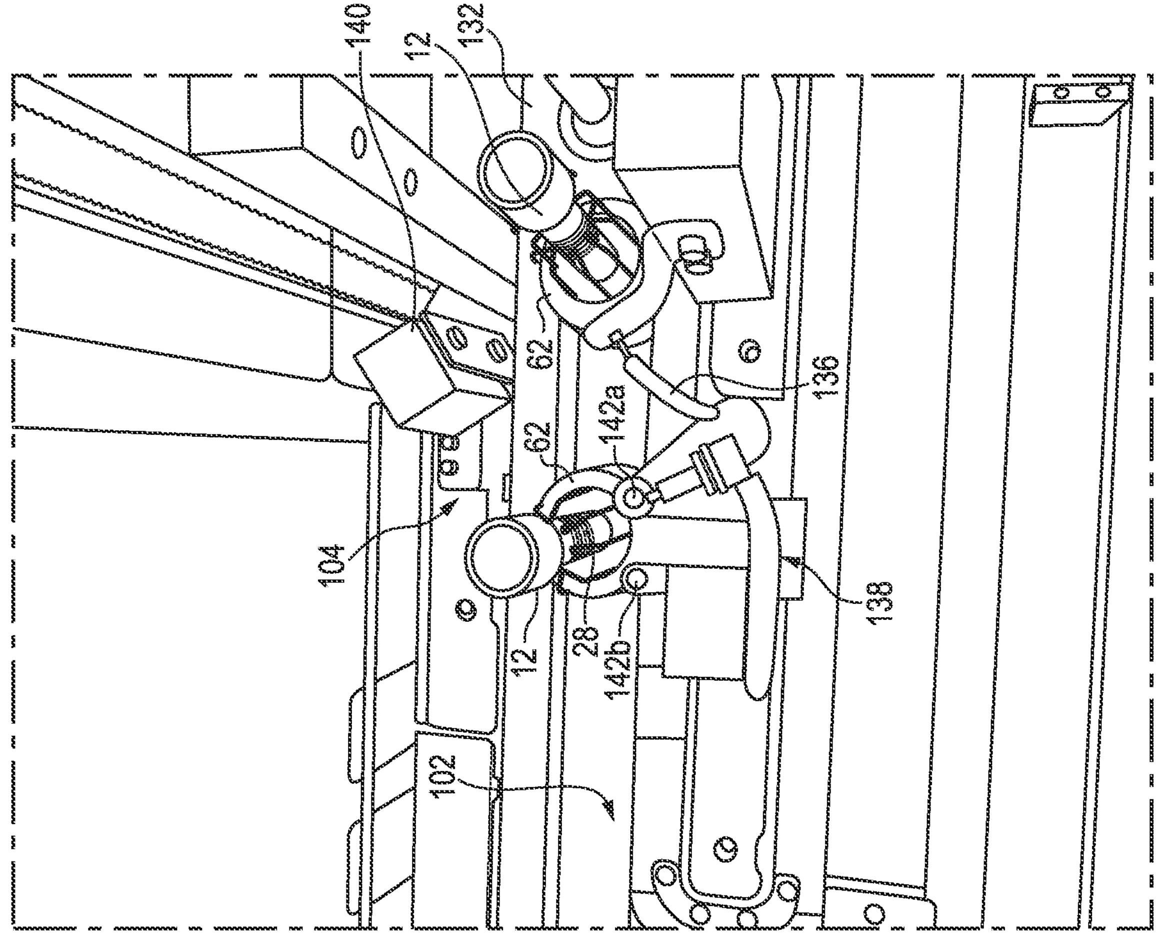
FIG. 12 is a top perspective view of the barcode reader assembly of FIG. 11.

As discussed above, the receptacle storage module **30*d* is configured for automatically receiving, storing, and returning closed receptacles 12 to the conveyor 44. In particular, the loaded receptacle carriers 62 that are tagged by the WMS software module 34 for storage in the receptacle storage module 30*d* are diverted by actuation of the diverter 46 associated with the receptacle storage module 30*d* (shown in FIGS. 1 and 2) from the main conveyor line 48 onto the branch line 102, where the loaded receptacle carriers 62 queue up in a buffer queue 132 of the branch line 102, as illustrated in FIG. 12. The barcode reader assembly 104 individually reads information encoded on the barcodes 28 of the queued receptacles 12 prior to loading and storage of the receptacles 12 in the receptacle storage module 30*d*. Any receptacles 12 previously stored in the receptacle storage module 30*d* that are tagged by the WMS software module 34 for testing by at least one of the analyzer modules 30*b* are individually removed from the receptacle storage module 30*d* and inserted into empty receptacle carriers 62 immobilized by the stop feature 106, which subsequently releases the loaded receptacle carriers 62 to a return 134 of the branch line 102, as illustrated in FIGS. 13 and 14**.

Figure 11:
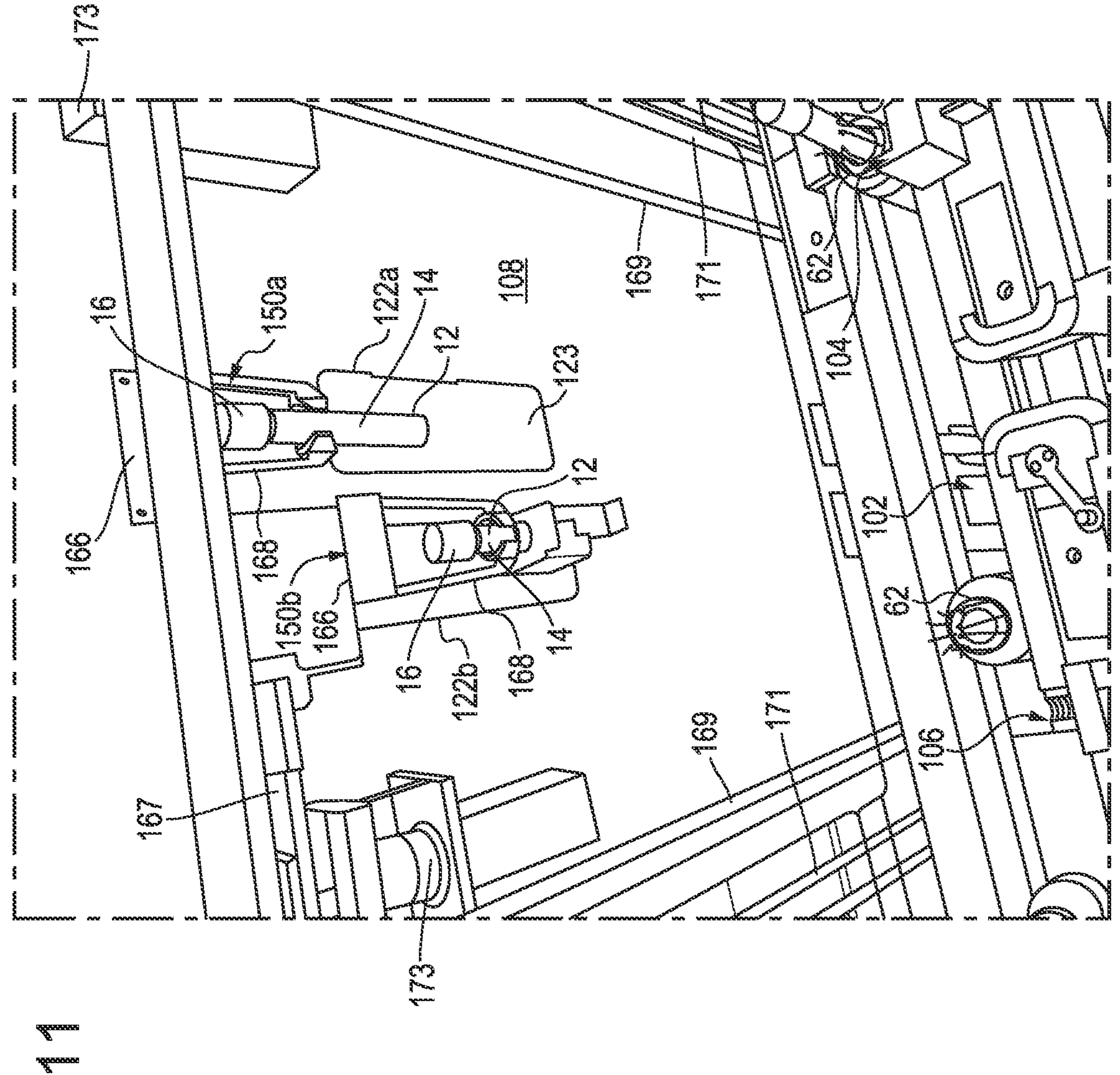
FIG. 11 is a partial, top perspective view of the back of the receptacle storage module of FIG. 7, particularly illustrating exemplary pick-and-place devices, an exemplary barcode reader assembly, and an exemplary stop feature for use with the receptacle storage module.
Figure 13:
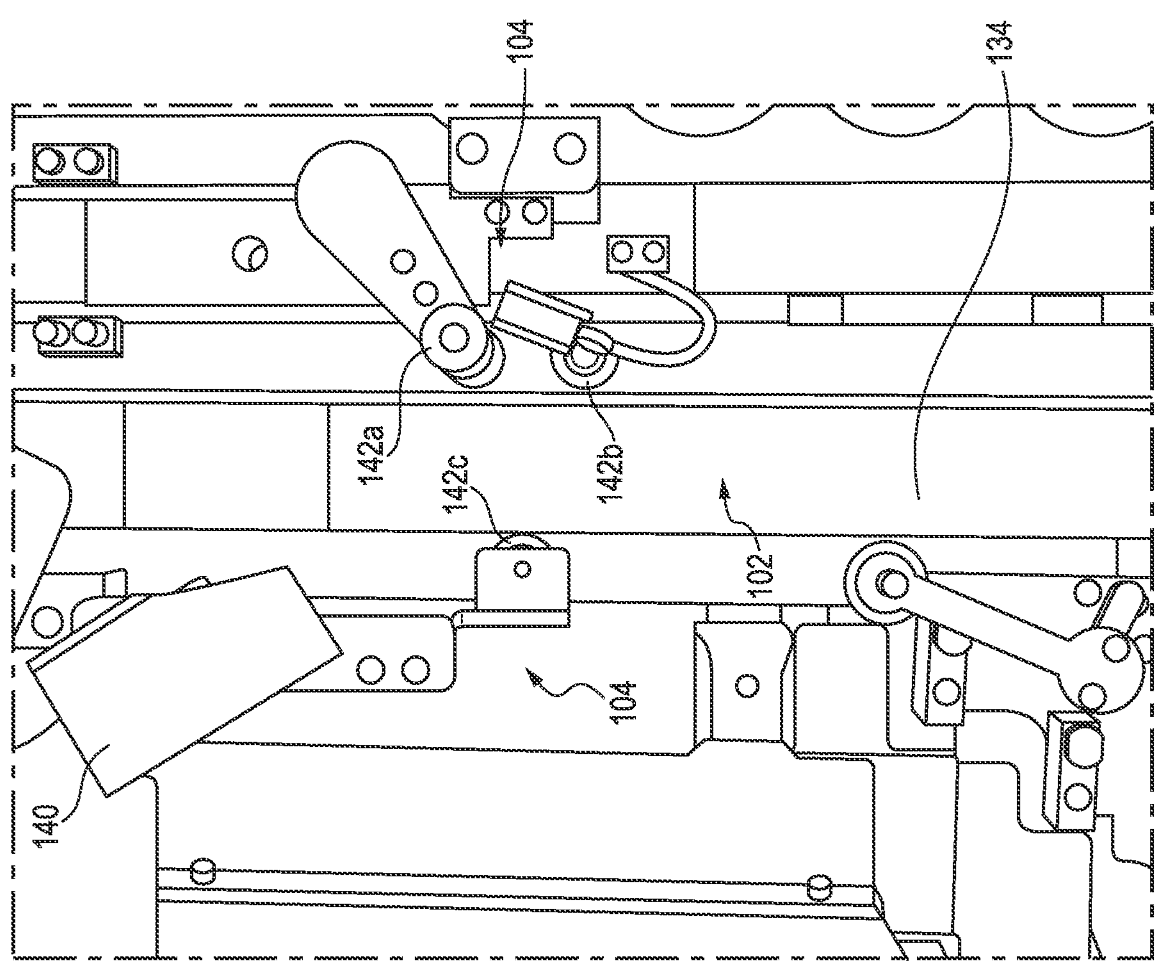
FIG. 13 is a top view of the barcode reader assembly of FIG. 12.

As best shown in FIGS. 11-13, the barcode reader assembly 104 includes a gating mechanism 136, a rotational alignment mechanism 138, and a barcode reader 140. The gating mechanism 136 controls the release of the first loaded receptacle carrier 62 into a buffer queue 132 of the branch line 102, where it proceeds to the rotational alignment mechanism 138. The rotational alignment mechanism 138 engages and rotates the loaded receptacle carrier 62, thereby positioning the receptacle 12 so that the associated barcode 28 can be read by the barcode reader 140. In the illustrated embodiment, the rotational alignment mechanism 138 includes three wheels **142*a*-142*c* that can be moved inward toward each other to frictionally engage the loaded receptacle carrier 62. The loaded receptacle carrier 62 is then rotated back and forth, so that there is at least one time point at which the barcode 28 on the associated receptacle 12 faces and is read by the barcode reader 140. The three wheels 142*a*-142*c* can also be used to immobilize the loaded receptacle carrier 62 while the incoming pick-and-place device 150***a* extracts the receptacle 12 from the receptacle carrier 62 for storage in the receptacle storage module 30*d.*

Figure 14:
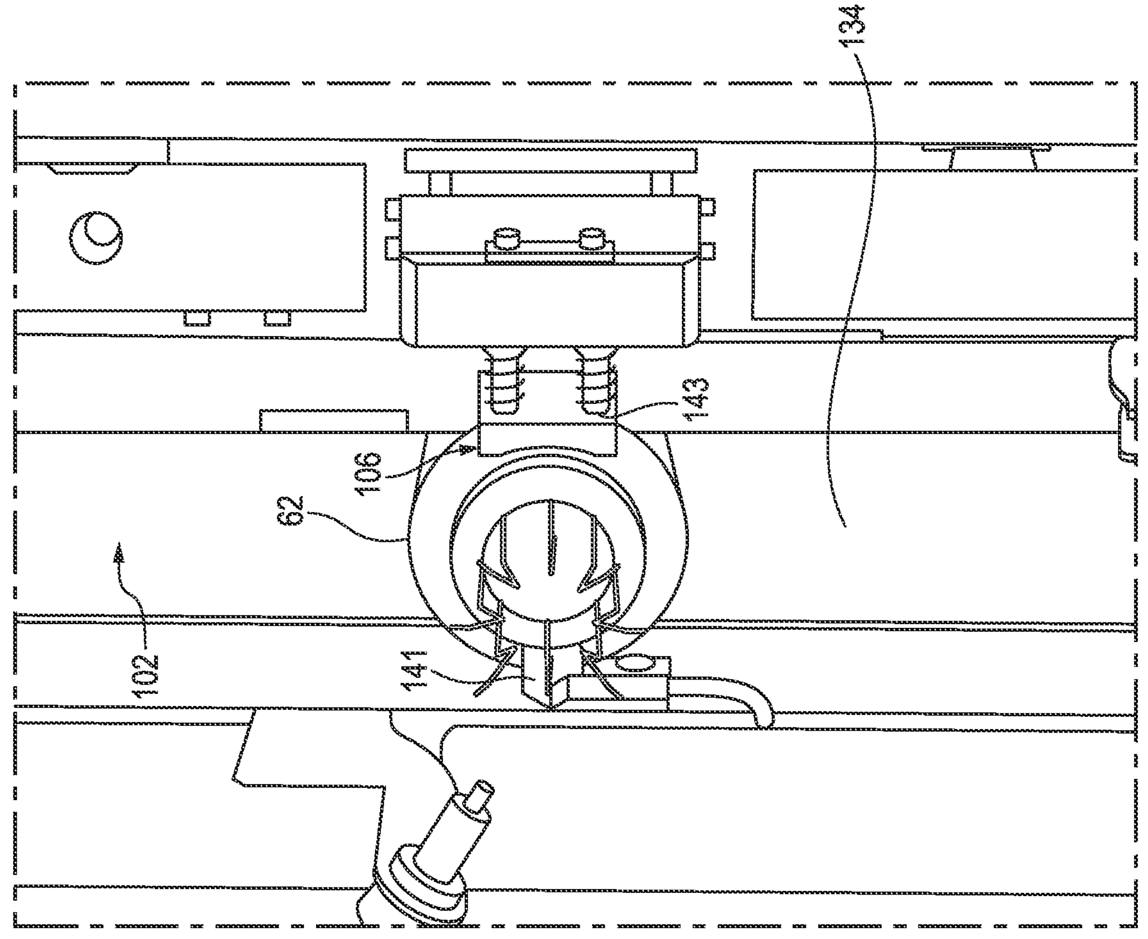
FIG. 14 is a top view of the stop feature of FIG. 11.

As best shown in FIG. 14, the stop feature 106 includes a fixed abutment surface 141 and a movable abutment surface 143 that can alternately (i) move towards the fixed abutment surface 141 to thereby immobilize an empty receptacle carrier 62 while a stored receptacle 12 is retrieved from the receptacle storage module 30*d* and inserted into the immobilized receptacle carrier 62 using the outgoing pick-and-place device 150*a* and (ii) move away from fixed abutment surface 141 to thereby release the loaded receptacle carrier 62 onto the return line 134 of the branch line 102. Preferably, the fixed abutment surface 141 and movable abutment surface 143 are concave and have a radius of curvature equal to the radius of the receptacle carrier 62, thereby maximizing frictional engagement between the stop feature 106 and the receptacle carrier 62.

Figure 15:
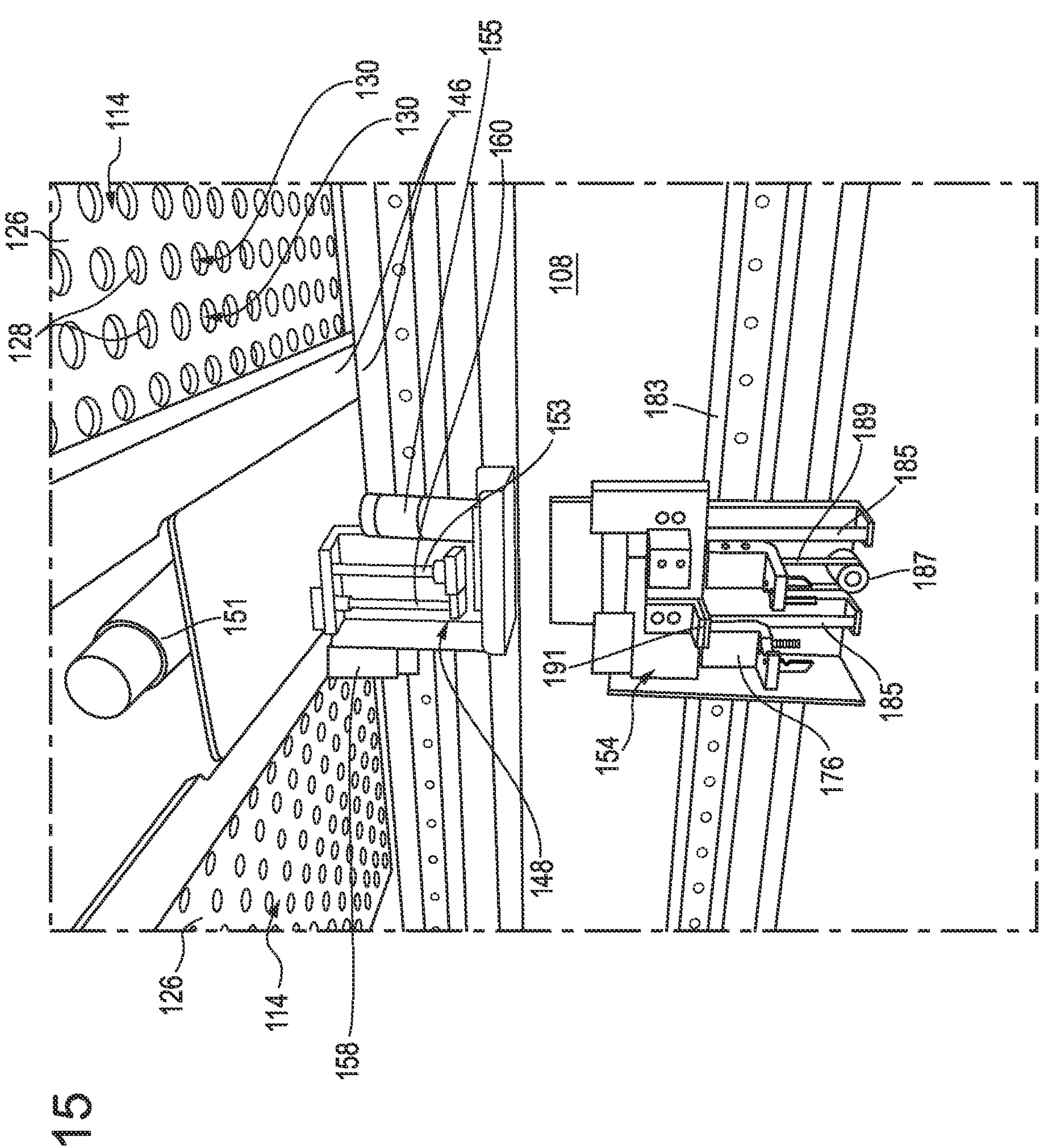
FIG. 15 is an internal view of the receptacle storage module of FIG. 7, particularly showing an exemplary receptacle insertion stop assembly and the robotic handler of FIG. 9.
Figure 16:
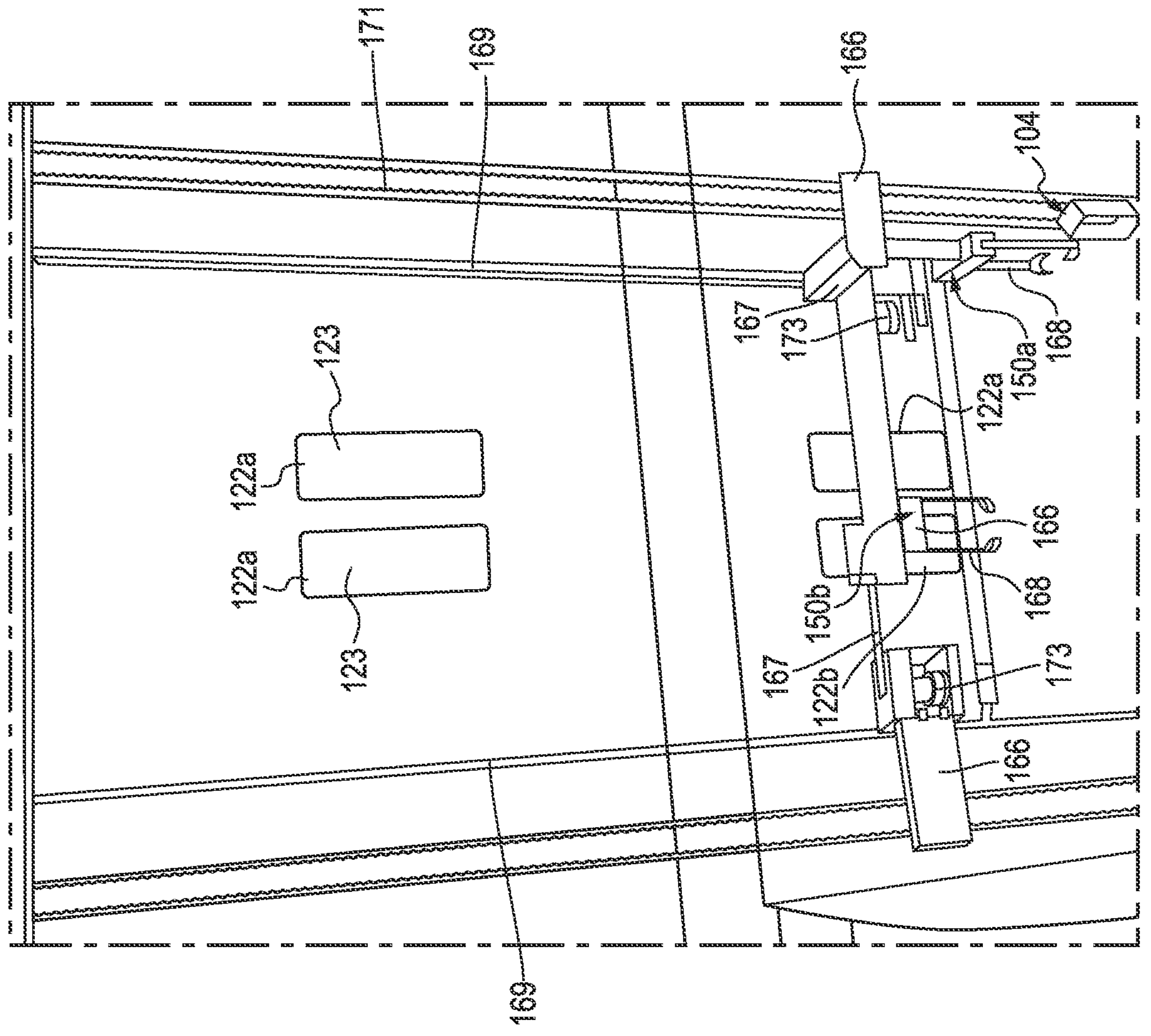
FIG. 16 is a back view of the receptacle storage module of FIG. 7, particularly showing the pick-and-place devices of FIG. 11.

The receptacle storage module 30*d* further includes one or more receptacle insertion stop assemblies 148 (only one shown in FIG. 15), one or more exterior pick-and-place devices 150 (a pair of pick-and-place devices 150*a*, 150*b* in this case, as shown in FIGS. 11 and 16), one or more receptacle transporters 152 (see FIGS. 9 and 17), one or more robotic handlers 154 (see FIGS. 9, 10, 15, 17, and 18), and a controller 156 (shown in FIG. 20) for controlling operation of the components of the receptacle storage module 30*d.*

As best shown in FIG. 15, each of the receptacle insertion stop assemblies 148 is operatively associated with one of the levels 112 and provides a depth insertion stop when a receptacle 12 is being inserted into an empty receptacle slot 130 of the receptacle rack 114 by a robotic handler 154 associated with the same level 112 in a two-step receptacle insertion process (described in further detail below). In particular, each receptacle insertion stop assembly 148 includes a carriage 158 capable of XY movement (i.e., in orthogonal directions along an XY plane situated beneath the receptacle racks 114 of the level 112 operatively associated with the receptacle insertion stop assembly 148) via an orthogonal rail assembly 146 and associated motor 151, and a pin 160 capable of vertical movement. The carriage 158 resides beneath the receptacle rack 114 at the level 112 associated with the receptacle insertion stop assembly 148 and moves to position the pin 160 directly beneath a selected empty receptacle slot 130 of the receptacle rack 114 in which a receptacle 12 is to be inserted. The pin 160 is configured for vertical movement between a first position within the selected empty receptacle slot 130 and a second, retracted position beneath the selected empty receptacle slot 130 via a screw mechanism 153 and associated motor 155 to facilitate controlled insertion and removal of a receptacle 12 into and from the receptacle slot 130. When the pin 160 is in the first position within the selected empty receptacle slot 130, it provides a depth insertion stop for the empty receptacle slot 130 of the receptacle rack 114 when the receptacle 12 is being inserted into the empty receptacle slot 130 during the first step of the two-step receptacle insertion process. When the pin 160 is in the second, retracted position beneath the selected empty receptacle slot 130, the depth insertion stop has been removed from the selected empty receptacle slot 130 prior to seating of the receptacle 12 within the selected empty receptacle slot 130 during the second step of the two-step receptacle insertion process. In an alternative embodiment, rather than being retracted from the receptacle slot 130, the pin 160 may be pushed into (or toward) the second position by a downward force of the receptacle 12 on the pin 160 during the second step of the receptacle insertion process.

As best shown in FIGS. 8, 11 and 16, the pair of pick-and-place devices 150*a*, 150*b* is located on the exterior of the housing 108 and includes the incoming pick-and-place device 150*a*, which is used to deliver receptacles 12 to a position adjacent one of the incoming openings 122*a* in the back, right side of the housing 108, and the outgoing pick-and-place device 150*b*, which is used to remove receptacles 12 from a corresponding position adjacent one of the outgoing openings 122*b* on the back, left side of the housing 108. The incoming pick-and-place device 150*a* is configured for grasping and removing a single closed receptacle 12 from a receptacle carrier 62 that is immobilized by the barcode reader assembly 104. After removing the closed receptacle 12 from the receptacle carrier 62, the incoming pick-and-place device 150*a* transports the closed receptacle 12 to a selected one of the incoming openings 122*a*, the incoming opening 122*a* being associated with one of the levels 112 of the receptacle storage module 30*d*. The outgoing pick-and-place device 150*b* is configured for grasping a single closed receptacle 12 from a selected one of the outgoing openings 122*b*, the outgoing opening 122*b* being associated with one of the levels 112 of the receptacle storage module 30*d*. After grasping the receptacle 12, the outgoing pick-and-place device 150*b* transports the receptacle 12 to an empty receptacle carrier 62 immobilized by the stop feature 106. After the receptacle 12 has been inserted into the receptacle carrier 62 by the outgoing pick-and-place device 150*b*, the receptacle carrier 62 is released by the stop feature 106 onto the return line 134 of the branch line 102.

Each pick-and-place device 150 includes a carriage 166 capable of vertical movement parallel to the back 120 of the housing 108 and between the various levels 112 and the branch line 102 via a vertical rail 169, a pulley belt 171, and an associated motor (not shown). A gripper 168 is mechanically coupled to the carriage 166 by a swivel arm 167 and configured for alternately grasping and releasing a single receptacle 12. The swivel arm 167 is configured for rotating the gripper 168 approximately 90 degrees about an axis between a first position adjacent the back 120 of the housing 108 and a second position offset from the back 120 of the housing 108 via operation of an associated motor 173. The rotation of each gripper 168 facilitates removal or insertion of receptacles 12 from or to the branch line 102 of the receptacle storage module 30*d*, which is offset from the vertical path along which the respective carriage 166 moves.

When the gripper 168 of the incoming pick-and-place device 150*a* is at a level corresponding to the branch line 102 and in the rotationally outward second position offset from the back 120 of the housing 108, the gripper 168 is adjacent the barcode reader assembly 104 on the branch line 102, such that the gripper 168 may pick up a receptacle 12 from an immobilized loaded receptacle carrier 62 held by the barcode reader assembly 104. In contrast, when the gripper 168 of the incoming pick-and-place device 150*a* is positioned at one of the vertical levels 112, and the gripper 168 is in the rotationally inward first position, the gripper 168 will be situated adjacent the incoming window 122*a*, such that the gripper 168 may transfer the receptacle 12 to the receptacle transporter 152 associated with that level 112. In the illustrated embodiment, the gripper 168 grasps the receptacle 14 of the closed receptacle 12 at a location beneath the cap 16 (as best illustrated in FIG. 11), thereby limiting the possibility of cross-contamination between the receptacles 12 caused by the gripper 168.

Figure 18:
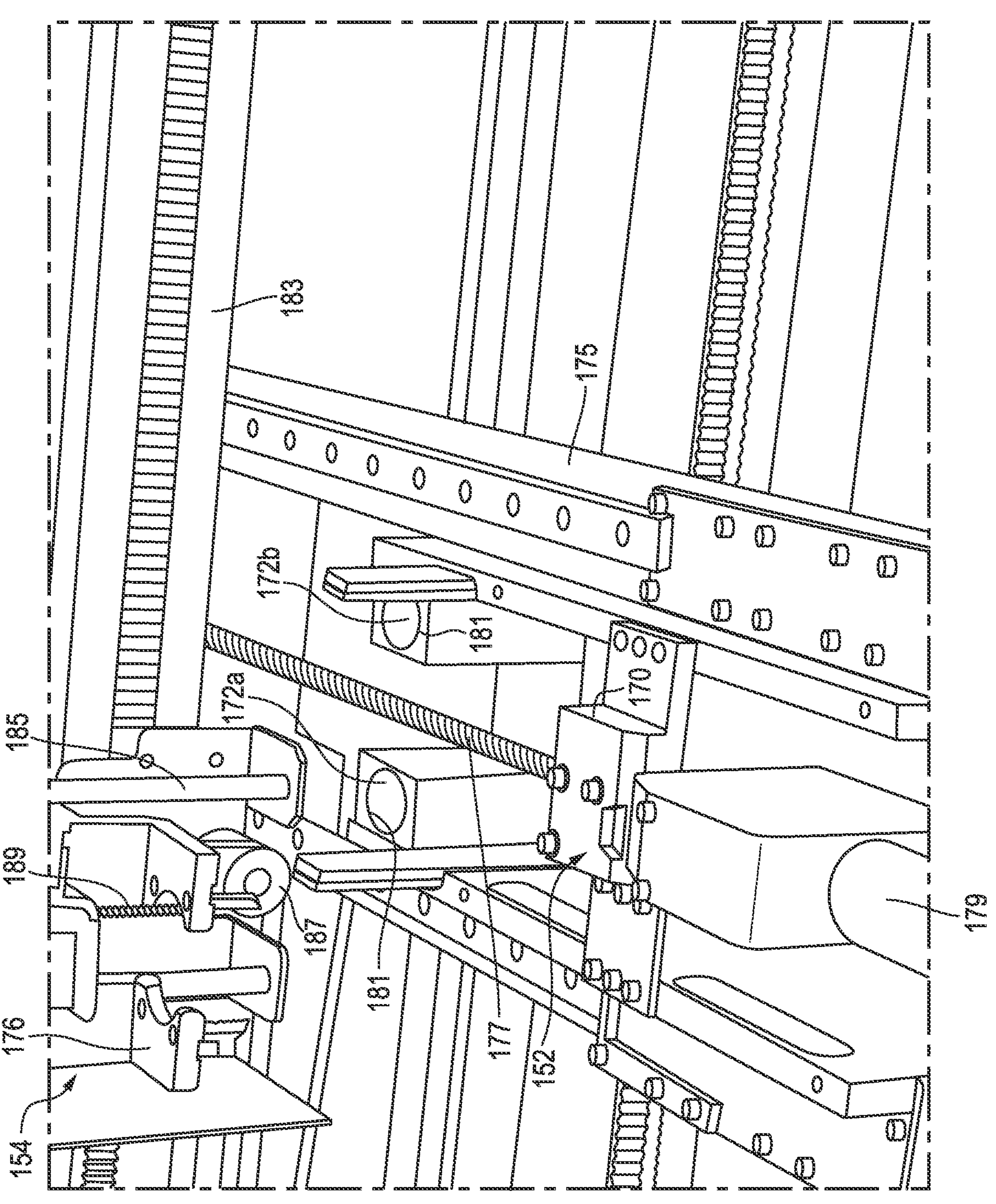
FIG. 18 is another internal view of the receptacle storage module of FIG. 7, particularly showing one of the robotic handlers and one of the receptacle transporters of FIG. 17.

As shown in FIGS. 17 and 18, each of the receptacle transporters 152 is operatively associated with one of the levels 112 (e.g., shelves) contained within the housing 108 of the receptacle storage module 30*d* and, accordingly, an associated pair of openings 122*a*, 122*b*. Each of the receptacle transporters 152 is configured for receiving a single receptacle 12 from the incoming pick-and-place device 150*a* at an incoming pick-up location, which is situated adjacent the incoming opening 122*a* and outside of the housing 108 (see FIGS. 11 and 16), and for delivering a receptacle 12, for pick up by the outgoing pick-and-place device 150*b*, to an outgoing drop-off location, which is situated adjacent the outgoing opening 122*b* and outside of the housing 108 (see FIGS. 11 and 16). The receptacle transporter 152 is further configured for delivering a receptacle 12, for pick up by the robotic handler 154, to an incoming drop-off location, which is situated inside the chamber 110 of the housing 108, and for receiving a single receptacle 12 from the robotic handler 154, at an outgoing pick-up location, which is situated inside the chamber 110 of the housing 108 (see FIG. 18).

Each receptacle transporter 152 takes the form of a shuttle that includes a sled 170 capable of lateral, bi-directional movement along a horizontal plane above the level 112 operatively associated with that receptacle transporter 152 via a rail 175, a drive screw 177, and an associated motor 179. The sled 170 may move between a first location that is proximate the openings 122*a*, 122*b* and a second location that is contained within the housing 108 of the receptacle storage module 30*d* and spaced-apart from the openings 122*a*, 122*b*. As best shown in FIG. 18, each receptacle transporter 152 further includes a pair of holders 172 (an incoming holder 172*a* and outgoing holder 172*b*) operatively associated with the sled 170. Each of the holders 177*a*, 172*b* has a well 181 sized to receive and stably support a single receptacle 12.

When the receptacle transporter 152 is at the first location, the incoming holder 172*a* extends through the incoming opening 122*a* at the incoming pick-up location outside of the housing 108, such that the incoming pick-and-place device 150*a* may transport a receptacle 12 from a receptacle carrier 62 on the branch line 102 of the receptacle storage module 30*d*, and insert the receptacle 12 into a well 181 of the incoming holder 172*a*. Likewise, when the receptacle transporter 152 is at the first location, the outgoing holder 172*b* extends through the outgoing opening 122*b* to the outgoing drop-off location outside of the housing 108, such that the outgoing pick-and-place device 150*b* may remove a receptacle 12 from the well 181 of the outgoing holder 172*b* and transport the receptacle 12 to an empty receptacle carrier 62 on the branch line 102 of the receptacle storage module 30*d*. When the receptacle transporter 152 is at the second location, the incoming holder 172*a* is fully contained within the chamber 110 of the housing 108 at the incoming drop-off location, such that the robotic handler 154 may remove a receptacle 12 from the well 172 of the incoming holder 172*a*, and transport the receptacle 12 to a selected slot 130 of a receptacle rack 114. Likewise, when the receptacle transporter 152 is at the second location, the outgoing holder 172*b* is fully contained within the chamber 110 of the housing 108 at the outgoing pick-up location, such that the robotic handler 154 may transport a receptacle 12 from a selected slot 130 of a rack 114, and insert the receptacle 12 into the well 181 of the outgoing holder 172*b*.

In the illustrated embodiment, the holders 172*a*, 172*b* are independently capable of vertical, bi-directional movement along a horizontal plane between a first, lower elevation when extending through the openings 122*a*, 122*b* to facilitate insertion and/or removal of receptacles 12 into and/or from the wells 181 of the incoming holder 172*a* and the outgoing holder 172*b*, respectively, by the first and second pick-and-place devices 150*a*, 150*b*, and a second, higher elevation when fully disposed within the chamber 110 of the housing 108 to facilitate removal and/or insertion of receptacles 12 from and/or into the wells 181 of the incoming holder 172*a* and the outgoing holder 172*b*, respectively, by the robotic handler 154.

Although the receptacle transporter 152 has been described as having a single sled 170 operatively associated with both an incoming holder 172*a* and outgoing holder 172*b*, in an alternative embodiment, the receptacle storage module 30*d* may include a pair of receptacle transporters 152 (i.e., a dedicated incoming receptacle transporter and a dedicated outgoing receptacle transporter). In this embodiment, the incoming receptacle transporter includes a first sled with which the incoming holder 172*a* is operably associated, and the outgoing receptacle transporter includes a second sled with which the outgoing holder 172*b* is associated. The incoming and outgoing receptacle transporters of this alternative embodiment each include a distinct drive screw and associated motor, thereby allowing the receptacle transporters to operate independent of each other within the receptacle storage module 30*d*.

As shown in FIGS. 9, 15, 17, and 18, each of the robotic handlers 154 is operatively associated with one of the levels 112 of the receptacle storage module 30*d*, such that the incoming holder 172*a* of an associated receptacle transporter 152 is accessible by the associated robotic handler 154 at the outgoing drop-off location at the corresponding level 112, and the outgoing holder 172*b* of the associated receptacle transporter 152 is accessible by the associated robotic handler 154. Thus, each robotic handler 154 is configured for removing the receptacle 12 from the incoming holder 172*a* of the associated receptacle transporter 152, and then inserting the receptacle 12 into a pre-selected empty receptacle slot 130 of a receptacle rack 114 supported at the corresponding level 112, and in reverse fashion, each robotic handler 154 is also configured for removing a receptacle 12 from a pre-selected receptacle slot 130 of one of the receptacle racks 114 at an associated level 112, and then inserting the receptacle 12 into the outgoing holder 172*b* of the associated receptacle transporter 152.

As briefly discussed above, each robotic handler 154 is configured for fully seating a receptacle 12 within a selected slot 130 of a receptacle rack 114 using a two-step receptacle insertion process. In particular, during the first step of the receptacle insertion process, the robotic handler 154 is configured for first gripping and partially inserting the receptacle 12 into the slot 130 (i.e., until the bottom end 20 of the receptacle 12 contacts the tip 164 of the pin 160 that provides an insertion stop between the second support plate 124*b* and the base plate 124*c*, as illustrated in FIG. 18.) During the second step of the receptacle insertion process, the robotic handler 154 is configured for releasing the partially inserted receptacle 12 (while the pin 160 supports the weight of the receptacle 12 to prevent it from descending further and contacting the tapered opening 128*c* of the base plate 124*c*), re-gripping the receptacle 12, and, after the pin 160 has been retracted to a position beneath the base plate 124*c*, inserting the receptacle 12 until the bottom end 20 of the receptacle 12 contacts the tapered opening 128*c* of the base plate 124*c*, as illustrated in FIG. 19. Further details discussing the two-step receptacle insertion process will be discussed below with respect to FIG. 33.

The robotic handler 154 is also configured for removing a receptacle 12 that is seated within a pre-selected receptacle slot 130 of a receptacle rack 114 using a two-step receptacle removal process. In the first step, the pin 160 is moved upward to push against the receptacle 12, thereby partially removing the receptacle 12 from the pre-selected receptacle slot 130 during the first step of the two-step receptacle removal process. Alternatively, the robotic handler 154 partially removes the receptacle 12 from the pre-selected receptacle slot 130, and the pin 160 is then moved upward to support the receptacle 12 prior to the second step of the removal process. The robotic handler 154 may then grip and fully remove the receptacle 12 from the pre-selected receptacle slot 130 during the second step of the receptacle removal process. Further details discussing the receptacle removal process will be discussed below with respect to FIG. 34.

Figure 10:
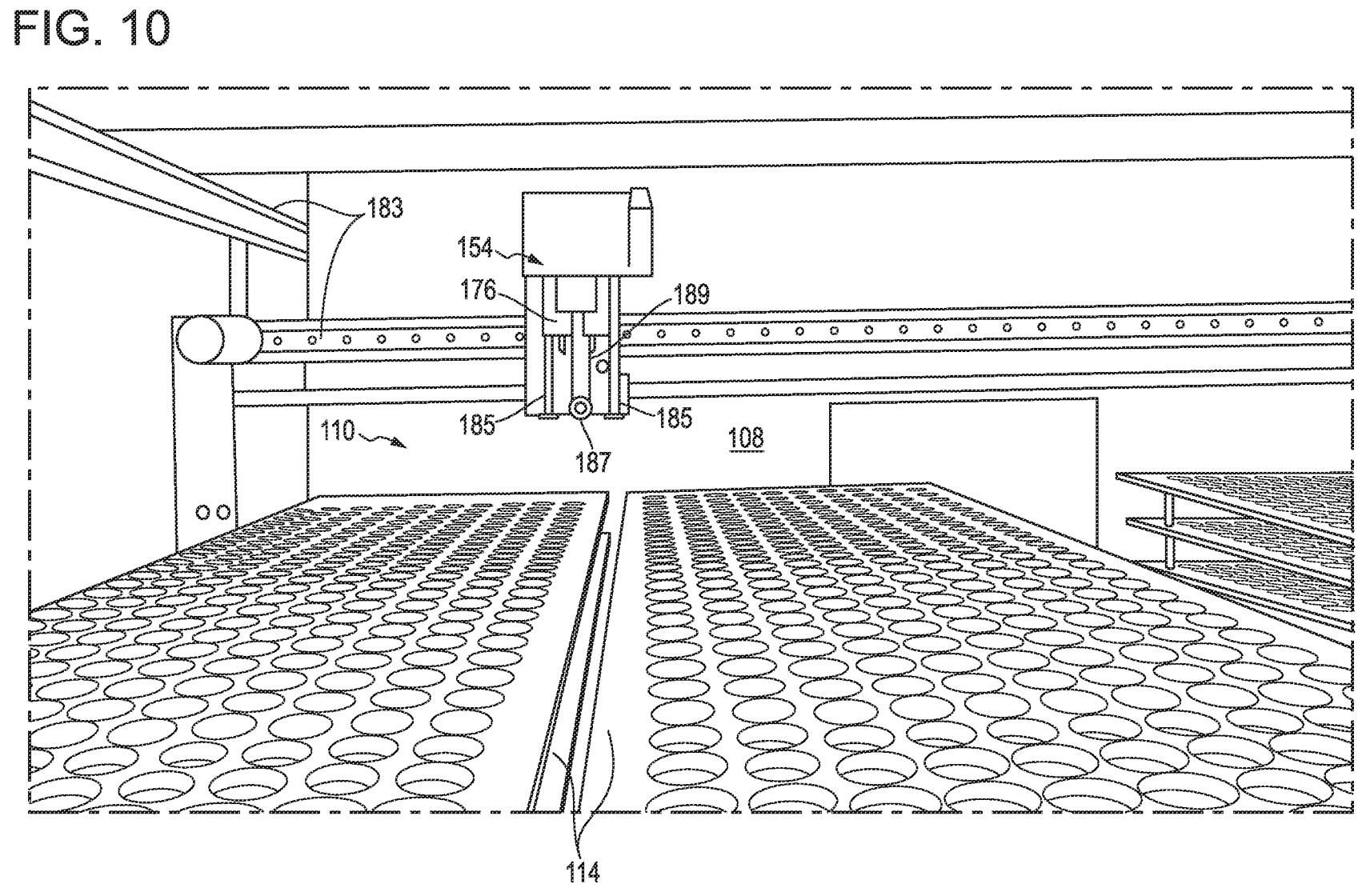

Each robotic handler 154 includes a gantry 174 that is capable of XYZ movement, and a gripper apparatus 176 mechanically coupled to the gantry 174 and configured for selectively gripping and releasing a single closed receptacle 12. The gantry 174 includes a framework of tracks, slides, rails, and carriages, a portion of which is illustrated in FIG. 10. The gantry 174 may be moved with any number of conventional motion-producing mechanisms (e.g., electrical motors, stepper motors, servo motors, pneumatic or hydraulic motors, etc.) and drive mechanisms (e.g., chains and sprockets, guides, pulleys and belt arrangements, gear drives or worm drives, or other conventional drive components). In the illustrated embodiment, the gantry 174 includes an orthogonal rail assembly 183 affixed to the walls of the chamber 110 for orthogonal horizontal movement of the gripper apparatus 176, as illustrated in FIGS. 9, 10, 15, 17, and 18. The gantry 174 further includes a pair of guide posts 185 along which the gripper apparatus 176 moves vertically and a pulley assembly comprising a pulley wheel 187 and a belt 189 that vertically moves the gripper apparatus 176 vertically along the guide posts 185, as illustrated in FIGS. 9, 10, and 15.

Thus, the gantry 174 is configured for transporting a closed receptacle 12 from the incoming holder 172*a* of the associated receptacle transporter 152 to a pre-selected receptacle slot 130 in a receptacle rack 114 supported at an associated level 112 of the receptacle storage module 30*d* by moving the gripper apparatus 176 (*i*) in a lateral direction to vertically align (i.e., one above the other as used herein) the gripper apparatus 176 with the incoming holder 172*a*, (ii) downward to grasp the receptacle 12, (iii) upward to remove the grasped receptacle 12 from the receptacle transporter 152, (iv) laterally to vertically align the gripper apparatus 176 with the pre-selected receptacle slot 130 of the receptacle rack 114, and (v) downward to deposit the receptacle 12 in the pre-selected receptacle slot 130 using the two-step receptacle insertion process.

The gantry 174 is also configured for transporting a stored receptacle 12 from a pre-selected receptacle slot 130 in one of the receptacle racks 114 to the associated receptacle transporter 152 by moving the gripper apparatus 176 (*i*) laterally to vertically align the gripper apparatus 176 with the pre-selected receptacle slot 130 of the receptacle rack 114, (ii) downward to grasp the receptacle 12, (iii) upward to remove the grasped receptacle 12 from the pre-selected receptacle slot 130 using the two-step receptacle removal process, (iv) laterally to vertically align the gripper apparatus 176 with the outgoing holder 172*b* of the associated receptacle transporter 152, and (v) downward to deposit the receptacle 12 in the outgoing holder 172*b*.

Although each robotic handler 154 has been described as including a gantry 174 capable of imparting XYZ movement to the gripper apparatus 176, any suitable type of robotic handler for moving the gripper apparatus 176 in at least one direction may be used. For example, in one embodiment, the robotic handler 154 may be capable of only imparting linear, bi-directional movement to the gripper apparatus 176. Furthermore, instead of performing linear X and/or Y movements (or only performing such movements), the robotic handler 154 may be capable of imparting rotational movements to the gripper apparatus 176.

As best illustrated in FIG. 15, each robotic handler 154 includes a proximity sensor 191 configured for sensing a proximity of the top surface 24 of the closure 16 of a closed receptacle 12 relative to the gripper apparatus 176 to ensure that the gripper apparatus 176 is laterally aligned with the closed receptacle 12 prior to grasping the closed receptacle 12, as described in further detail below.

Figure 20:
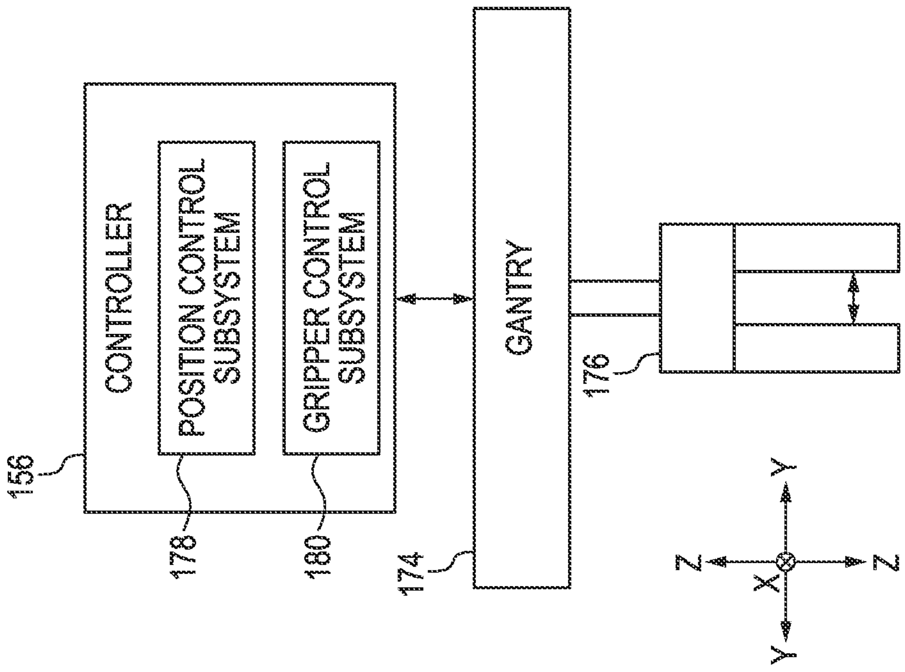
FIG. 20 is a block diagram of a controller and robotic handler of the receptacle storage module of FIG. 7.

Referring now to FIG. 20, the gripper apparatus 176, along with the gantry 174 and controller 156, will be described in further detail. The controller 156 is configured for controlling the movements of each of the robotic handlers 154. To this end, the controller 156 includes (i) a position control subsystem 178 configured for controlling the XYZ movement (x-movement shown along the horizontal axis, y-movement shown along an axis perpendicular to the horizontal axis, and z-movement shown along the vertical axis) of the gantry 174 and, thus, the XYZ positioning of each of the corresponding gripper apparatus 176, and (ii) a gripper control subsystem 180 configured for controlling the grasping movements of the gripper apparatus 176.

The controller 156 may control the motions of each gantry 174 and gripper apparatus 176 in accordance with a pre-programmed routine, and sensors (not shown) or other feedback mechanism may provide electrical signals indicating the current position and grasping state of each gripper apparatus 176 to the controller 156. The controller 156 may take the form of any suitable computer, processor, or the like.

In one embodiment, the robotic handler 154 is designed so that the gripper apparatus 176 does not contact any neighboring receptacles 12 seated in the rack 114 when the closed receptacle 12 is inserted into or removed from the receptacle slot 130. By avoiding contact with neighboring receptacles 12 during insertion and removal of a receptacle 12, a potential source of cross-contamination between receptacles 12 within the receptacle storage module 30*d* is essentially eliminated. As discussed above, this is more important when the closure 30 is a previously penetrated pierceable closure 30*a* (see FIG. 3A).

Figure 21:
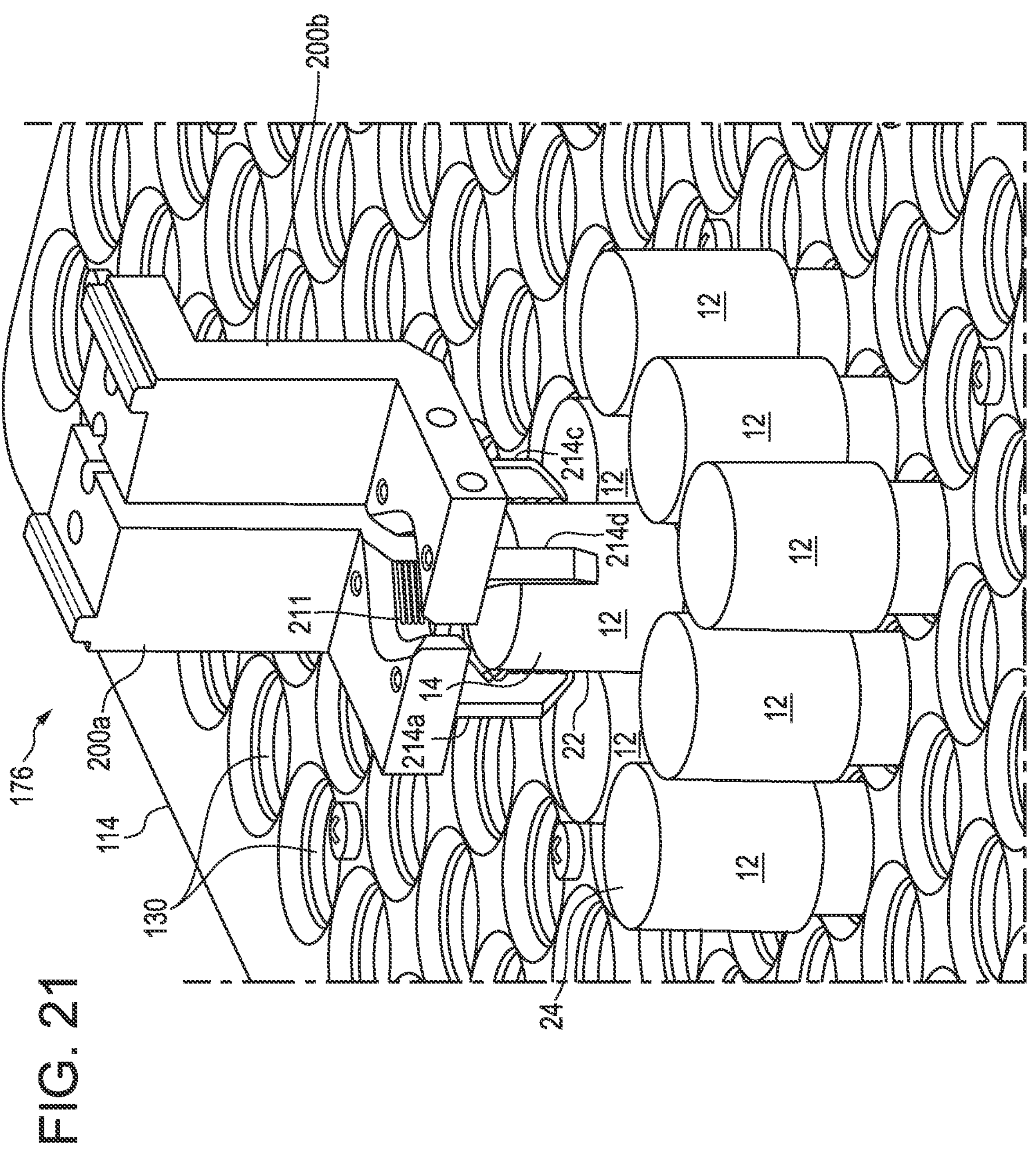
FIG. 21 is a perspective view of an exemplary gripper apparatus of the robotic handler of FIG. 9, particularly showing its use for removing or inserting a receptacle from or into a receptacle slot of the receptacle rack of FIG. 9.

Referring now to FIG. 21, the gripper apparatus 176 of each robotic handler 154 is configured for grasping a closed receptacle 12 and fully seating the closed receptacle 12 within a selected receptacle slot 130 of a rack 114 supported at a level 112 of the receptacle storage module 30*d* and, likewise, grasping and removing a seated receptacle 12 from a selected receptacle slot 130 of the same or a different receptacle rack 114 supported at the same level 112 of the receptacle storage module 30*d* (shown in FIG. 17). To accomplish this, each gripper apparatus 176 includes a pair of opposed, translatable support members, which in the illustrated embodiment is a pair of opposed jaw members 200*a*, 200*b*. The jaw members 200*a*, 200*b* are capable of lateral movement between (i) an extended, open position at which there may be no contact between the jaw members

Figures 23A, 23B:
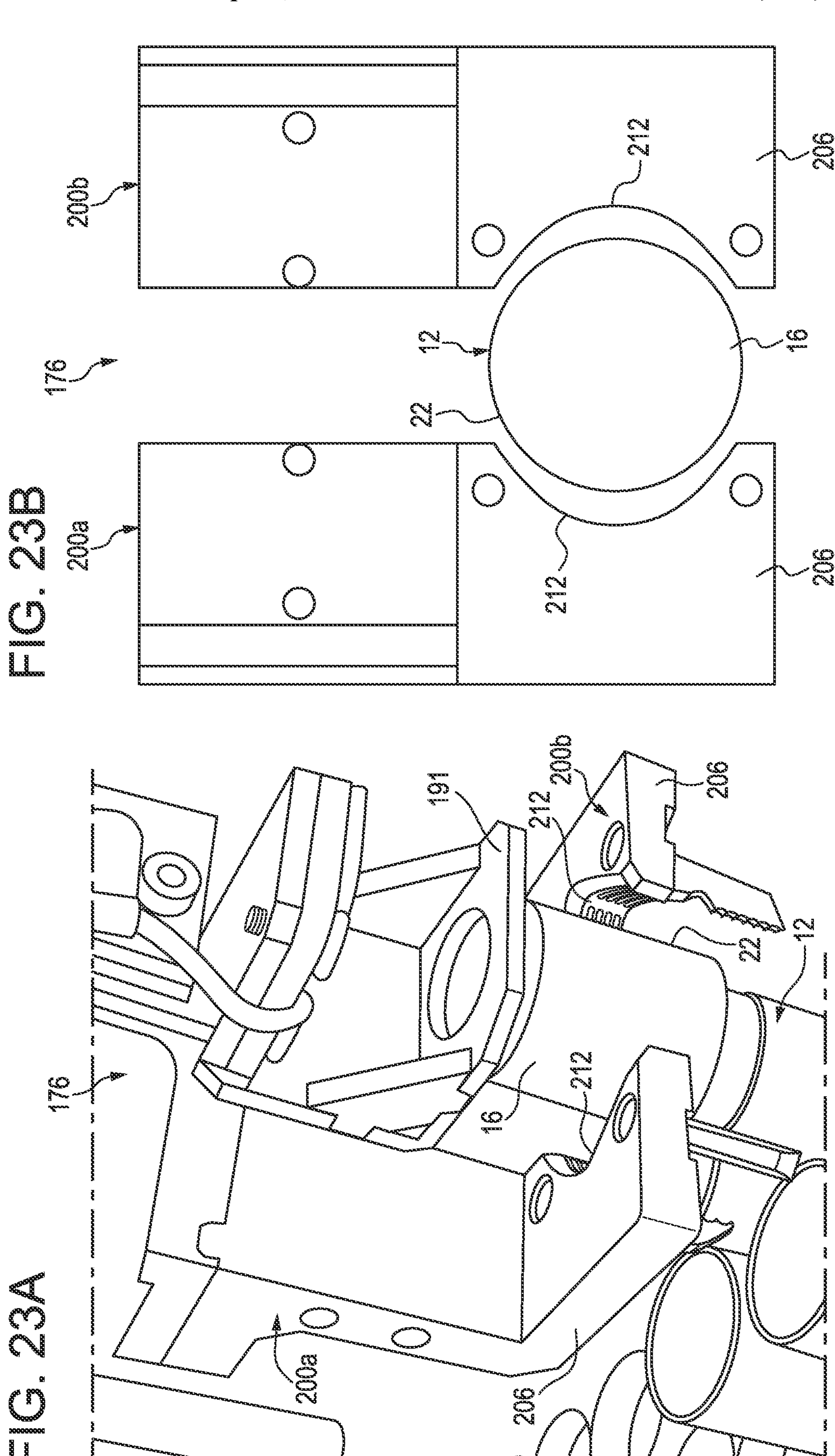
FIG. 23A is a perspective view of the gripper apparatus of FIG. 21, particularly showing jaw members of the gripper apparatus in an open position prior to grasping or subsequent to releasing the cap of the receptacle with the jaw members.
FIG. 23B is a top view of the gripper apparatus of FIG. 21, particularly showing the jaw members in the open position prior to grasping or subsequent to releasing the cap of the receptacle with the jaw members.
Figures 24A, 24B:
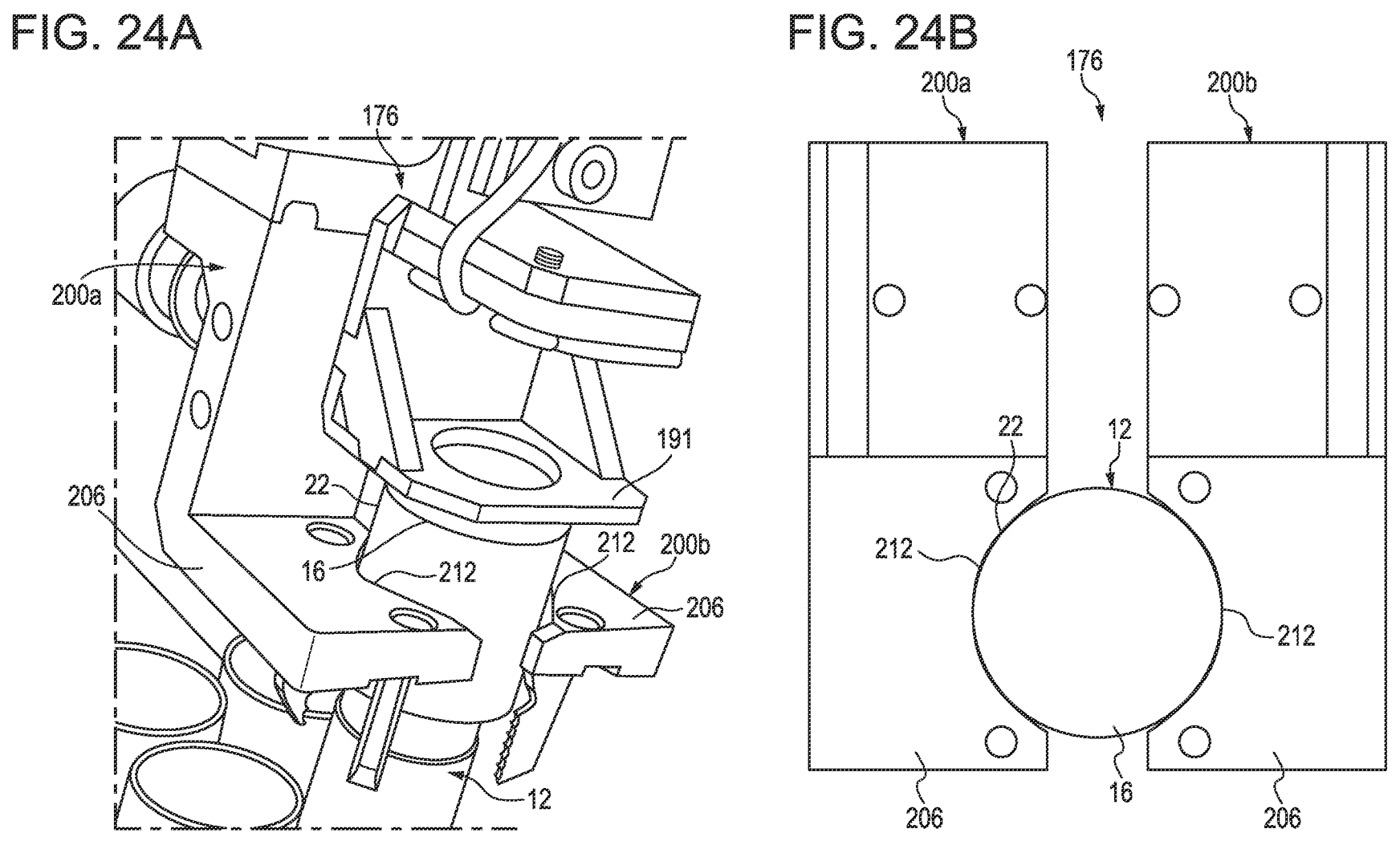

200*a*, 200*b* and a closed receptacle 12 situated between the jaw members 200*a*, 200*b* (see FIGS. 23A and 23B), and (ii) a first closed position at which the jaw members 200*a*, 200*b* can grasp the closed receptacle 12 situated between the jaw members 200*a*, 200*b* (see FIGS. 24A and 24B). As described in further detail below, the jaw members 200*a*, 200*b* may be used to grasp and partially insert a closed receptacle 12 into a selected receptacle slot 130 of a rack 114 supported by a level 112 of the receptacle storage module 30*d* (shown in FIG. 17). The jaw members 200*a*, 200*b* may be composed of a suitably rigid or semi-rigid material, such as stainless steel or polycarbonate.

In the illustrated embodiment, the jaw members 200*a*, 200*b* grasp a sidewall 22 of a closure 16 of the closed receptacle 12 when the jaw members 200*a*, 200*b* are in the first closed position. While the jaw members 200*a*, 200*b* are in the first closed position, the receptacle 12 can be partially inserted into the selected receptacle slot 130. The downward descent of the robotic handler 154 is limited to prevent contact between the gripper apparatus 176 and any adjacently seated receptacles 12 in the receptacle rack 114.

Figure 22:
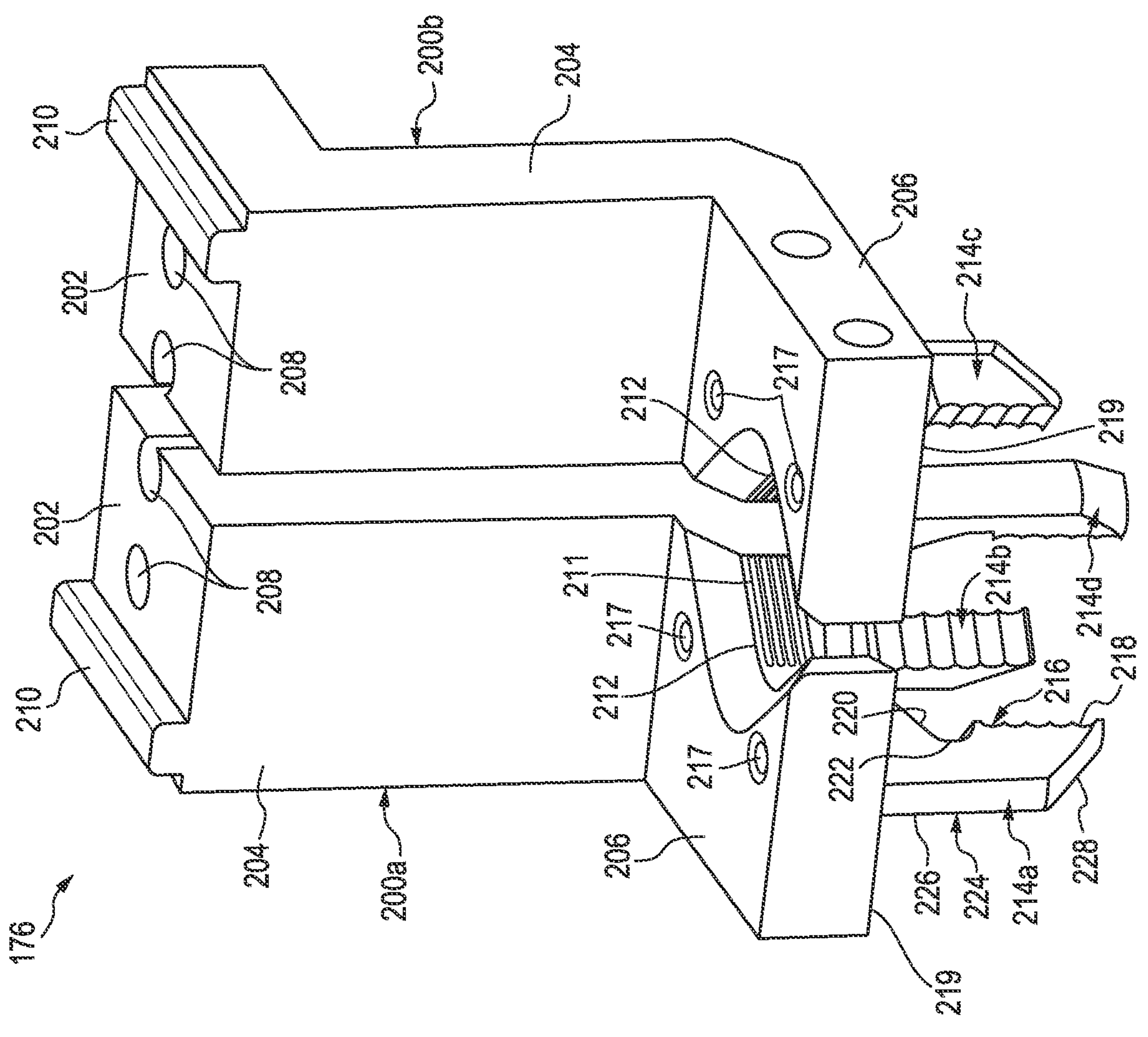
FIG. 22 is a close-up perspective view of the gripper apparatus of FIG. 21.

In an embodiment illustrated in FIG. 22, each of the jaw members 200*a*, 200*b* includes an upper horizontal flange 202 extending in a first direction, which may be directly or indirectly coupled to the gantry 174 of the robotic handler 154, a lower horizontal flange 206 extending in a second direction opposite the first direction, and a vertical member 204 joining the upper and lower horizontal flanges 202, 206. The upper horizontal flanges 202 may be coupled to the gantry 174 of the robotic handler 154 via fasteners (not shown). For example, each of the illustrated jaw members 200*a*, 200*b* includes two holes 208 extending through the upper horizontal flange 202 to facilitate coupling the gripper apparatus 176 to the gantry 174 by such means as rivets, bolt and nut arrangements, or other like fasteners. In the illustrated embodiment, each tipper horizontal flange 202 further includes an upwardly extending ridge 210 which may be used for slidably engaging a corresponding groove (not shown) in the gantry 174 to facilitate and maintain alignment of the jaw members 200*a*, 200*b* relative to the gantry 174.

Figure 25:
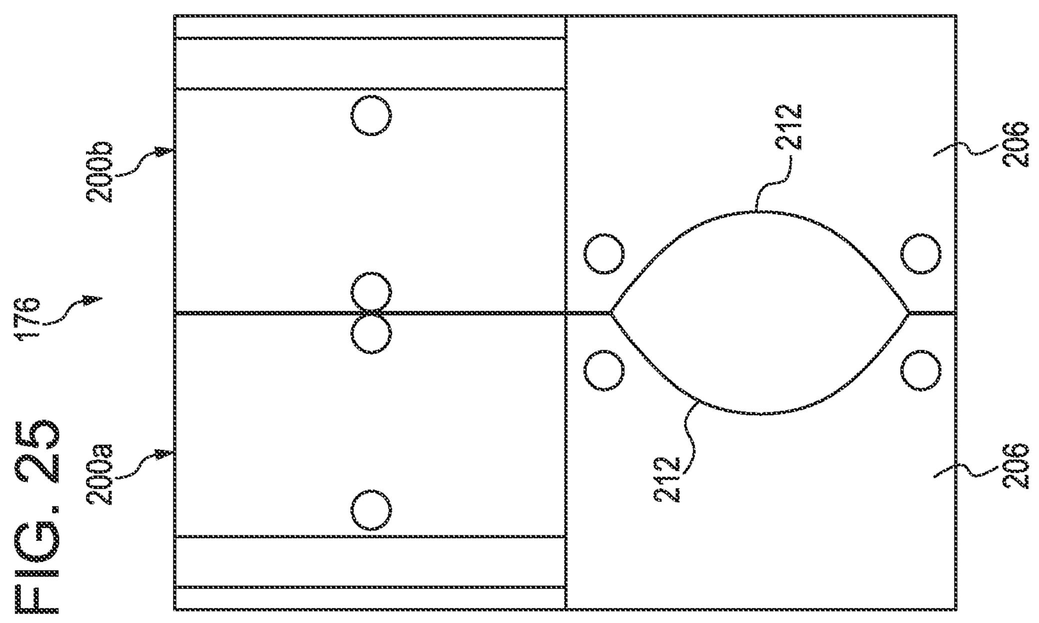
FIG. 25 is a top view of the gripper apparatus of FIG. 21, particularly showing the jaw members contacting each other.
Figures 26A, 26B:
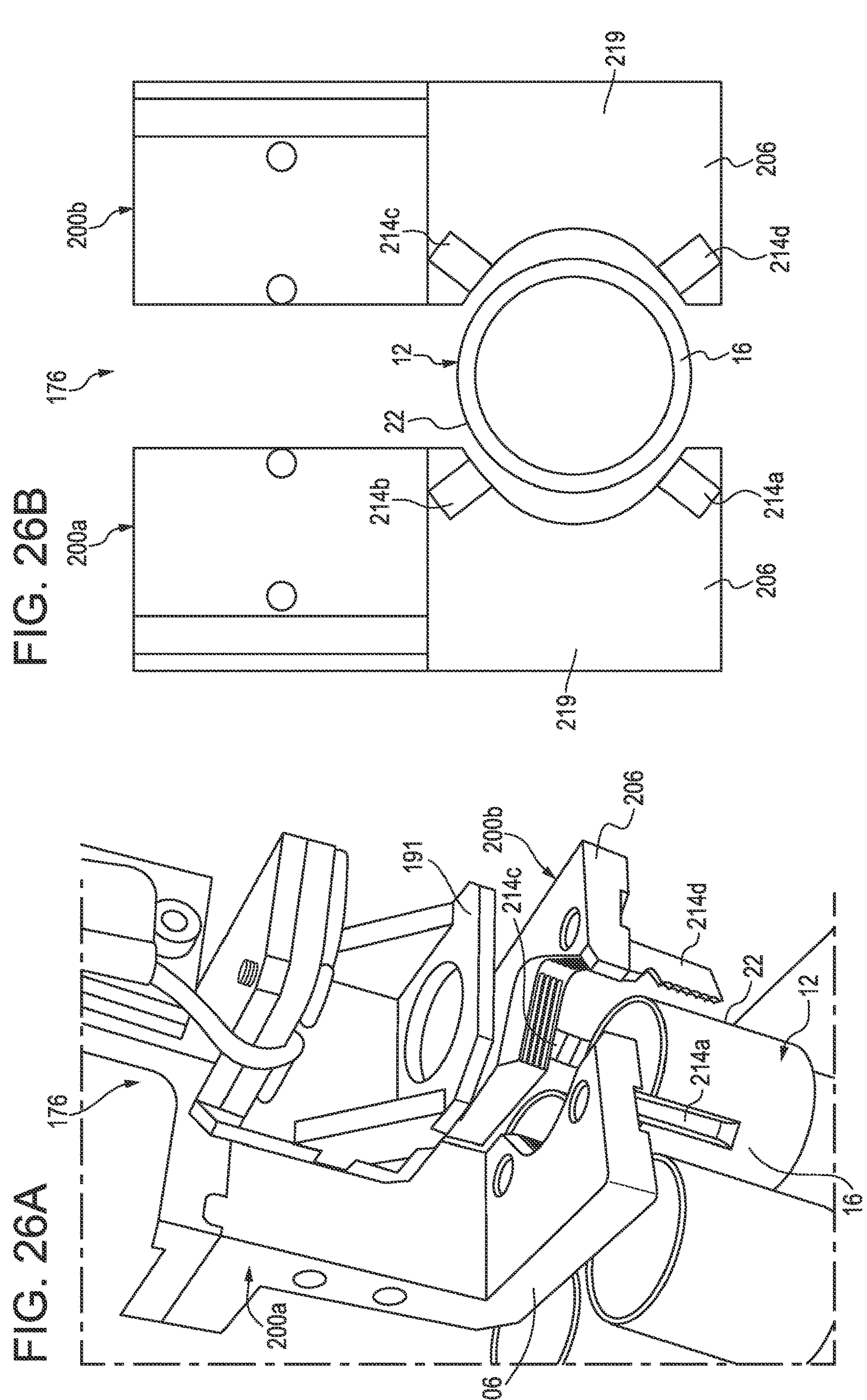
FIG. 26A is a perspective view of the gripper apparatus of FIG. 21, particularly showing the jaw members in the open position prior to grasping or subsequent to releasing the cap of the receptacle with fingers of the gripper apparatus.
FIG. 26B is a bottom view of the gripper apparatus of FIG. 21, particularly showing the jaw members in the open position prior to grasping or subsequent to releasing the cap of the receptacle with the fingers.

The two lower horizontal flanges 206 serve to engage the closed receptacle 12, and to facilitate this engagement, the lower horizontal flanges 206 include opposed, contoured engagement faces 212 for grasping the sidewall 22 of a closure 16 associated with the closed receptacle 12, as illustrated in FIGS. 24A and 24B. In the illustrated embodiment, the contoured engagement faces 212 take the form of generally rounded recesses that are mirror images of each other, such that the contoured engagement faces 212 generally conform the cylindrical sidewall 22 of the closure 16. Preferably, the radius of the closure 16 is commensurate with the radius of curvature of the contoured engagement faces 212, thereby maximizing the area of each contoured engagement face 212 that comes in contact with the sidewall 22 of the closure 16 when the jaw members 200*a*, 200*b* are in the first closed position. As illustrated in FIG. 25, the lower horizontal flanges 206 are capable of contacting each other when a closed receptacle 12 is not disposed between the jaw members 200*a*, 200*b*, such that contoured engagement faces 212 define an opening when the lower horizontal flanges 206 contact each other. In an alternative embodiment, each of the contoured engagement faces 212 may be generally V-shaped, such that there are four contact points between the jaw members 200*a*, 200*b* and the sidewall 22 of the closure 16. The advantages of V-shaped contoured engagement faces will be discussed in further detail below with respect to an alternative embodiment of the gripper apparatus 176. In the illustrated embodiment, the contoured engagement faces 212 are knurled, preferably including a series of laterally oriented grooves 211 that facilitate gripping of the cylindrical sidewall 22 of the closure 16.

It should be appreciated that the jaw members 200*a*, 200*b* are not limited to the illustrated construction and may include any pair of support members capable of coordinated movement to grasp and release the sidewall 22 of a closure 16 secured to a receptacle 14.

Figure 27A:
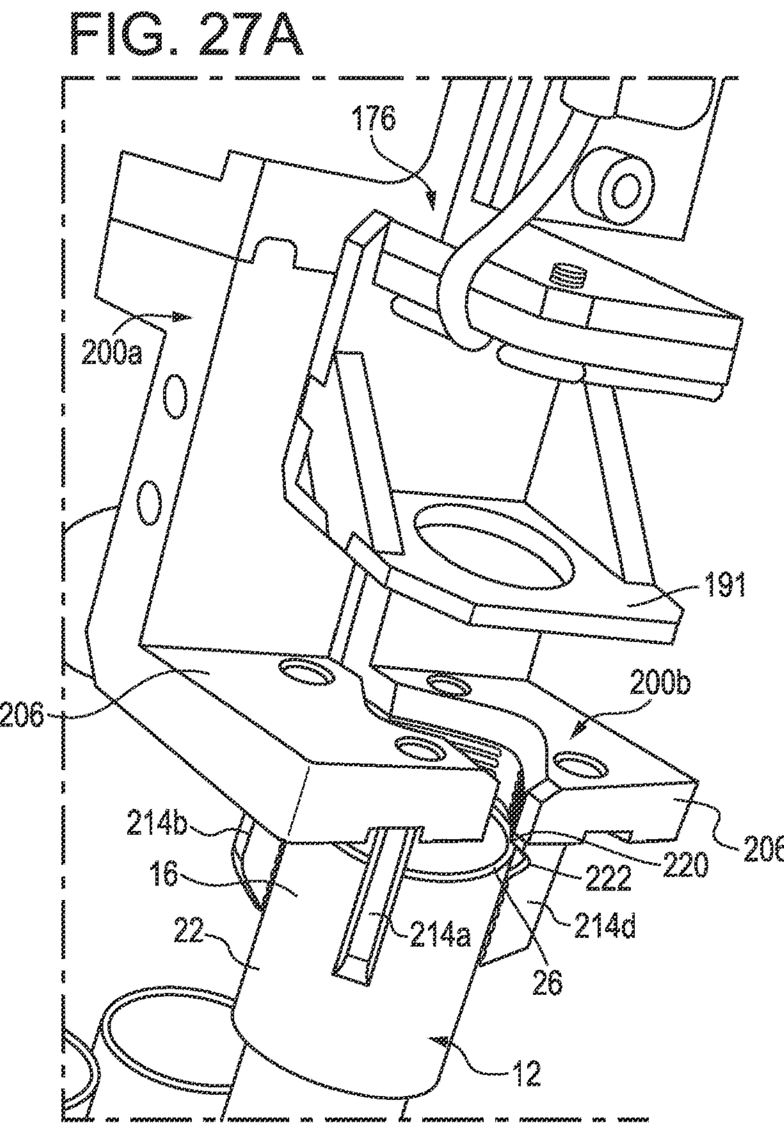
FIG. 27A is a perspective view of the gripper apparatus of FIG. 21, particularly showing the jaw members grasping the cap of the receptacle with the fingers in a second closed position.

Each gripper apparatus 176 further includes a plurality of fingers 214*a*-214*d*, each of which depends from a base 219 (and in this case, the bottom surface of the lower horizontal flange 206) of one of the jaw members 200*a*, 200*b*, as illustrated in FIGS. 21, 22, 26B, 27B. The fingers 214*a*-214*d* are configured for grasping the sidewall 22 of a closure 16 beneath the top surface 24 of the closure 16 when the closure 16 is disposed between the fingers 214*a*-214*d* and beneath the lower horizontal flanges 206 as the jaw members 200*a*, 200*b* move laterally toward each other from the open position (see FIGS. 26A and 26B) to the first closed position (see FIGS. 27A and 271B). As described in further detail below, the fingers 214*a*-214*d*, are used to grasp and seat the closed receptacle 12 within the selected receptacle slot 130 of a rack 114 when the jaw members 200*a*, 200*b* are in a second closed position. The fingers 214*a*-214*d* may be composed of a suitably rigid or semi-rigid material, such as stainless steel or polycarbonate, and may be integrally formed with the respective jaw members 200*a*, 200*b* from which they depend as unibody structures, or they may be coupled to the respective jaw members 200*a*, 200*b* using fasteners 217, e.g., screws or bolts as illustrated in FIG. 22.

In the embodiment illustrated in FIG. 22, the gripper apparatus 176 includes four fingers 214*a*-214*d*, and each of the jaw members 200*a*, 200*b* has two fingers 2141*a*-214*d* depending from the base 219 of one of jaw members 200*a*, 200*b*, in this case from the bottom surfaces of the lower horizontal flanges 206. In the illustrated embodiment, two fingers 214*a*, 214*b* depend from the base 219 of the jaw member 200*a*, and the other two fingers 214*c*, 214*d* depend from the base 219 of the second jaw member 200*b*. The fingers 214*a*-214*d* of the illustrated embodiment extend perpendicular (i.e., in the vertical direction) to the bases 219 of the lower horizontal flanges 206, although in alternative embodiments the fingers 214 may extend from the bases 219 of the jaw members 200 at non-perpendicular angles. In the illustrated embodiment, the four fingers 214*a*-214*d* are circumferentially spaced from each other by 90 degrees when the jaw members 200*a*, 200*b* are in the second closed position, although other circumferential spacings are contemplated.

The gripper apparatus 176 may have any number of fingers 214 permitting the fingers 214 to firmly grip the closure 16. In an alternative example, the gripper apparatus 176 may include three fingers (one finger 214 depending from the base 219 of one of the jaw members 200 and two fingers 214 depending from the base 219 of the other one of the jaw members 200). In this example, the three fingers 214 may be circumferentially spaced from each other by about one hundred twenty degrees when the jaw members 200*a*, 200*b* are in the second closed position. In another example, the gripper apparatus 176 may include six fingers (three fingers depending from the base 219 of each of the two jaw members 200). In this case, the six fingers 214 may be circumferentially spaced from each other by about 60 degrees when the jaw members 200*a*, 200*b* are in the second closed position.

Figure 28:
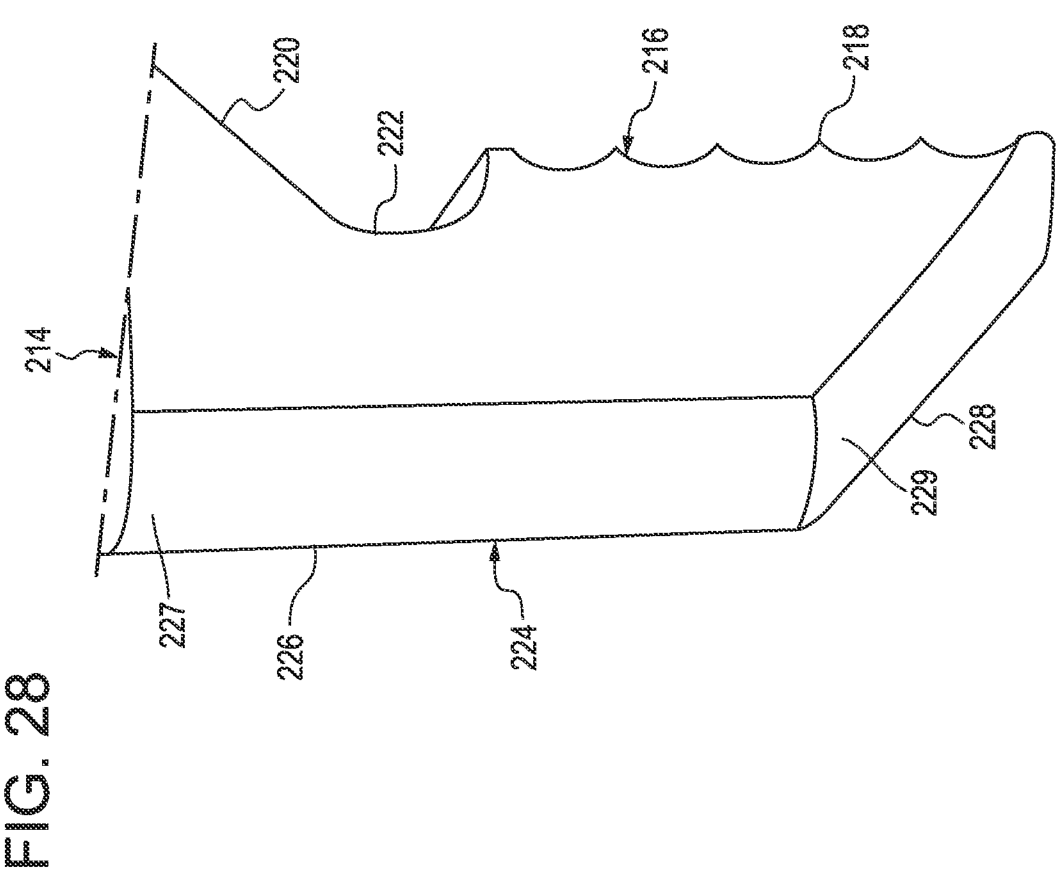
FIG. 28 is a perspective close-up view of one finger of the gripper apparatus of FIG. 21.

Referring further to FIG. 28, each of the fingers 214*a*-214*d* includes an inner surface 216 divided between a lower region 218 (or contact face 218), an upper region 220 adjacent the base 219 (e.g., the lower horizontal flange 206) of the respective jaw member 200*a*, 200*b*, and a recess 222 between the lower region 218 and upper region 220 (i.e., adjacent to and immediately above the contact face).

Figure 27B:
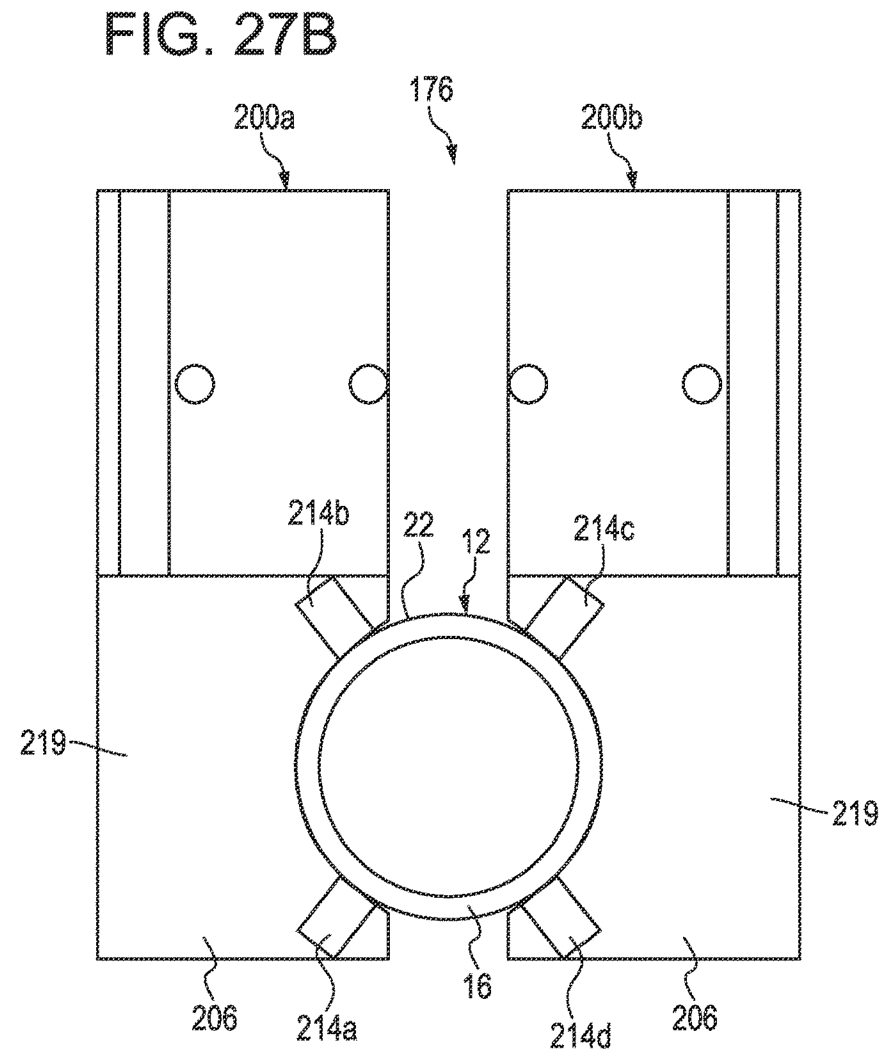
FIG. 27B is a bottom view of the gripper apparatus of FIG. 21, particularly showing the jaw members grasping the cap of the receptacle with the fingers in the second closed position.

The contact face 218 of each of the fingers 214*a*-214*d* is configured for engaging the sidewall 22 of the closure 16 when the closure 16 is situated beneath the base 219 of each of the jaw members 200*a*, 200*b* and between the contact faces 218 of the fingers 214*a*-214*d*. In the illustrated embodiment, the combination of the fingers 214*a*-214*d* has a grasping force of at least one pound and, more preferably, at least five pounds. In the illustrated embodiment, the contact face 218 of each of the fingers 214*a*-214*d* is serrated to prevent the fingers 214*a*-214*d* from slipping on the sidewall 22 of the closure 16 when the gripper apparatus 176 applies a downward force against any opposing force in a receptacle slot 130. As illustrated in FIG. 27B, the contact face 218 of each of the fingers 214*a*-214*d* may be oriented toward an axial center of the closure 16 when the sidewall 22 of the closure 16 is grasped by the fingers 214*a*-214*d* in the second closed position.

Figure 29:
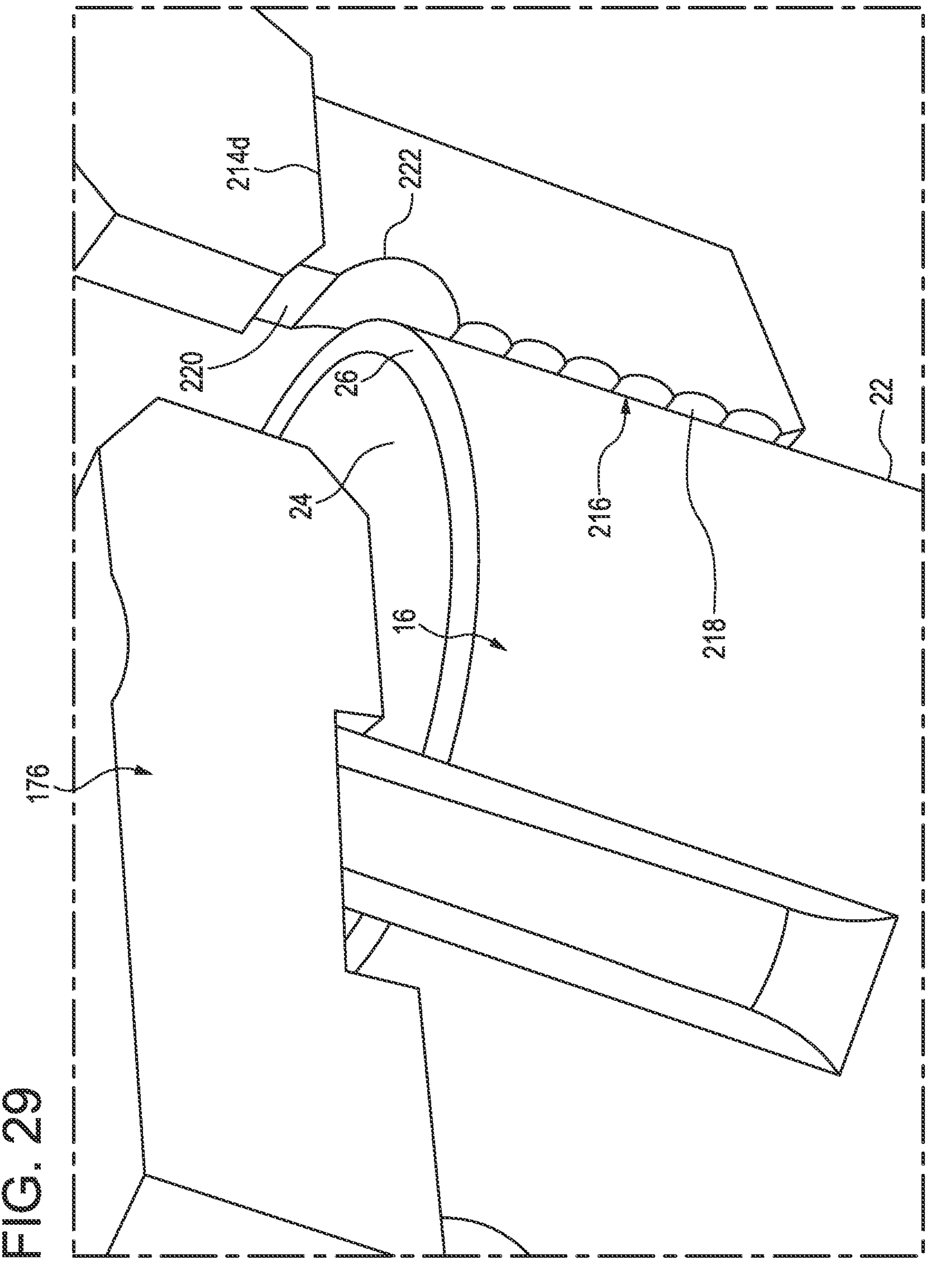
FIG. 29 is a perspective close-up view of the finger of FIG. 28 engaging the cap of the receptacle, particularly showing no contact between a recess of the finger and the cap of the receptacle when there is slippage between the finger and the cap of the receptacle.

As illustrated in FIG. 29, the recesses 222 are configured such that there is no contact between the contact faces 218 of the fingers 214*a*-214*d* and the top surface 24 of the closure 16 when the jaw members 200*a*, 200*b* are in the second closed position (the contact faces 218 of the fingers 214*a*-214*d* grasp the sidewall 22 of the closure 16 below a rim 26 of the closure 16 when the jaw members 200*a*, 200*b* are in the second closed position), thereby ensuring that contact between the gripper apparatus 176 and the top surface 24 of the closure 16 is avoided.

When the contact face 218 of each finger 214*a*-214*d* is in contact with the sidewall 22 of the closure 16, the upper region 220 of the contact face 218 of each finger 214*a*-214*d* is configured for being disposed above, but not contacting, the top surface 24 of the closure 16. In the illustrated embodiment, the upper region 220 of the contact face 218 of each finger 214*a*-214*d* slopes inward from the recess 222 toward the base 219 (or toward the engagement faces 212 of the lower flanges 206) of the respective jaw member 200, such that when the sidewall 22 of the closure 16 is grasped by the fingers 214*a*-214*d* at the second closed position, at least a portion of the upper region 220 of the contact face 218 is situated directly above the top surface 24 of the closure 16. Thus, in the event there is any slippage between the contact faces 218 of the fingers 214 and the sidewall 22 of the closure 16, the upper region 220 of the inner surface 216 will contact the rim 26 of the closure 16, thereby preventing contact between the bases 219 of the jaw members 200*a*, 200*b* and the top surface 24 of the closure 16, as illustrated in FIG. 29. Furthermore, sloping the upper region 220 of the inner surface 216 toward the base 219 of the respective jaw member 200 serves to strengthen the respective finger 214*a*-214*d*, thereby increasing the grasping force of the fingers 214*a*-214*d*. The upper region 220 of the inner surface 216 may have another orientation, such as vertical, if, for example, slippage of between the closure 16 and the fingers 214*a*-214*d* is not a significant concern.

As shown in FIG. 28, each of the fingers 214*a*-214*d* includes an outer surface 224 having a generally vertical upper region 226 having a rounded end surface 227 and an inwardly tapered lower region 228 having a rounded end surface 229. The tapered lower regions 228 can aid in positioning the fingers 214*a*-214*d* within the spaces defined by the closures 16 of neighboring receptacles 12 supported by the receptacle rack 114 when the jaw members 200*a*, 200*b* are in the second closed position. In circumstances where the fingers 214*a*-214*d* contact the closures 16 of receptacles 12 seated in neighboring receptacle slots 130 of the receptacle rack 114, the outer surfaces 224 of the fingers 214*a*-214*d* are shaped to slidably contact the rims 26 (not the top surfaces 24) of the contacted closures 16, thereby allowing continued downward movement of the grasped receptacle 12 into the selected receptacle slot 130.

Figures 30A, 30B:
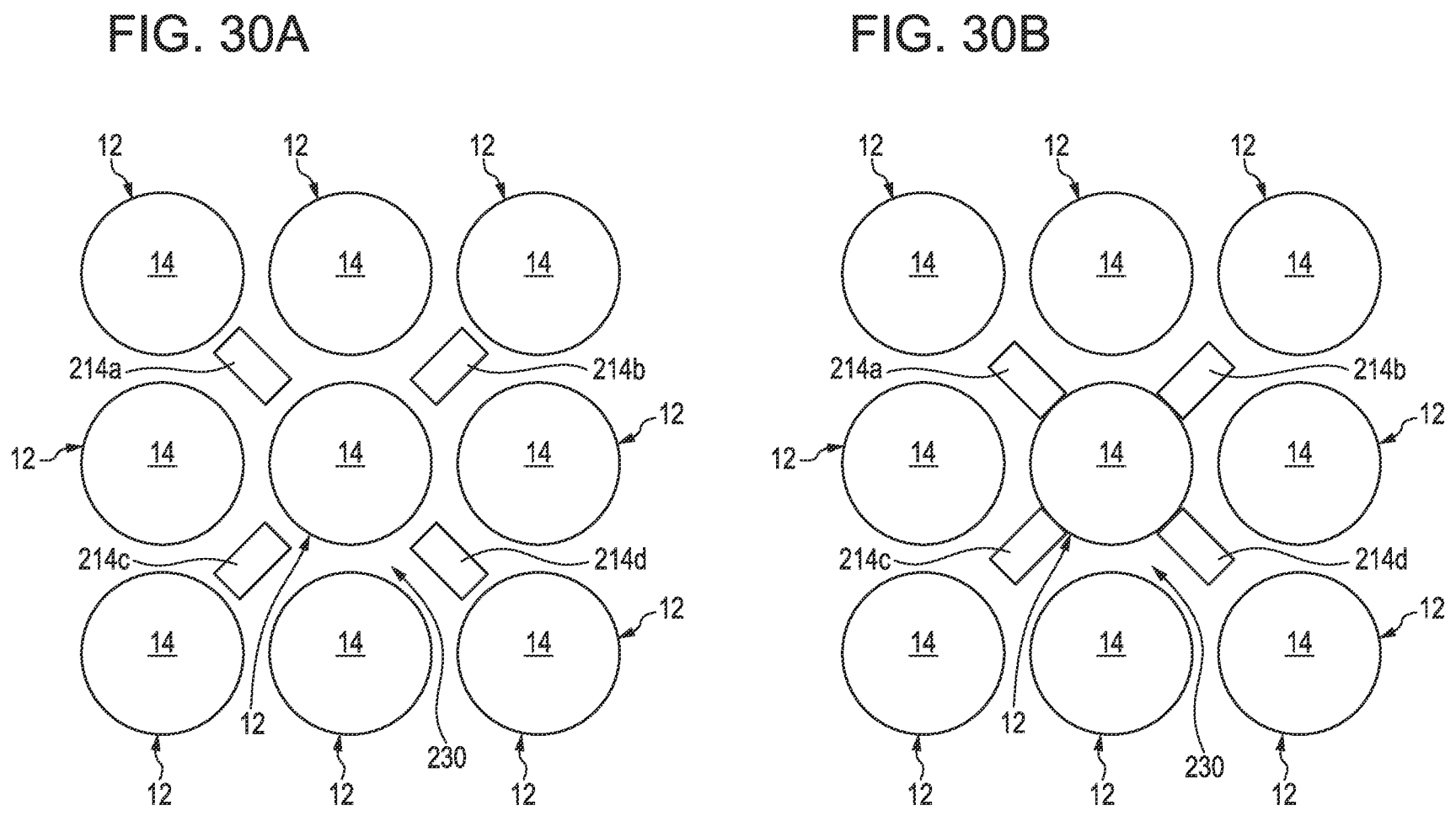

Furthermore, the fingers 214*a*-214*d* of the gripper apparatus 176 are sized and arranged so that the fingers 214*a*-214*d* fit within the interstitial spaces 230 defined by the outline of the closures 16 of neighboring receptacles 12 seated in the respective slots 130 of a receptacle rack 114 when the jaw members 200*a*, 200*b* are (i) in the second closed position when the grasped receptacle 12 is seated in a slot 130 of the receptacle rack 114 (see FIG. 30B); (ii) in the open position immediately prior to grasping a receptacle 12 for removal from a slot 130 of the receptacle rack 114 (see FIG. 30A); and (iii) in the open position immediately after releasing a receptacle 12 inserted into a slot 130 of the receptacle rack 114 (see FIG. 30A). As illustrated, the dimensions of the interstitial spaces are greatest in the regions situated at about 45 degrees relative to the rows and columns of the seated receptacles 12. As such, the fingers 214*a*-214*d* are likewise oriented about 45 degrees relative to the rows and columns of the seated receptacles 12.

Figure 47:
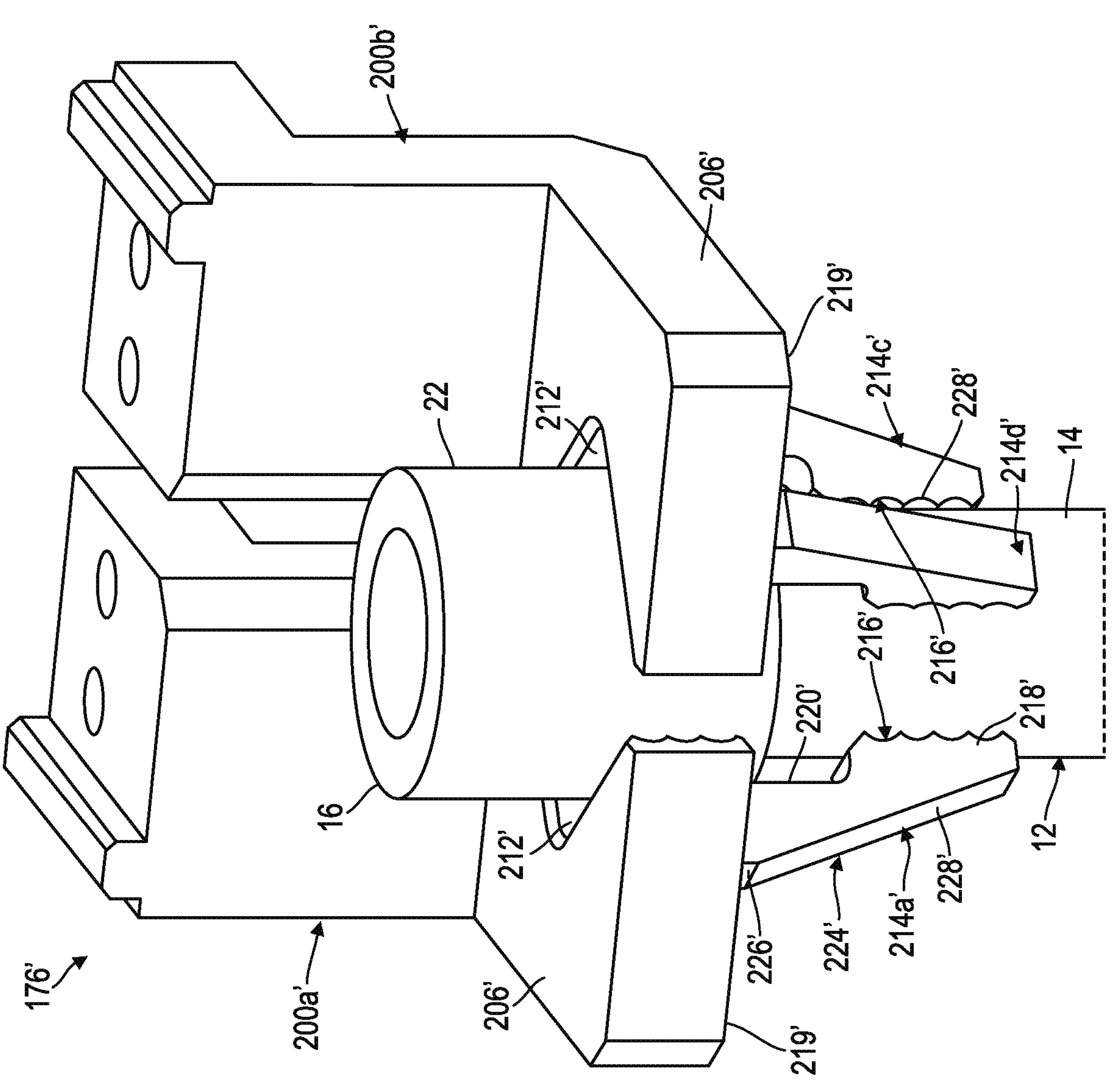
FIG. 47 is a perspective view of another gripper apparatus of the robotic handler of FIG. 9 grasping the cap and receptacle of a closed receptacle.
Figure 48:
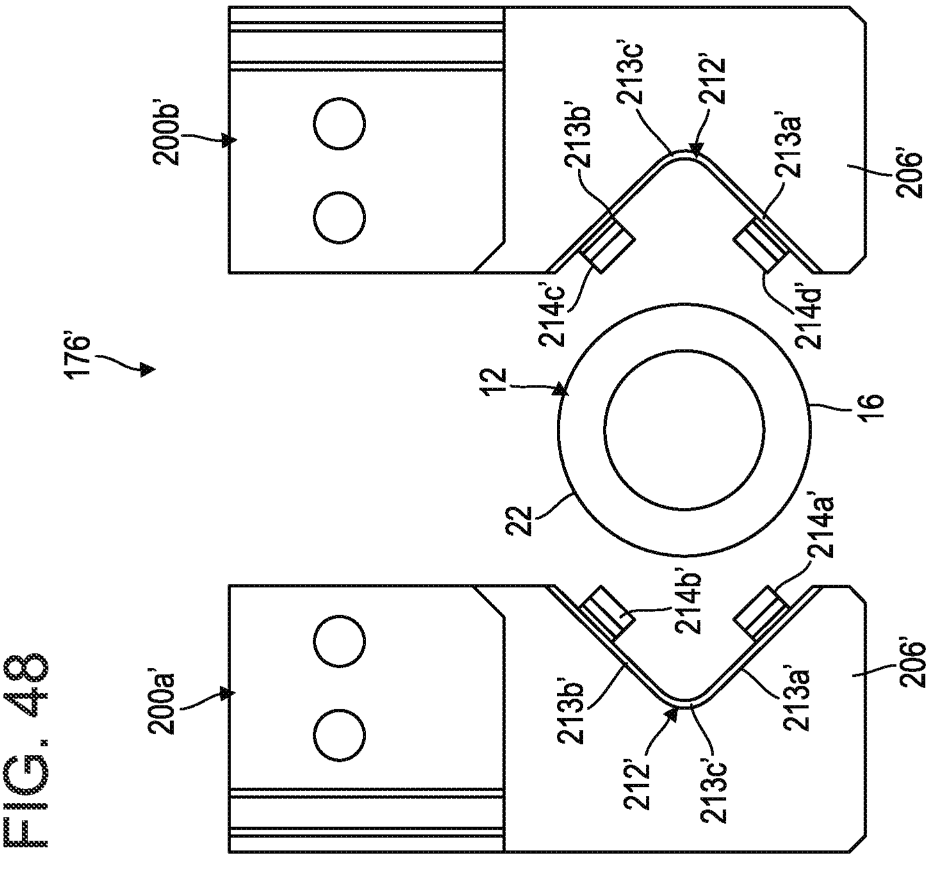
FIG. 48 is a top view of the gripper apparatus of FIG. 47, showing the jaw members in the open position prior to grasping or subsequent to releasing the cap of the closed receptacle.

Referring now to FIG. 47, an alternative gripper apparatus 176' is illustrated that modifies the positioning of the fingers 214*a'*-214*d'*. In this embodiment, the fingers 214*a'*-214*d'* are positioned beneath the jaw members 200*a'*, 200*b'* so that they can facilitate gripping and proper alignment of a closed receptacle 12. Like features of the two embodiments of the gripper apparatus 176, 176' are identified with like reference numbers in the figures (reference numbers associated with features of the second embodiment of the gripper apparatus 176' are followed by a prime symbol).

Figure 49B:
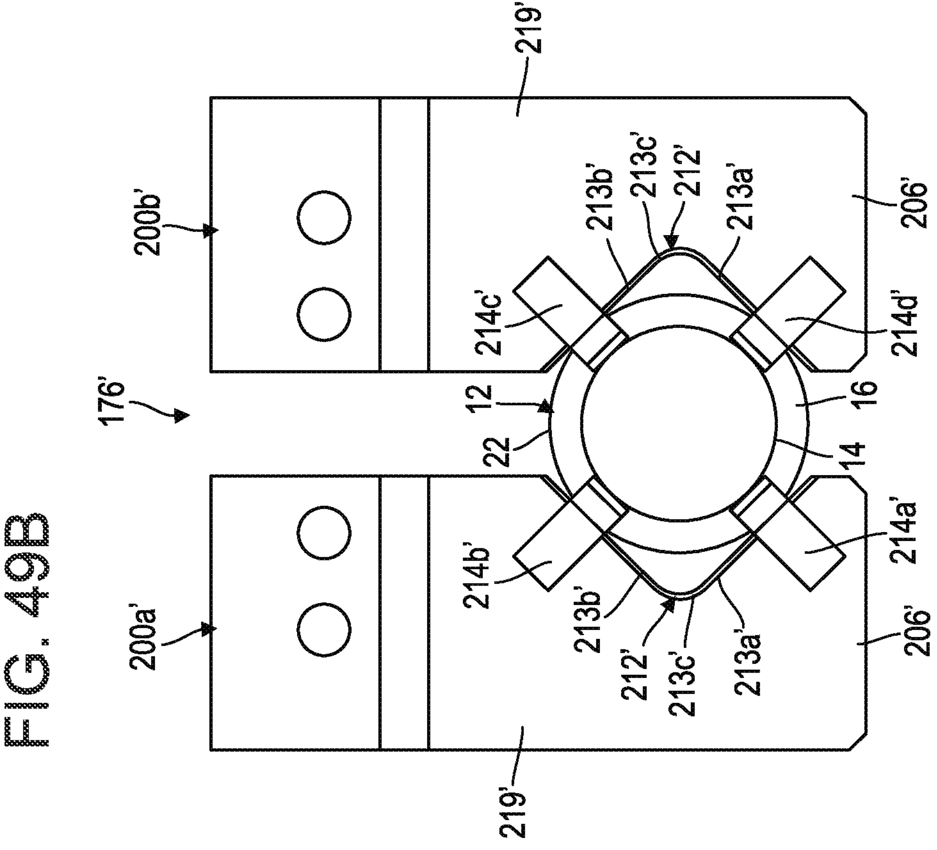
FIG. 49B is a bottom view of the gripper apparatus of FIG. 47, showing, in the first closed position, the jaw members grasping the cap of the closed receptacle and the fingers in contact with the receptacle of the closed receptacle.
Figure 49A:
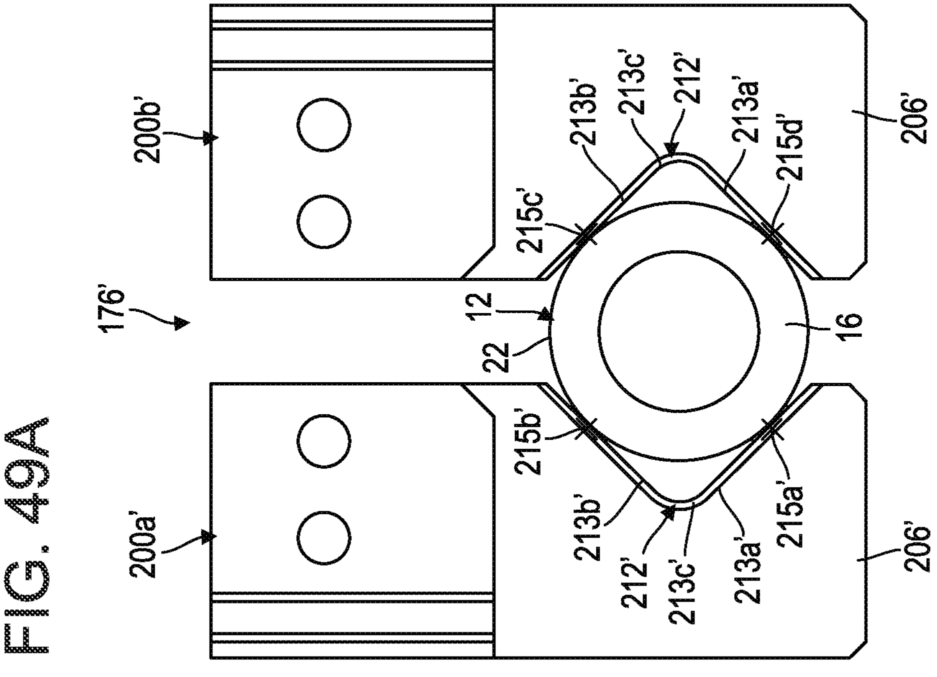
FIG. 49A is a top view of the gripper apparatus of FIG. 47, showing the jaw members grasping the cap of the closed receptacle in the first closed position.

As illustrated in FIGS. 49A and 49B, the contoured engagement faces 212' of this embodiment are specifically configured for resisting vertical slippage between the closed receptacle 12 and the jaw members 200*a'*, 200*b'*, the occurrence of which could lead to contamination of or damage to the gripper apparatus 176'. For example, if the closed receptacle 12 is misaligned when the sidewall 22 of the closure 16 is grasped between the jaw members 200*a'*, 200*b'*, then the closed receptacle 12 may not be laterally aligned with the selected receptacle slot 130, possibly causing the bottom end 20 of the receptacle 12 to contact the top surface of the support plate 124*a* of the receptacle rack 114 (shown in FIG. 19) when attempting to partially insert the closed receptacle 12 into the selected receptacle slot 130. As a result, the closed receptacle 12 may be vertically displaced within the jaw members 200*a'*, 200*b'* as the gantry 174, along with the proximity sensor 191 situated above the jaw members 200*a'*, 200*b'* (shown in FIGS. 15, 23A, and 24A), is moved downward, possibly causing the top surface 24 of the closure 16 of the closed receptacle 12 to forcefully contact the proximity sensor 191.

In particular, as best shown in FIGS. 48, 49A, 49B, and 50, the contoured engagement faces 212' take the form of generally V-shaped recesses that are mirror images of each other. In particular, the contoured engagement face 212' of each jaw member 200*a'*, 200*b'* includes two generally straight faces 213*a'*, 213*b'* that are joined to each other by a rounded section 213*c'* of the contoured engagement face 212' from which they diverge from each other, as best shown in FIGS. 49A and 49B. With this configuration, the contoured engagement faces 212' of the jaw members 200*a*', 200*b*' contact the sidewall 22 of the closure 16 at only four points 215*a*'-215*d*' when the jaw members 200*a*', 200*b*' are in the first closed position. By concentrating the gripping force (or contact pressure) applied by the jaw members 200*a*', 200*b*' on just four points 215*a*'-215*d*' of contact (as opposed to the essentially continuous contact surfaces with the circular contoured engagement faces 212 of the gripper apparatus 176 illustrated above in FIG. 24B), vertical slippage is less likely to occur. Vertical slippage is possible when the bottom end 20 of a misaligned receptacle 12 contacts the top surface of the support plate 124*a* of the receptacle rack 114 (shown in FIG. 19) when attempting to partially insert the closed receptacle 12 into a selected receptacle slot 130.

Figure 50:
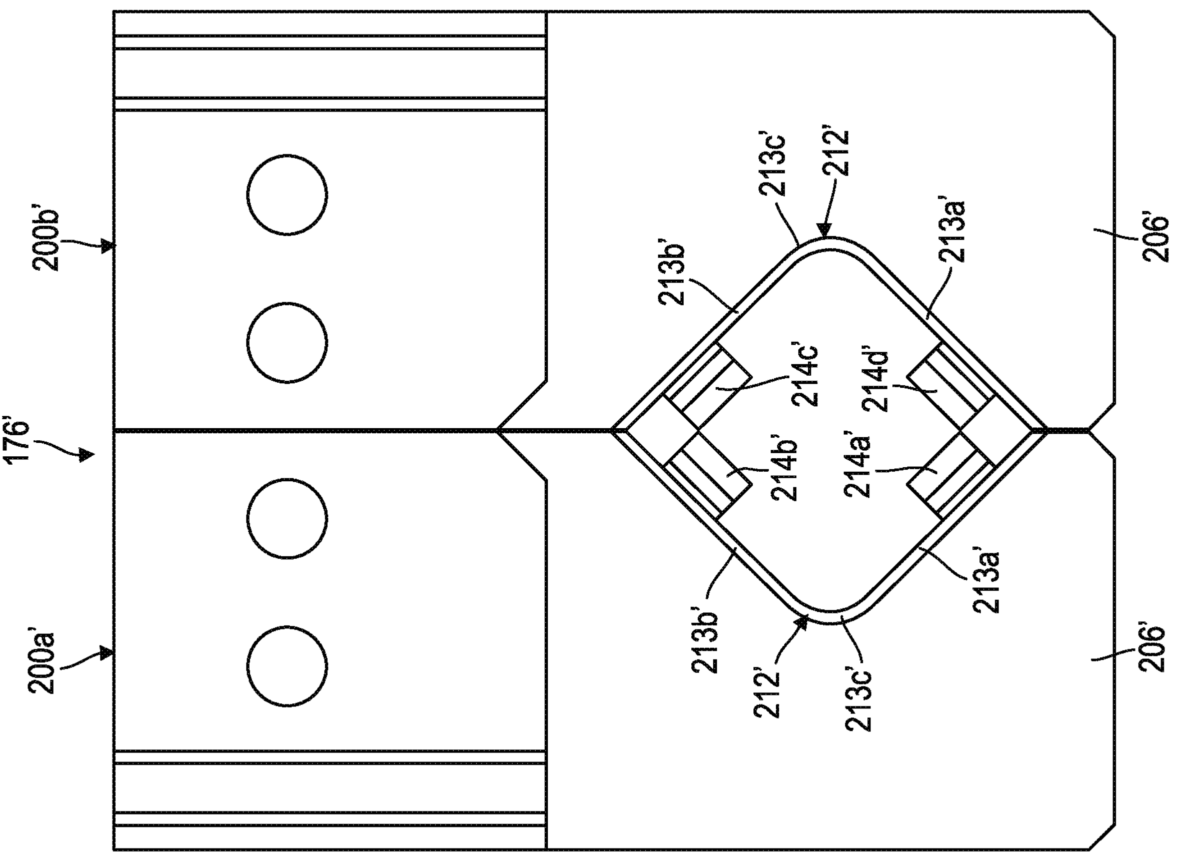
FIG. 50 is a top view of the gripper apparatus of FIG. 47, showing the jaw members contacting each other in a closed position with no receptacle present.

As illustrated in FIG. 50, the lower horizontal flanges 206' are capable of contacting each other when a closed receptacle 12 is not disposed between the jaw members 200*a*', 200*b*', such that contoured engagement faces 212' define an opening when the lower horizontal flanges 206' contact each other.

Figure 53:
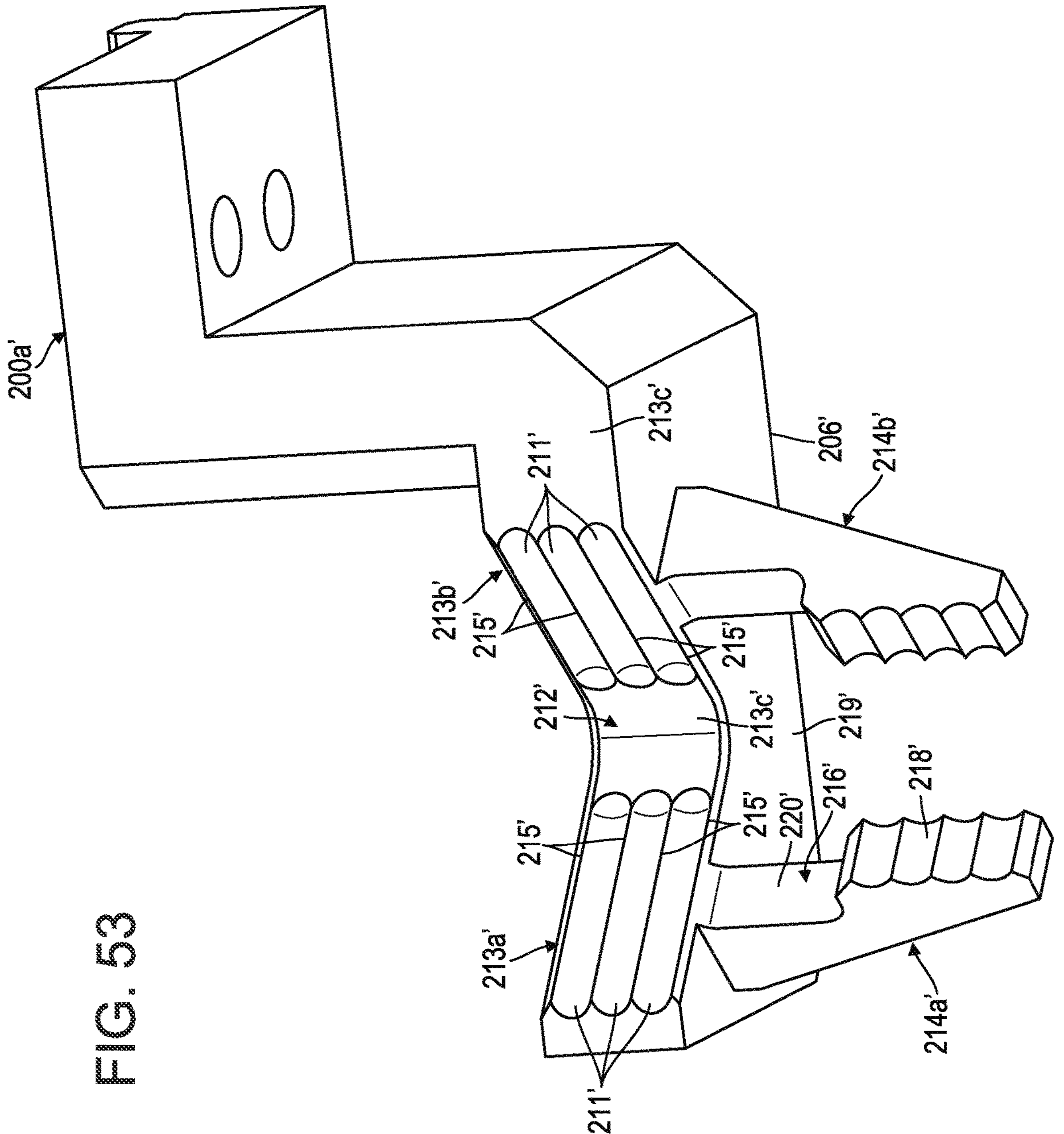
FIG. 53 is a bottom perspective view of a jaw member of the gripper apparatus of FIG. 47.
Figure 54:
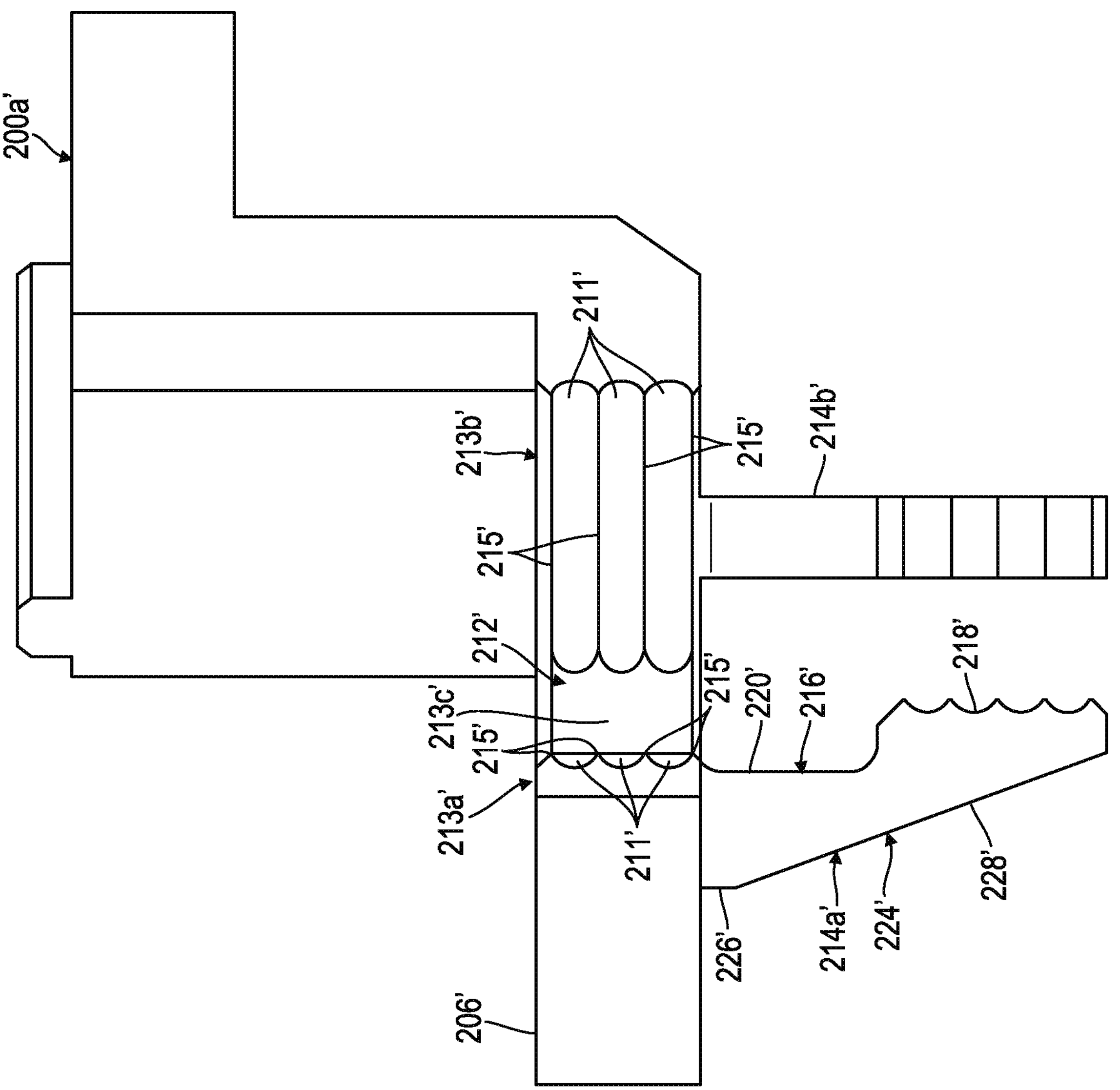
FIG. 54 is a profile view of the jaw member of FIG. 53.

As best illustrated in FIGS. 53 and 54, the contoured engagement faces 212' are knurled or scalloped so that each straight face 213*a*', 213*b*' of the contoured engagement faces 212' includes a plurality of laterally oriented grooves 211'. The laterally oriented groves 211' are situated between and adjacent to the top and bottom surfaces of the horizontal flange 206', such that lateral edges 215' are formed between adjacent lateral grooves 211' and between lateral grooves 211' and the top and bottom surfaces of the horizontal flange 206'. The lateral edges 215' are designed to at least partially embed themselves into the sidewall 22 of the closure 16 (which in the preferred embodiment is composed of a soft plastic material, e.g., high density polyethylene (HDPE)) when the jaw members 200*a*', 200*b*' are in the first closed position, thereby further reducing the possibility of vertical slippage between the closure 16 and the jaw members 200*a*', 200*b*'. In the illustrated embodiment, each groove 211' has an arcuate cross-section having a suitable radius of, for example, 1 mm. Although three lateral grooves 211' and four lateral edges 215' are illustrated, it should be appreciated that each straight face 213*a*', 213*b*' of the contoured engagement faces 212' may have any plural number of lateral grooves 211' and at least one corresponding lateral edge 215'. The two straight faces 213*a*', 213*b*' of the same or opposed contoured engagement faces 212' may have the same or a different number of lateral grooves 211'.

Figure 55:
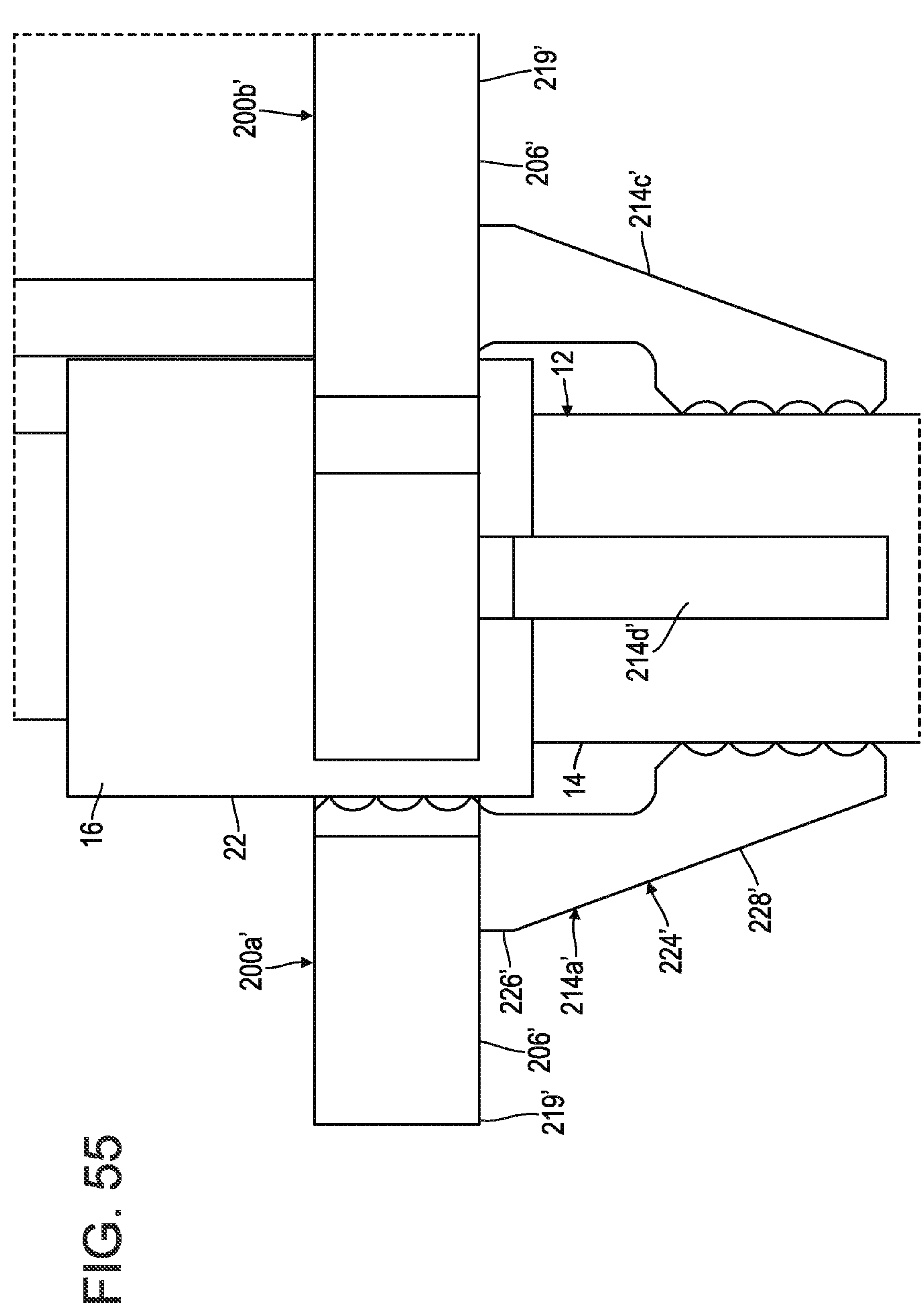
FIG. 55 is a profile view of the gripper apparatus of FIG. 47, showing, in the first closed position, the jaw members grasping the cap of the closed receptacle and the fingers grasping the receptacle of the closed receptacle.

Each gripper apparatus 176' further includes a plurality of fingers 214*a*'-214*d*', each of which depends from a base 219' (in this case, the bottom surface of the lower horizontal flange 206') of one of the jaw members 200*a*', 200*b*', as illustrated in FIG. 47 and FIG. 53. When the jaw members 200*a*', 200*b*' are in the first closed position, the fingers 214*a*'-214*d*' are configured to contact or nearly contact the receptacle 14 of a closed receptacle 12 as the jaw members 200*a*', 200*b*' grasp the sidewall 22 of the closure 16 of the closed receptacle 12, which is best illustrated in FIG. 49B and FIG. 55. In this manner, a substantially vertical orientation of the closed receptacle 12 is facilitated (i.e., the fingers 214*a*'-214*d*' prevent vertical misalignment and possibly rotation of the receptacle 14 while the jaw members 200*a*', 200*b*' grasp the sidewall 22 of the closure 16). The spacing of the fingers 214*a*'-214*d*' from the receptacle 14 of the closed receptacle 12 in the first closed position is preferably in the range of 0 (i.e., signifying contact with the receptacle 14) to 0.25 mm when the receptacle 14 is centered between the fingers 214*a*'-214*d*'. To the extent that the fingers 214*a*'-214*d*' contact the receptacle 14 of the closed receptacle 12 while the jaw members 200*a*', 200*b*' grasp the sidewall 22 of the closure 16, it may be preferable that the gripping force of the jaw members 200*a*', 200*b*' is greater than the gripping force of the fingers 214*a*'-214*d*', since the jaw members 200*a*', 200*b*' are generally less compliant (i.e., more laterally rigid) than the fingers 214*a*'-214*d*'.

In the embodiment illustrated in FIG. 47, the gripper apparatus 176' includes four fingers 214*a*'-214*d*', with two of the fingers 214*a*'-214*d*' depending from the base 219' of each of the Jaw members 200*a*', 200*b*'. As best shown in FIG. 55, the fingers 214*a*'-214*d*' of the illustrated embodiment extend obliquely inward from the bases 219' of the lower horizontal flanges 206' to position the fingers 214*a*'-214*d*' in contact, or near contact, with the receptacle 14 of the closed receptacle 12 when the jaw members 200*a*', 200*b*' grasp the sidewall 22 of the associated closure 16 of the closed receptacle 12 in the first closed position. In the illustrated embodiment, the four fingers 214*a*'-214*d*' are circumferentially spaced from each other by approximately ninety degrees when the jaw members 200*a*', 200*b*' are in the first closed position, although other circumferential spacings are contemplated.

Figures 51, 52:
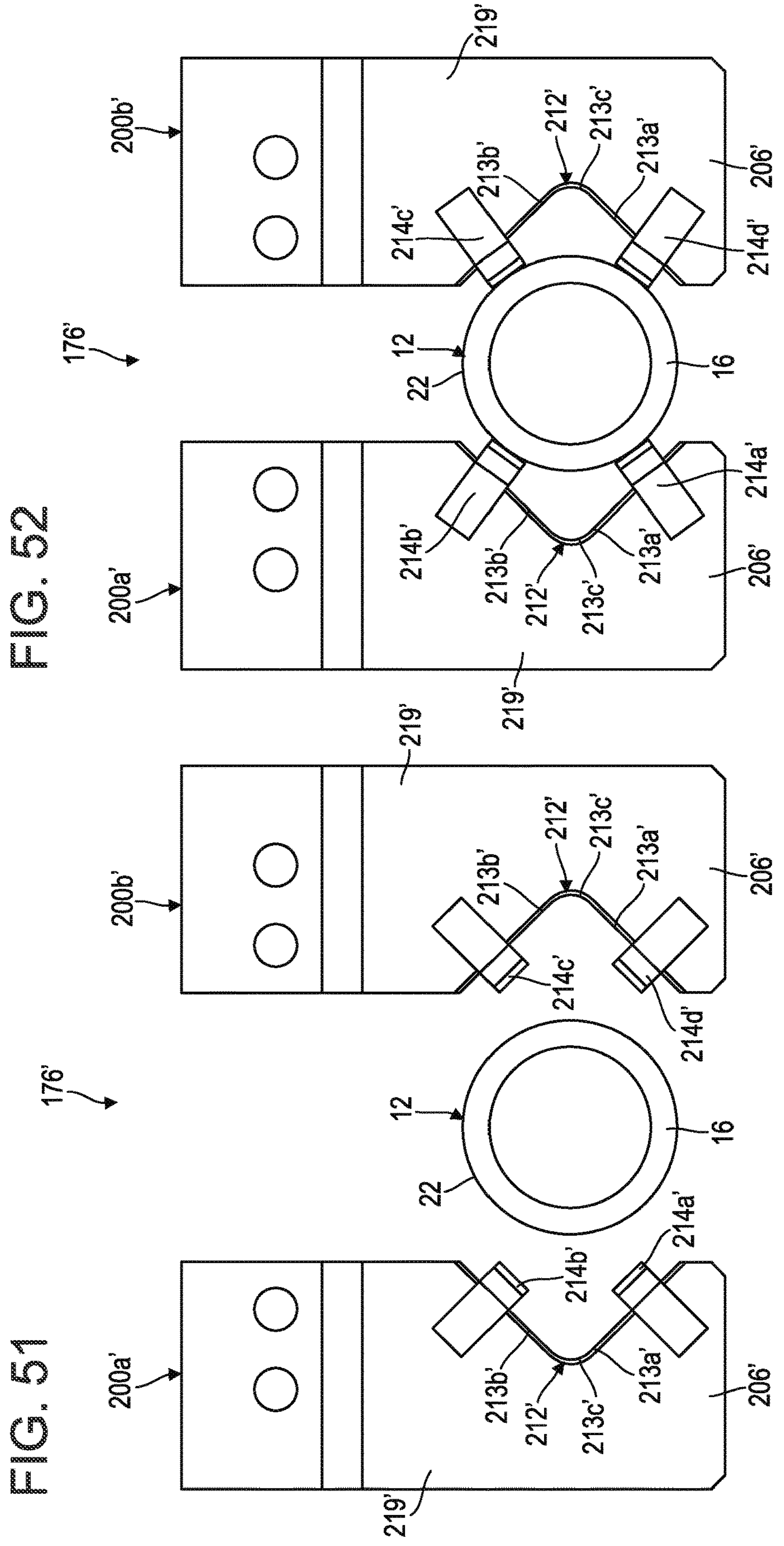
FIG. 51 is a bottom view of the gripper apparatus of FIG. 47, showing the jaw members in the open position prior to grasping or subsequent to releasing the cap of the closed receptacle with the fingers.
FIG. 52 is a bottom view of the gripper apparatus of FIG. 47, showing the jaw members grasping the cap of the closed receptacle with the fingers in the second closed position.

As best shown in FIG. 55, the fingers 214*a*'-214*d*' are further configured for grasping the sidewall 22 of a closure 16 beneath the top surface 24 thereof when the closure 16 is disposed between the fingers 214*a*'-214*d*' and beneath the lower horizontal flanges 206' as the jaw members 200*a*', 200*b*' move laterally toward each other from the open position (see FIG. 51) to the second closed position (see FIG. 52). The fingers 214*a*'-214*d*' are used to grasp the closure 16 and seat the closed receptacle 12 within the selected receptacle slot 130 of a rack 114 while the jaw members 200*a*', 200*b*' are in the second closed position.

The gripper apparatus 176' may have any number of fingers 214' permitting the fingers 214' to firmly grip the closure 16. In an alternative example, the gripper apparatus 176' may include three fingers (one finger 214' depending from the base 219' of one jaw member 200' and two fingers 214' depending from the bottom surface of the other jaw member 200'). In this example, the three fingers 214' may be circumferentially spaced from each other by about 120 degrees when the jaw members 200*a*', 200*b*' are in the second closed position. In another example, the gripper apparatus 176' may include six fingers (three fingers depending from the base 219' of each jaw member 200'). In this case, the six fingers 214' may be circumferentially spaced from each other by about sixty degrees when the jaw members 200*a*', 200*b*' are in the second closed position.

Figure 56:
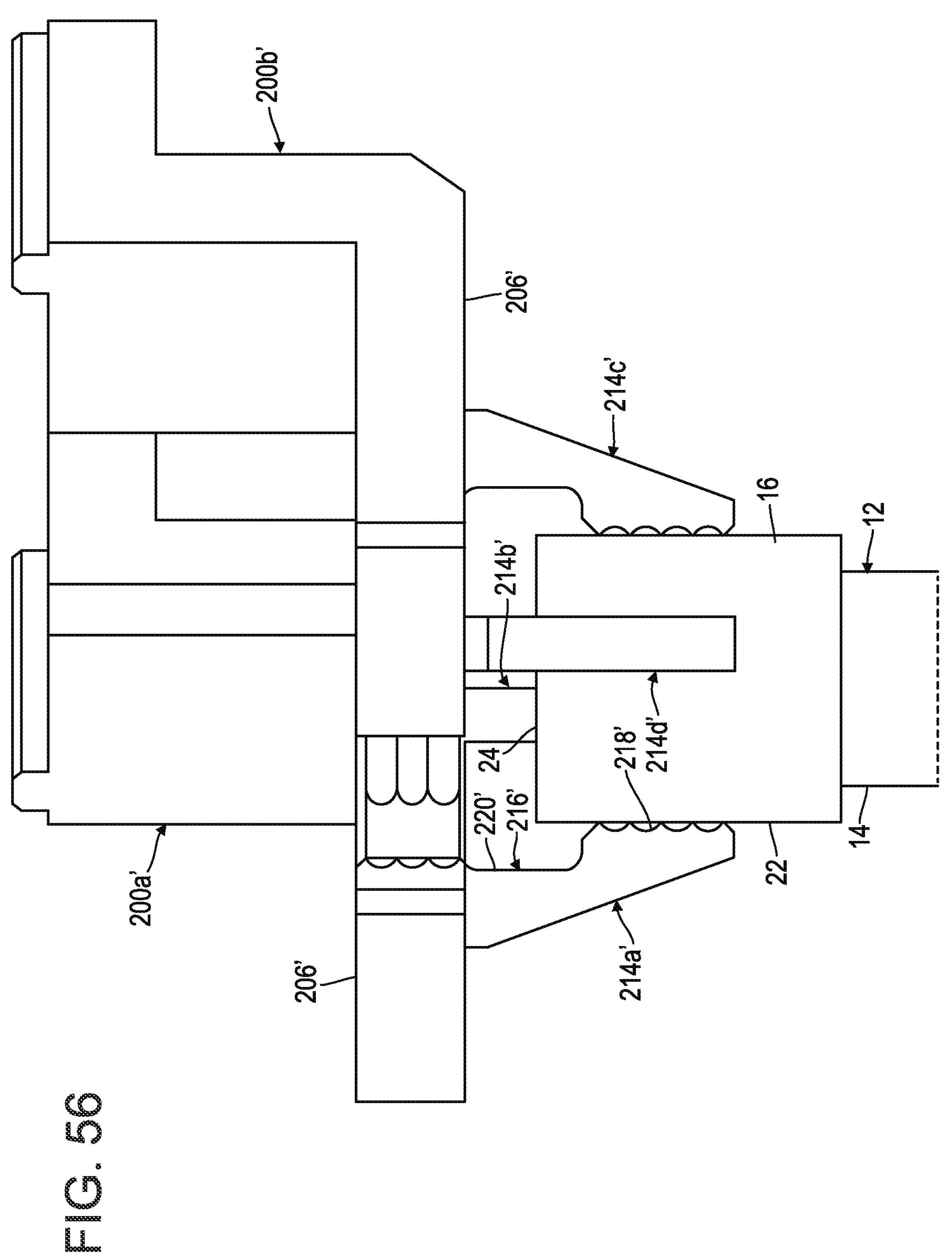
FIG. 56 is a profile view of the gripper apparatus of FIG. 47, showing the jaw members grasping the cap of the closed receptacle with the fingers in the second closed position.

Referring to FIGS. 53, 54, and 56, each of the fingers 214*a*'-214*d*' has an inner surface 216' that includes a lower region 218' (or contact face 218') and a recessed upper region 220' adjacent the bottom surface (e.g., the lower horizontal flange 206') of the respective jaw member 200*a*', 200*b*'.

The contact face 218' of each of the fingers 214*a*'-214*d*' is configured for engaging the sidewall 22 of the closure 16 when the closure 16 is situated beneath the bases 219' of the jaw members 200*a*', 200*b*' and between the contact faces 218' of the fingers 214*a*'-214*d*'. In the illustrated embodiment, the fingers 214*a*'-214*d*' have a combined grasping force of at least one pound and, more preferably, at least five pounds. In the illustrated embodiment, the contact face 218' of each of the fingers 214*a*'-2141*d*' is knurled or scalloped to prevent the fingers 214*a*'-214*d*' from slipping on the sidewall 22 of the closure 16 if an opposing force is encountered as the gripper apparatus 176' seats the closed receptacle 12 in a receptacle slot 130. As illustrated in FIG. 52, the contact face 218' of each of the fingers **214*a*'-214*d*' may be oriented toward an axial center of the closure 16 when the sidewall 22 of the closure 16 is grasped by the fingers 214*a*'-214*d*'** in the second closed position.

As illustrated in FIG. 56, the generally vertical recesses 220' are configured so that there is no contact between the inner surfaces 216' of the fingers **214*a*'-214*d*' and the top surface 24 of the closure 16 when the contact faces 218' collectively grasp the sidewall 22 below a rim of the closure 16 in the second closed position. This configuration ensures that contact between the gripper apparatus 176' and the top surface 24' of the closure 16'** is avoided.

Additionally, as illustrated in FIG. 52, the contact faces 218' of the fingers **214*a*'-214*d*' are disposed relative to the contoured engagement faces 212' of the jaw members 200*a*', 200*b*' such that if there is some slippage between the fingers 214*a*'-214*d*' and a grasped closure 16 when the jaw members 200*a*', 200*b*' are in the second closed position, there is sufficient space for the closure 16 to at least partially extend into an opening defined by the contoured engagement faces 212' of the jaw members 200*a*', 200*b*' without any contact between the top surface of rim 26 of the closure 16 and the bases 219' of the jaw member 200*a*', 200*b*'**.

As shown in FIG. 54, each of the fingers **214*a*'-214*d*' includes an outer surface 224' having a generally vertical upper region 226' and an inwardly tapered lower region 228'. The tapered lower regions 228' position the contact faces 218' of the fingers 214*a*'-214*d*' in contact or near contact with the receptacle 14 of the closed receptacle 12 while the jaw members 200*a*' 200*b*' grasp the sidewall 22 of the closure 16 in the first closed position, as best illustrated in FIG. 55. Furthermore, as discussed above with respect to the fingers 214*a*-214*d* of gripper apparatus 176, the fingers 214*a*'-214*d*' of gripper apparatus 176' can be sized and arranged to position the fingers 214*a*'-214*d*' within interstitial spaces defined by the closures 16 of neighboring receptacles 12 supported by the receptacle rack 114 when the jaw members 200*a*', 200*b*' are in the second closed position and as the closed receptacle 12 is being seated in a slot 130 of the receptacle rack 114, as well as when the jaw members 200*a*', 200*b*' are moved from the second closed position to the open position after seating the closed receptacle 12 in the receptacle slot 130. The same advantages apply when the fingers 214*a*'-214*d*' are lowered to grasp and remove the closed receptacle 12 from the receptacle slot 130. In circumstances where there is some misalignment of the fingers 214*a*'-214*d*', and the fingers 214*a*', 214*b*' contact the closures 16 of neighboring receptacles 12 seated in adjacent receptacle slots 130, the outer surfaces 224' of the fingers 214*a*'-214*d*' are shaped to slidably contact the rims 26 (not the top surfaces 24) of these neighboring closures 16, thereby allowing continued downward movement of the grasped receptacle 12 into the selected receptacle slot 130. In this manner, potentially contaminating contact between the fingers 214*a*'-214*d*' and neighboring closures 16** can be minimized or avoided.

The fingers **214*a*'-214*d*' of gripper apparatus 176' may be composed of a suitably rigid or semi-rigid material, such as stainless steel or polycarbonate, and may be integrally formed with the respective jaw members 200*a*', 200*b*' from which they depend as unibody structures, or they may be coupled to the respective jaw members 200*a*', 200*b*'** using fasteners.

Having described the structure and function of the automated specimen processing system 10, one exemplary method 300 for operating the specimen processing system 10 for processing and storing a receptacle 12 will now be described with respect to FIG. 31. For brevity, the method 300 described below is with respect to a single receptacle 12, while the automated specimen processing system 10 is capable of processing multiple receptacles 12 simultaneously.

First, a receptacle 12 containing an unprocessed specimen may be loaded via a rack (along with other receptacles) into the loading (input) module **30*a* (step 302). The receptacle 12 containing the unprocessed specimen is transferred from the loading module 30*a* on the right-side inner loop 53*a* of main conveyor line 48 (step 304). For example, a pick-and-place device (not shown) may remove the receptacle 12 from the loading module 30*a* and insert the receptacle 12 into an empty receptacle carrier 62 (which has previously been fed onto the main conveyor line 48 by the receptacle carrier feeding module 30*h* and routed to the loading module 30*a*) immobilized on the branch line 50, and from there it is transported onto the main conveyor line 48, where it continues onto the left-side inner loop 53*b* or is diverted onto the right-side inner loop 53*a* until space is available on the left-side inner loop 53*a***.

While the unprocessed receptacle 12 is placed onto the branch line 50 of the loading module **30*a*, the WMS software module 34 identifies an assay(s) to be run with the specimen contained in the receptacle 12 based on encoded information read by a barcode reader (not shown) associated with the loading module 30*a*, and generates an assay-specific workflow, including pre-analytical and post-analytical steps, such as, e.g., centrifuging, de-capping, aliquoting, capping, storage, etc., for that receptacle 12 (step 306). The specific workflow for the receptacle 12 is communicated from the WMS software module 34 to the conveyor controller 42, which controls the movement of the receptacle 12 between the modules 30 via the automated conveyor system 32** in accordance with its workflow.

If the receptacle 12 is closed with a non-pierceable closure (e.g., a non-pierceable cap) **16*b* (see FIG. 3B), the receptacle 12, tinder control the conveyor controller 42, is first routed to the de-capping module 30*e*, where the de-capping nodule 30*e* removes the non-pierceable closure 16*b* from the receptacle 12 (i.e., de-caps the receptacle 12) (step 308). For example, the receptacle 12 (along with the receptacle carrier 62) may be diverted from the main conveyor line 48 onto the branch line 50 associated with the de-capping module 30*e* via operation of the diverter 46, removed from the receptacle carrier 62 while the receptacle carrier 62 is immobilized on the branch line 50 and transported into the de-capping module 30*e* via a pick-and-place device (not shown), de-capped, and then inserted back into the receptacle carrier 62 immobilized on the branch line 50 via a pick-and-place device (not shown) for transport back onto the main conveyor line 48. Alternatively, the de-capping module 30*e* may de-cap the receptacle 12 directly on the main conveyor line 48, without needing to remove the receptacle 12 from the receptacle carrier 62. If the receptacle 12 is closed with a pierceable closure 16*a* (see FIG. 3A) or has no closure (e.g., the receptacle 12 is provided to the main conveyor line 48 without a closure or the receptacle was previously de-capped), then the receptacle 12, under control of the conveyor controller 42, bypasses the de-capping module 30*e* uninterrupted (step 308**).

Next, the WMS software module 34 determines if there is at least one task of workflow for the receptacle 12 that can be completed (step 310). If there are no tasks of the workflow for the receptacle 12 that can be completed (e.g., if any of the analyzer modules **30*b* required to complete a task of the workflow is unavailable (e.g., if the buffer queues (not shown) of all of the required analyzer modules 30***b* are full, or if the analyzer modules 30*b* lack the necessary reagents and consumables to perform a task), the receptacle 12, under the control of the conveyor controller 42, is recirculated on the right-side inner loop 53*a* of the main conveyor line 48 (e.g., by diverting the receptacle 12 through the pass-through line 52*a* via operation of a diverter 46*b*), continually looping around the right-side inner loop 53*a* until at least one remaining task of work flow for the receptacle 12 can be completed (e.g., one of the previously unavailable analyzer modules 30*b* becomes available) (step 312). If at least one of the tasks of the workflow for the receptacle 12 can be completed (e.g., if at least one of the analyzer modules 30*b* required to complete a task of the workflow is available), the receptacle 12 is routed from the right-side inner loop 53*a* to the left-side inner loop 53*b* of the main conveyor line 48 (e.g., by bypassing the pass-through line 52*a* via operation of a diverter 46*b*) (step 314).

Rather than loading the receptacle 12 into the loading module 30*a* at step 302, a parent receptacle containing an unprocessed specimen may be manually loaded via a rack (along with other parent receptacles) into the specimen transfer module 30*c* (step 303). In this case, the specimen transfer module 30*c* transfers an aliquot of the specimen contained in the parent receptacle to at least one child receptacle 12 (step 305). After transferring specimen from the parent receptacle to the child receptacle 12, the child receptacle 12 may be capped with a closure (e.g., a pierceable closure 16*a*). The child receptacle 12 is then removed from the specimen transfer module 30*c* and placed in a receptacle carrier 62 situated on the branch line 50 associated with the specimen transfer module 30*c* for movement of the receptacle carrier 62 onto the main conveyor line 48 (step 307). The receptacle 12 may be removed from the specimen transfer module 30*c* and placed into the receptacle carrier 62 (which has previously been fed onto the main conveyor line 48 by the receptacle carrier feeding module 30*h* and routed to the specimen transfer module 30*c*) with a pick-and-place device (not shown).

While the unprocessed receptacle 12 is directed onto the branch line 50 of the sample transfer module 30*c*, the WMS software module 34 identifies an assay(s) to be run with the specimen contained in the child receptacle 12 based on encoded information read by a barcode reader (not shown) associated with the sample transfer module 30*c*, and generates an assay-specific workflow, including pre-analytical and post-analytical steps, such as, e.g., centrifuging, aliquoting, storage, reflex testing, capping, etc., for that receptacle 12 (step 307). The specific workflow for the receptacle 12 is communicated from the WMS software module 34 to the conveyor controller 42, which controls the transportation of the child receptacle 12 between the modules 30 via the automated conveyor system 32 in accordance with its workflow.

Whether the receptacle 12 is placed onto the right-side inner loop 53*a* of the main conveyor line 48 from the loading module 30*a* and routed to the left-side inner loop 53*b* of the main conveyor line 48, or whether the receptacle 12 is placed directly onto the left-side inner loop 53*b* from the sample transfer module 30*c*, the receptacle 12, under control of the conveyor controller 42, is routed to at least one available analyzer module 30*b* (that can complete an open work order associated with the receptacle 12), where the available analyzer module(s) 30*b* analyze the specimen contained in the receptacle 12 (e.g., nucleic acid-based assay, sequencing reaction, immunoassay, chemical analysis, etc.) (step 316). For example, the receptacle 12 (along with the receptacle carrier 62) may be diverted from the left-side inner loop 53*b* of the main conveyor line 48 onto the branch line(s) 50 associated with the available analyzer module(s) 30*b* via operation of the diverter(s) 46, removed from the receptacle carrier 62 immobilized on the branch line(s) 50 and transported into the available analyzer module(s) 30*b* via a pick-and-place device (not shown), the specimen analyzed, and the receptacle 12 inserted back into the receptacle carrier 62 immobilized on the branch line(s) 50 via a pick-and-place device (not shown) for transport back onto left-side inner loop 53*b* of the main conveyor line 48. In each analyzer module 30*b* that is available to complete the tasks of the workflow for the receptacle 12, at least a portion of the specimen from the receptacle 12 is removed and analyzed by the analyzer module 30*b*. If the receptacle 12 is closed with a pierceable closure 16*a*, each analyzer module 30*b* includes a fluid extraction device (e.g., robotic pipettor) (not shown) configured for piercing the closure 16*a* (or penetrating a previously pierced closure 16*a*) and removing an aliquot of the specimen from the receptacle 12.

Next, the conveyor controller 42 determines whether the workflow for the receptacle 12 has been completed or, if not, whether the number of times the receptacle 12 has circulated around the left-side inner loop 53*b* has exceeded a predetermined limit (step 318). If the workflow for the receptacle 12 has been not been completed and the number of times the receptacle 12 has circulated around the left-side inner loop 53*b* has not exceeded a predetermined limit, the receptacle 12, tinder the control of the conveyor controller 42, is recirculated on the left-side inner loop 53*b* of the main conveyor line 48 (e.g., by diverting the receptacle 12 through the pass-through line 52*b* by operation of a diverter 46*a*), and repeatedly loops around the left-side inner loop 53*b* until a previously unavailable analyzer module 30*b* becomes available (step 320) (e.g., the analyzer module 30*b* is loaded with the appropriate reagents and/or consumables).

If the workflow for the receptacle 12 has been completed or the number of times the receptacle 12 has circulated around the left-side inner loop 53*b* has exceeded a predetermined limit, the receptacle 12, if open-ended (e.g., the receptacle 12 has been provided to the automated conveyor system 32 without a closure 16*b* or the closure 16*b* has been removed from the receptacle 12 by the de-capping module 30*e*), may be routed by the conveyor controller 42 to the capping module 30*f*, where the capping module 30*f* caps the open end of the receptacle 12 (e.g., inserts into or screws onto the open end of the receptacle 12 a fresh closure 16*b*) (step 322). For example, the receptacle 12 (along with the receptacle carrier 62) may be diverted from the left-side inner loop 53*b* of the main conveyor line 48 onto the branch line 50 associated with the capping module 30*f* via operation of the diverter 46, removed from the receptacle carrier 62 immobilized on the branch line 50 and transported into the capping module 30*f* via a pick-and-place device (not shown), capped, and inserted back into the receptacle carrier 62 immobilized on the branch line 50 via a pick-and-place device (not shown), for transport back onto the left-side inner loop 53*b* of the main conveyor line 48. In the case where the capping module 30*f* caps the receptacle 12 directly on the main conveyor line 48, the receptacle 12 need not be removed from the receptacle carrier 62 and transported into the capping module 30*f* If the receptacle 12 is closed with a pierceable closure 16*a* (see FIG. 3A), then the receptacle 12, under control of the conveyor controller 42, bypasses the capping module 30*f* uninterrupted (step 322).

If the work flow for the receptacle 12 is not complete (or otherwise requires further testing at a future time), the receptacle 12, under control the conveyor controller 42, may be routed to the receptacle storage module 30*d*, where the receptacle storage module 30*d* stores the receptacle 12 in a refrigerated environment for a period of time (step 326). The receptacle carrier 62 which previously carried the receptacle 12 may then be routed from the unloading module 30*g* to the receptacle carrier feeding module 30*h* for storage therein, or it may be used to receive a receptacle 12 from the receptacle storage module 30*d*. If it is determined that the specimen contained in the receptacle 12 should be subjected to further testing (e.g., the associated work order has not been completed, re-testing, reflex testing, or testing for a new analyte based on the results of initial tests) prior to the expiration of a predetermined storage period (e.g., 5 days), the receptacle 12 is transferred from the receptacle storage module 30*d* to the left-side inner loop 53*b* of the main conveyor line 48, where it is recirculated and routed to at least one available analyzer module 30*b* for analysis of the specimen (step 320). Additional details on the transportation of receptacles 12 between main conveyor line 48 and the receptacle storage module 30*d* will be described in further detail below with respect to the method 400 of FIG. 32 and the method 600 of FIG. 33. Once the predetermined storage period has expired, a receptacle rack 114 supporting the receptacle 12 may be manually removed from a front 116 of the receptacle storage module 30*d* by means of the door(s) 118 (step 330).

If the work flow for the receptacle 12 is complete (or otherwise does not require further testing at a future time), the receptacle 12, under control the conveyor controller 42, may be routed from the left-side inner loop 53*b* to the unloading (output) module 30*g* on the right-side inner loop 53*a* of the main conveyor line 48 (e.g., by bypassing the pass-through line 52*a* via operation of a diverter 46) (step 328). The receptacle 12 (along with the receptacle carrier 62) may be diverted from the right-side inner loop 53*a* of the main conveyor line 48 onto the branch line 50 associated with the unloading module 30*g* via operation of the diverter 46, removed from the receptacle carrier 62 immobilized on the branch line 50 and transported into the unloading module 30*g* via a pick-and-place device (not shown) for insertion into a receptacle rack (not shown). The receptacle rack supporting the receptacle 12 may then be manually removed from the unloading module 30*g* (step 330). The empty receptacle carrier 62 that previously carried the receptacle 12 may then be routed from the unloading module 30*g* to the loading module 30*a* or to the receptacle carrier feeding module 30*h* for storage therein.

Figure 32:
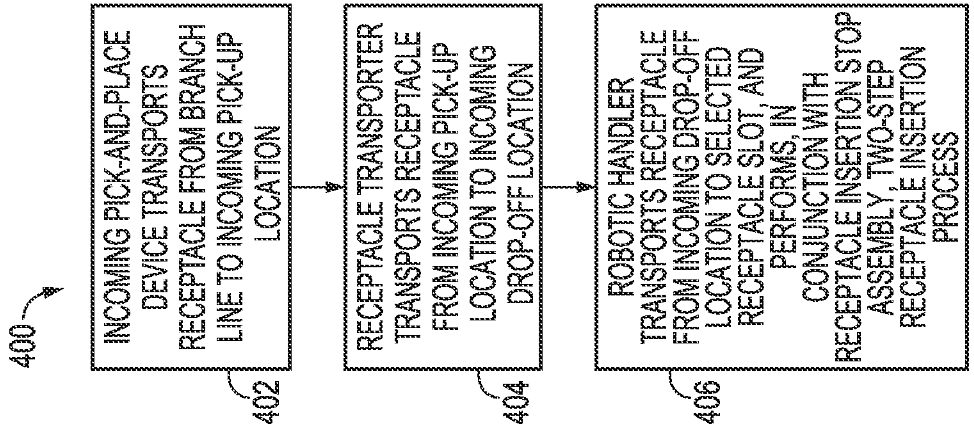
FIG. 32 is a flow diagram of one exemplary method of transporting a receptacle from an automated conveyor system of the specimen processing system of FIG. 1 to the receptacle storage module of FIG. 7 for storage in the receptacle storage module.

Referring now to FIG. 32, an exemplary method 400 for transporting a closed receptacle 12 from a branch line 102 of the automated conveyor system 32 into the receptacle storage module 30*d* for storage in a selected receptacle slot 130 of a receptacle rack 114 associated with one of the levels 112 will now be described. It should be appreciated that although the method 400 is described below with respect to only one closed receptacle 12, the multiple closed receptacles 12 are capable of being individually transported into the receptacle storage module 30*d* for storage. Thus, the described method 400 can be repeated for each closed receptacle 12 to be transported into and stored within the receptacle storage module 30*d*. The exemplary method 400 initially assumes that the barcode reader assembly 104 has stopped the receptacle carrier 62, rotated the receptacle carrier 62 so that the barcode 28 associated with the closed receptacle 12 can be read, and immobilized the receptacle carrier 62 to facilitate removal of the associated closed receptacle 12 (see FIGS. 11 and 12).

The incoming pick-and-place device 150*a* (see FIGS. 8, 11 and 16) transports the closed receptacle 12 from the receptacle carrier 62 immobilized on branch line 102 of the automated conveyor system 32 to the incoming pick-up location associated with the selected level 112 (step 402). In the illustrated embodiment, this step is accomplished by (i) vertically moving the carriage 166 of the incoming pick-and-place device 150*a* to a position adjacent the branch line 104 (this step is not performed if the incoming pick-and-place device 150*a* is at a home position adjacent the branch line 104); (ii) rotating the gripper 168 of the incoming pick-and-place device 150*a* outward to the second position, which is offset from the back 120 of the housing 108, thereby vertically aligning the gripper 168 with an immobilized receptacle carrier 62 held by the barcode reader assembly 104; (iii) lowering the carriage 166 of the incoming pick-and-place device 150*a* until the gripper 168 is adjacent the receptacle 14 of the receptacle 12 held by the immobilized receptacle carrier 62; (iv) grasping the receptacle 14 with the gripper 168 of the incoming pick-and-place device 150*a*; (v) raising the carriage 166 of the incoming pick-and-place device 150*a* until the receptacle 12 has cleared the immobilized receptacle carrier 62; (vi) rotating the gripper 168 of the incoming pick-and-place device 150*a* inward to the first position adjacent the back 120 of the housing 108; (vii) raising the carriage 166 of the incoming pick-and-place device 150*a* to the selected level 112 (downward if the selected level 112 is beneath the branch line 104 and upward if the selected level 112 is above the branch line 104), such that the gripper 168 is situated above the incoming opening 122*a* associated with the selected level 112; (viii) opening the door 123 associated with the incoming opening 122*a* of the selected level 112; (ix) laterally moving the sled 170 of the receptacle transporter 152 to the first location proximate the incoming opening 122*a*, such that the incoming holder 172*a* extends through the incoming opening 122*a* at the incoming pick-up location; (x) moving the gripper 168 of the incoming pick-and-place device 150*a* downward until the grasped receptacle is fully inserted into the incoming holder 172*a* at the incoming pick-up location; and (xi) releasing the receptacle 12 from the grasp of the gripper 168 of the incoming pick-and-place device 150*a*.

Next, the receptacle transporter 152 (see FIGS. 17 and 18) moves the closed receptacle 12 from the incoming pick-up location to the incoming drop-off location located within the chamber 110 of the receptacle storage module 30*d* (step 404). In the illustrated embodiment, this step is accomplished by (i) laterally moving the sled 170 of the receptacle transporter 152 from the first location adjacent the incoming opening 122*a* to the second location spaced-apart from the incoming opening 122*a*, until the incoming holder 172*a* is directly beneath the incoming drop-off location; (ii) moving the incoming holder 172*a* upward from an initial level to the drop-off location at the second, higher level; and (iii) closing the door 123 associated with the incoming opening 122*a*.

The robotic handler 154 associated with the level 112 (see FIGS. 15, 17, and 18) then transports the closed receptacle 12 from the incoming drop-off location to the selected receptacle slot 130 of the receptacle rack 114 and, in conjunction with the receptacle insertion stop assembly 148, performs a two-step receptacle insertion process to seat the closed receptacle 12 within the selected receptacle slot 130 of the receptacle rack 114 (step 406). Further details discussing the transport of the closed receptacle 12 from the incoming drop-off location to the selected receptacle slot 130 of the receptacle rack 114, and the subsequent two-step receptacle insertion process employed by the receptacle insertion stop assembly 148 and the robotic handler 154, will now be described.

Referring now to FIG. 33, one exemplary method 500 performed by the robotic handler 154 for transporting the closed receptacle 12 from the pick-up location to the selected receptacle slot 130, and for fully seating the closed receptacle 12 within the selected receptacle slot 130 for temporary storage within the receptacle storage module 30*d*, will be described. The method 500 will be described using the gripper apparatus 176 of the robotic handler 154, although it should be appreciated that the method 500 may use the gripper apparatus 176' in the same manner. The exemplary method 500 assumes that when the robotic handler 154 is at the home position, the gripper apparatus 176, while the jaw members 200*a*, 200*b* of the gripper apparatus 176 are in the open position (see FIGS. 23A and 23B), is vertically aligned the incoming drop-off location (in this case, when the incoming holder 172*a* of the receptacle transporter 152 is fully contained within the chamber 110 of the receptacle storage module 30*d* and positioned at the second, higher level). The exemplary method 500 also assumes that the pin 160 of the receptacle insertion stop assembly 148 associated with the vertical level 112 of the selected receptacle slot 130 of the receptacle rack 114 is at the second position beneath the base plate 124*c* of the receptacle rack 114. As briefly discussed above, the position control subsystem 178 of the controller 156 (see FIG. 20) controls XYZ movement of the gripper apparatus 176 via the gantry 174, and the gripper control subsystem 180 of the controller 156 (see FIG. 20) controls movement of the jaw members 200*a*, 200*b* of the gripper apparatus 176 between the open position (see FIGS. 23A, 23B, 26A, and 26B), a first closed position (see FIGS. 24A and 24B), and a second closed position (see FIGS. 27A and 27B).

The carriage 158 of the receptacle insertion stop assembly 148 is laterally moved to vertically align the pin 160 of the receptacle insertion stop assembly 148 with the selected receptacle slot 130 (step 502), and the pin 160 is raised to the first position within the selected empty receptacle slot 130, which is preferably between the base plate 124*c* and the second support plate 124*b* of the receptacle rack 114 (see FIG. 19), thereby providing the depth insertion stop for the selected receptacle slot 130 (step 504).

Figure 34:
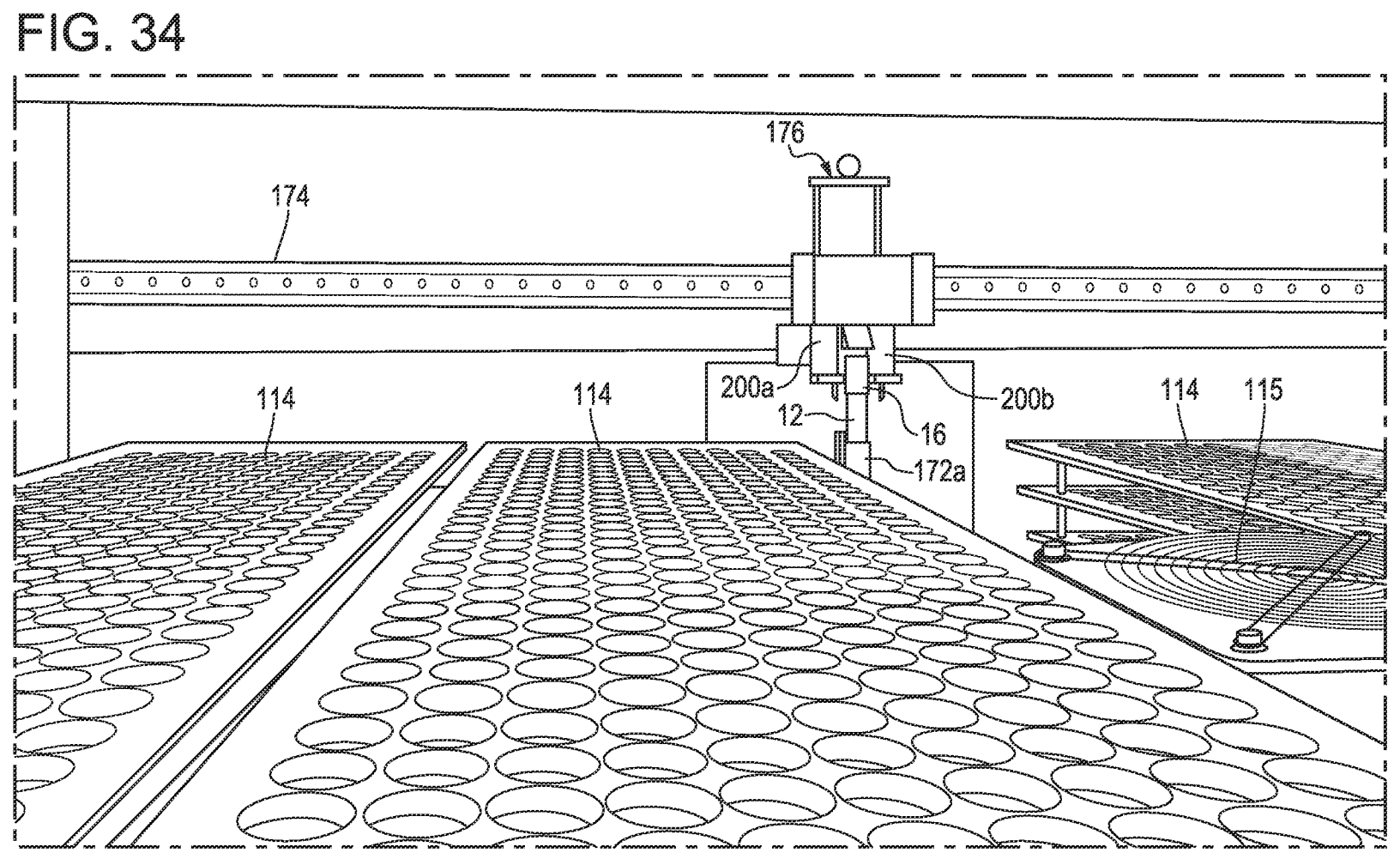
Figure 35:
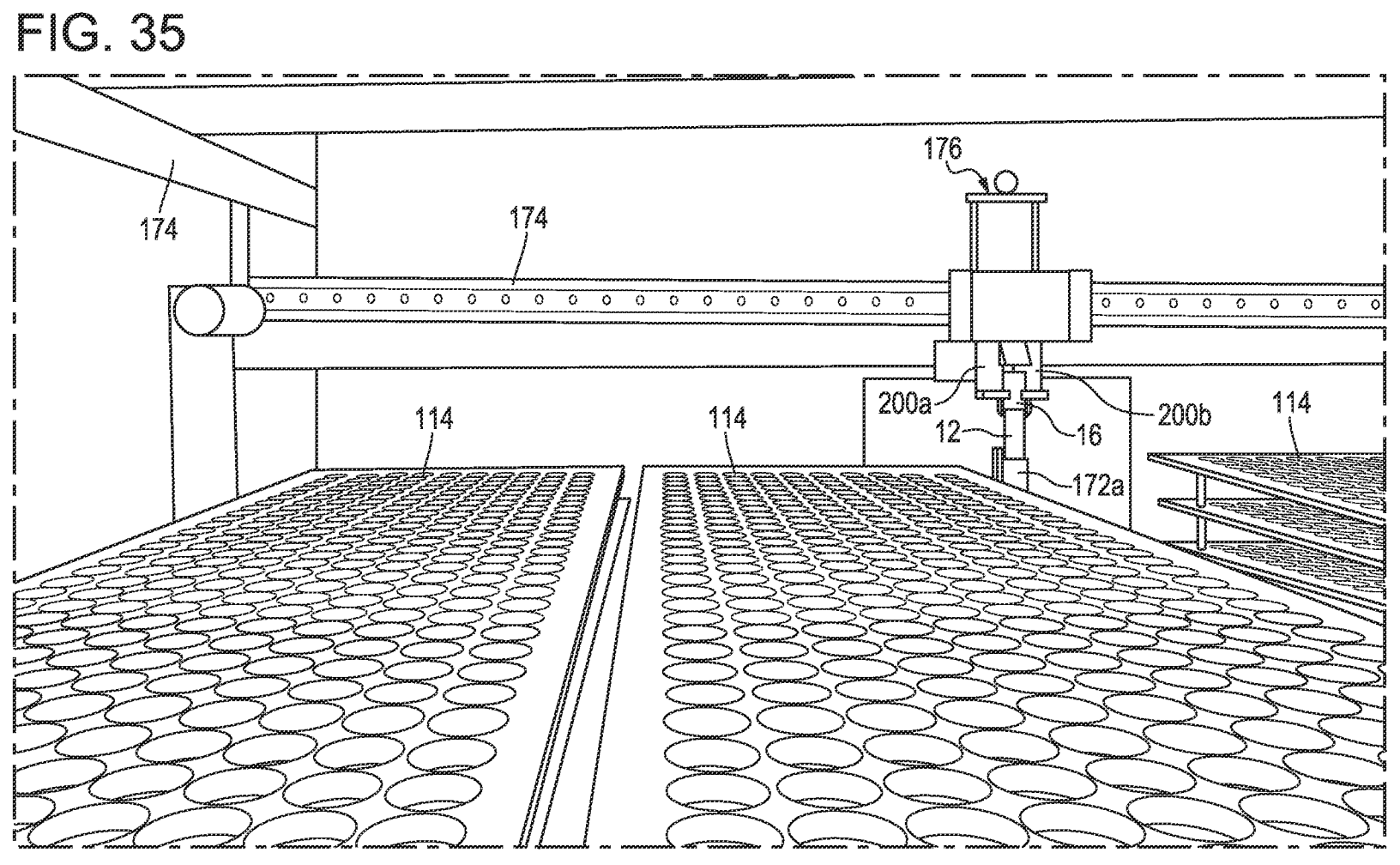

The gripper apparatus 176 of the robotic handler 154 is lowered until the jaw members 200*a*, 200*b*, which are in the open position, are laterally aligned (i.e., side-by-side relationship as used herein) with the sidewall 22 of the closure 16 of the receptacle 12 (as indicated by the proximity sensor 191) within the incoming holder 172*a* of the receptacle transporter 152 (step 506), as illustrated in FIG. 34. Next, the jaw members 200*a*, 200*b* are moved from the open position to the first closed position to grasp the sidewall 22 of the closure 16 of the receptacle 12 with the jaw members 200*a*, 200*b* (step 508), as illustrated in FIG. 35. In the illustrated embodiment, the jaw members 200*a*, 200*b* grasp the sidewall 22 of the closure 16 of the closed receptacle 12 with the contoured engagement faces 212 of the respective jaw members 200*a*, 200*b* (see FIGS. 24A and 2411). If the gripper apparatus 17' is used, the fingers 214*a'*-214*d'* will be in contact or near contact with the receptacle 14 of the closed receptacle 12 to aid in vertically aligning the closed receptacle 12 (see FIGS. 47, 49A and 49B).

Figure 36:
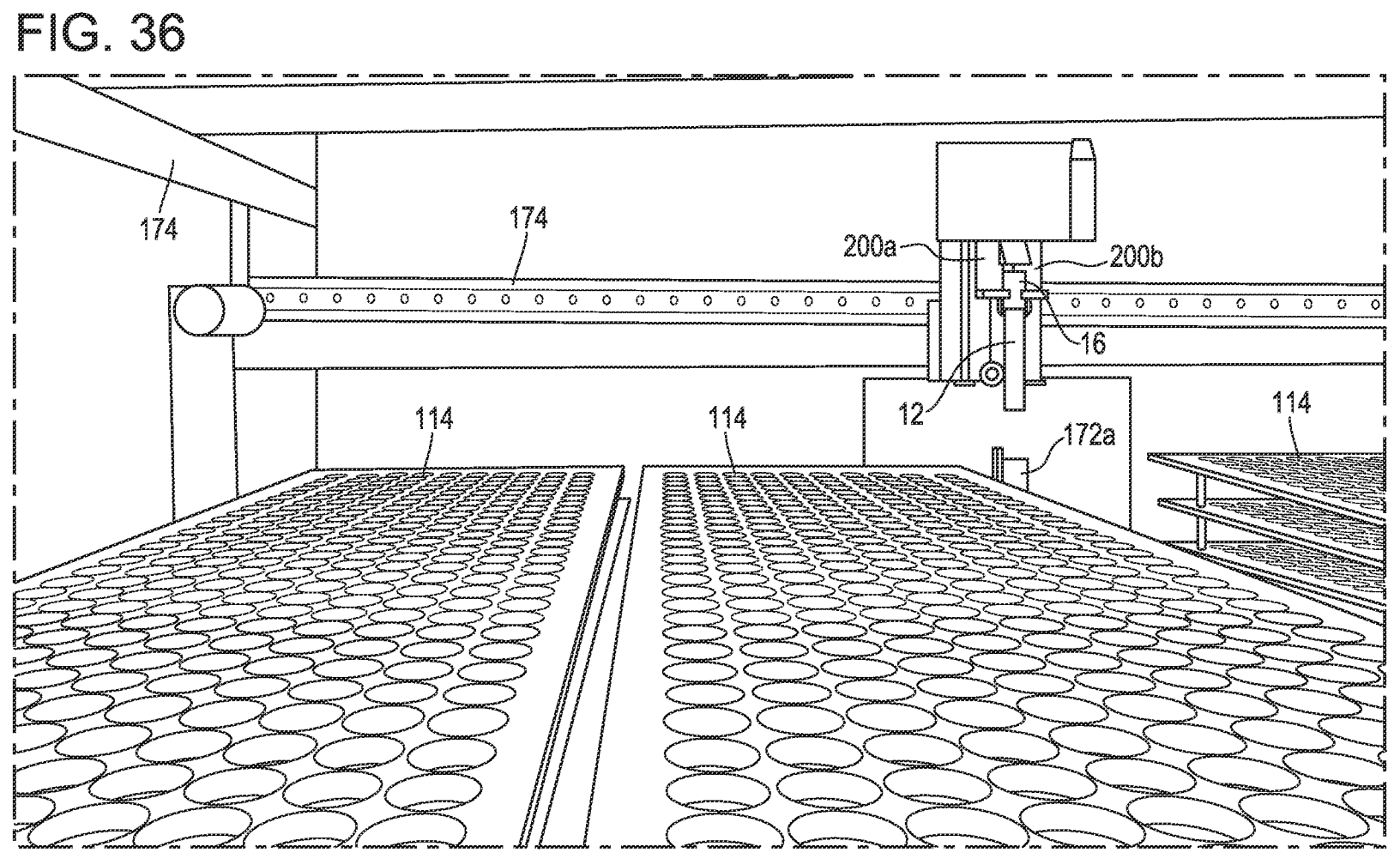
Figure 37:
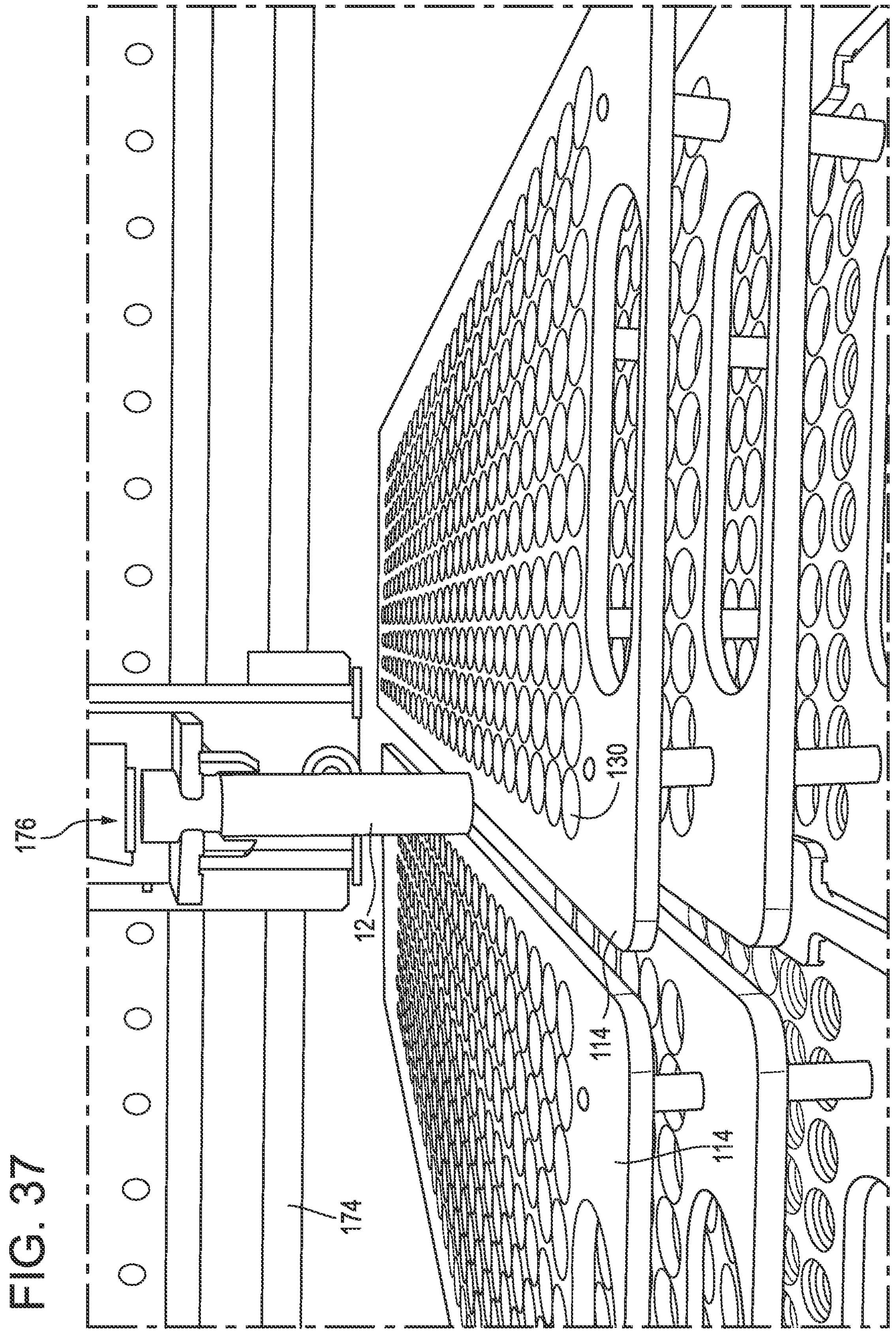
FIG. 37 is a perspective view of the gripper apparatus of FIG. 21, particularly showing the gripper apparatus with the grasped receptacle above a selected receptacle slot of a receptacle rack of FIG. 9.
Figure 38:
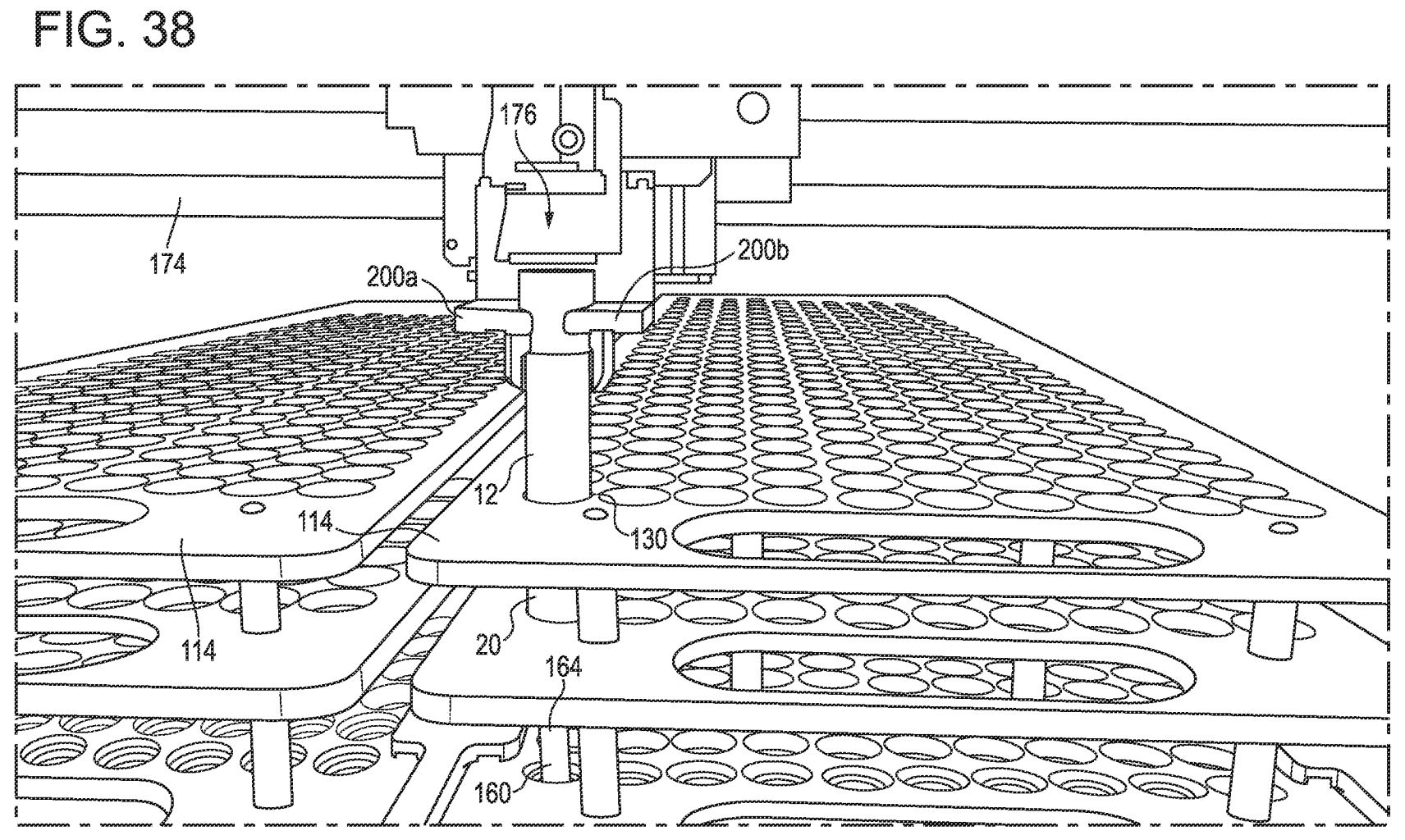

Next, while the jaw members 200*a*, 200*b* are in the first closed position, the gripper apparatus 176 is (i) raised to remove the grasped receptacle 12 from the incoming holder 172*a* of the receptacle transporter 152 (step 510), as illustrated in FIG. 36; (ii) laterally moved to position the grasped receptacle 12 in vertical alignment with the selected receptacle slot 130 of the receptacle rack 114 (step 512), as illustrated in FIG. 37; and lowered to partially insert the grasped receptacle 12 into the selected receptacle slot 130, i.e., until the bottom end 20 of the receptacle 12 contacts the tip 164 of the pin 160 of the receptacle insertion stop assembly 148 (step 514), as illustrated in FIG. 38. It should be appreciated that the jaw members 200*a*, 200*b* at all times remain above a seated receptacle plane defined by the top surfaces 24 of receptacles 12 seated in adjacent receptacle slots of the receptacle rack 114 (as shown in FIG. 21).

Figure 39:
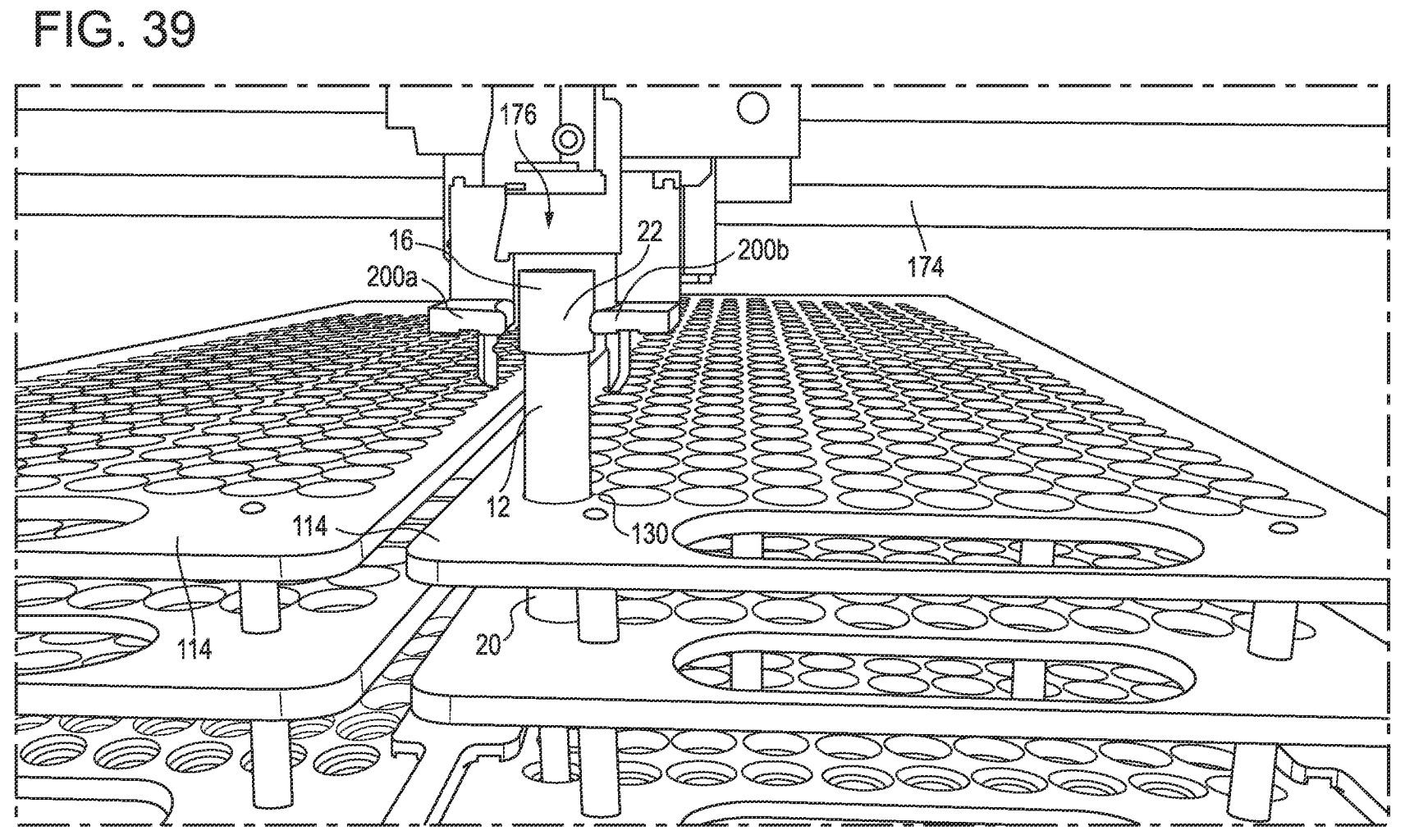
Figure 40:
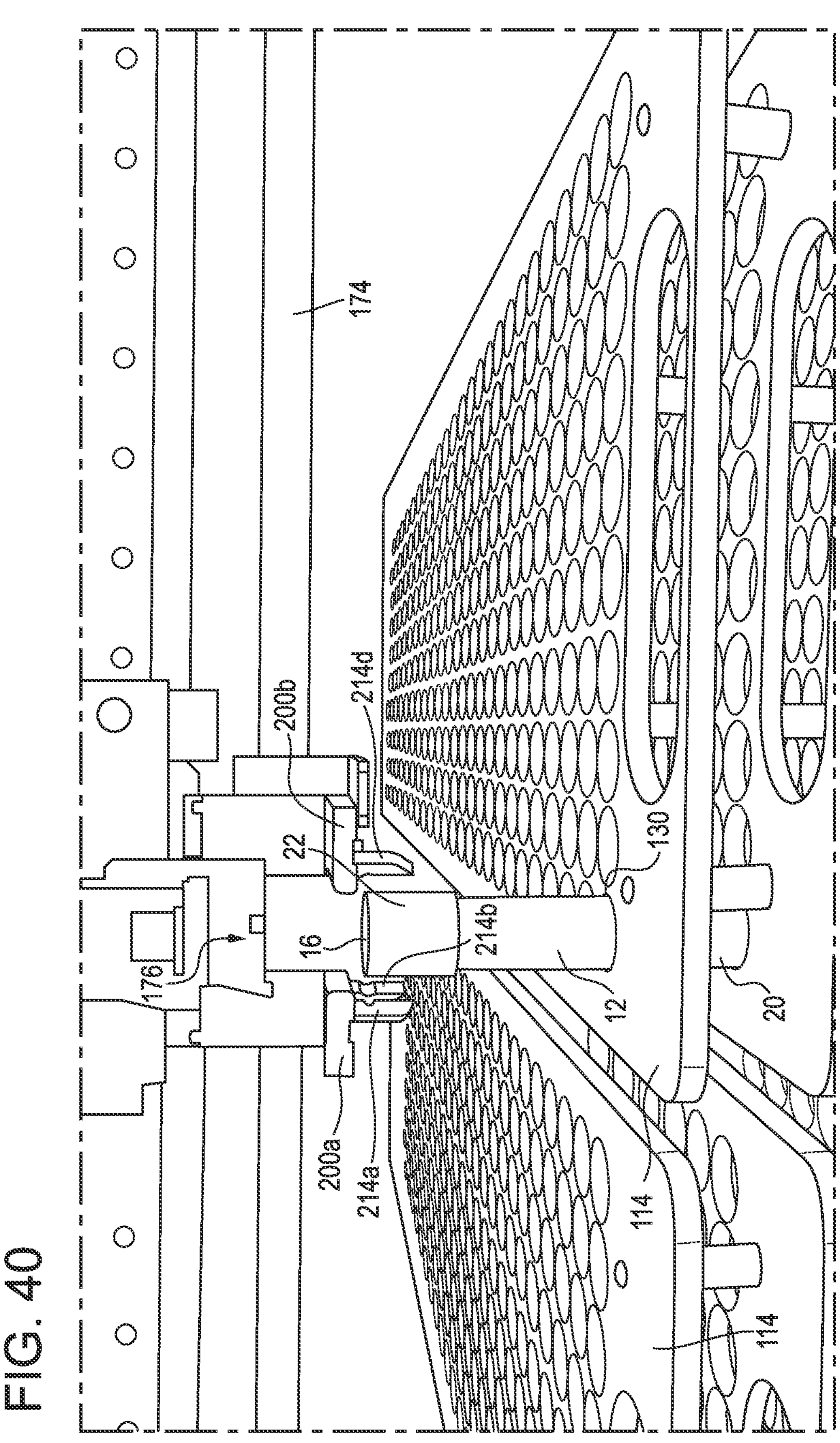
FIG. 40 is a perspective view of gripper apparatus of FIG. 21, particularly showing gripper apparatus in the open position and the fingers are laterally aligned with the cap of the receptacle while partially inserted within the selected receptacle slot of the receptacle rack.
Figure 41:
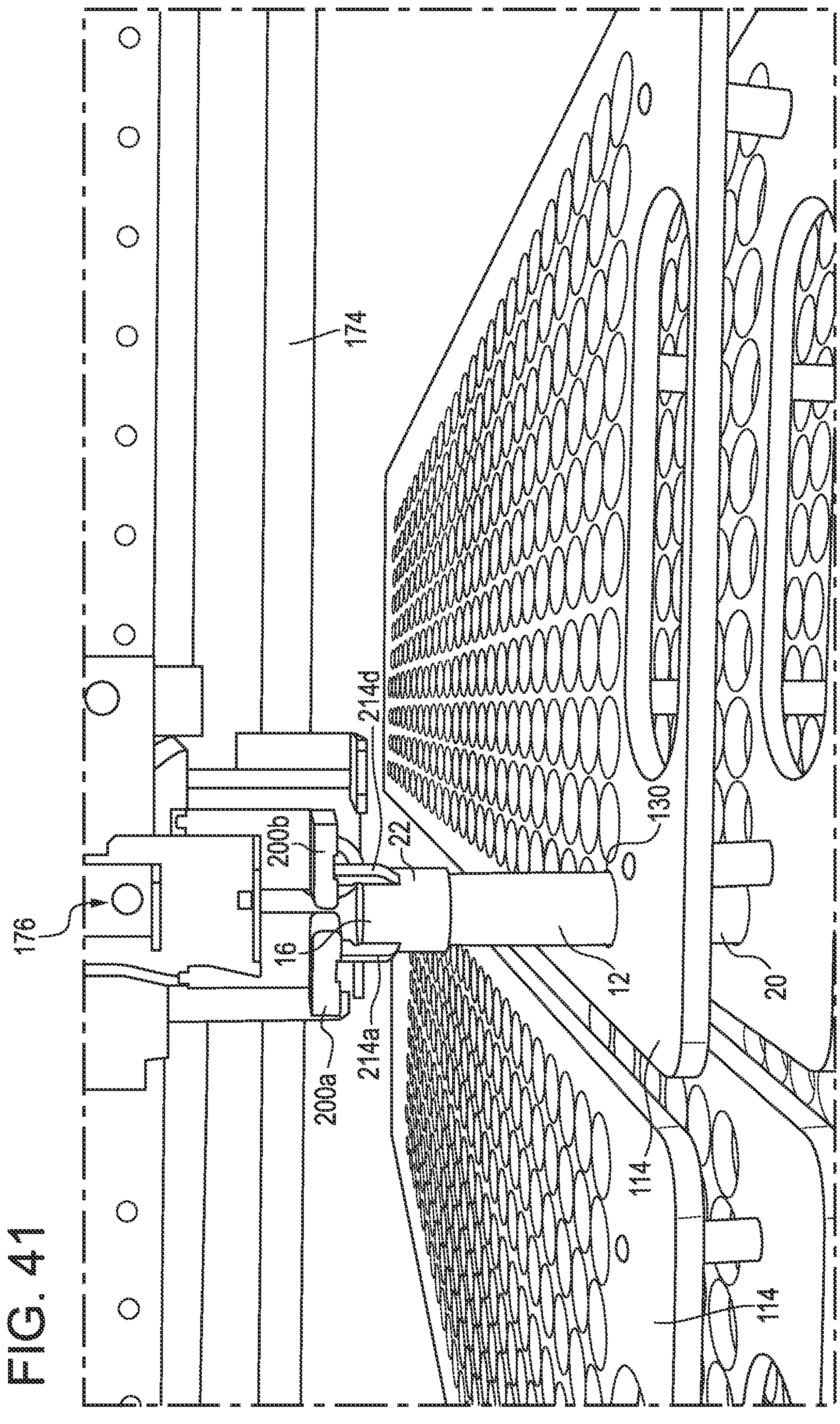
FIG. 41 is a perspective view of the gripper apparatus of FIG. 21, particularly showing the jaw members grasping the cap of the receptacle with the fingers in the second closed position while the receptacle is partially inserted within the selected receptacle slot of the receptacle rack.

Next, the jaw members 200*a*, 200*b* are moved from the first closed position to the open position to release the partially inserted receptacle 12, as illustrated in FIG. 39 (step 516), and the gripper apparatus 176 is then raised until the fingers 214*a*-214*d* are laterally aligned with the sidewall 22 of the closure 16 of the partially inserted receptacle 12 (as indicated by the proximity sensor 191), as illustrated in FIG. 40 (step 518). Notably, the pin 160 of the receptacle insertion stop assembly 148 supports the partially inserted receptacle 12 within the receptacle slot 130 when the jaw members 200*a*, 200*b* are moved from the first closed position to the open position. The jaw members 200*a*, 200*b* are then moved from the open position to the second closed position so that the fingers 214*a*-214*d* grasp the sidewall 22 of the closure 16 with the fingers 214*a*-214*d*, as illustrated in FIG. 41 (step 520). In the illustrated embodiment, the fingers 214*a*-214*d* grasp the sidewall 22 of the closure 16 of the closed receptacle 12 with the contact faces 218 of the respective fingers 214*a*-214*d* (see FIGS. 27A and 27B). It should be appreciated that although the method 500 has been described as providing a depth insertion stop within the selected receptacle slot 130 at steps 502-504 prior to removal of the receptacle 12, either of the depth insertion stop steps 502 or 504 can be performed at any time prior to releasing the partially inserted receptacle 12 at step 516.

Figure 42:
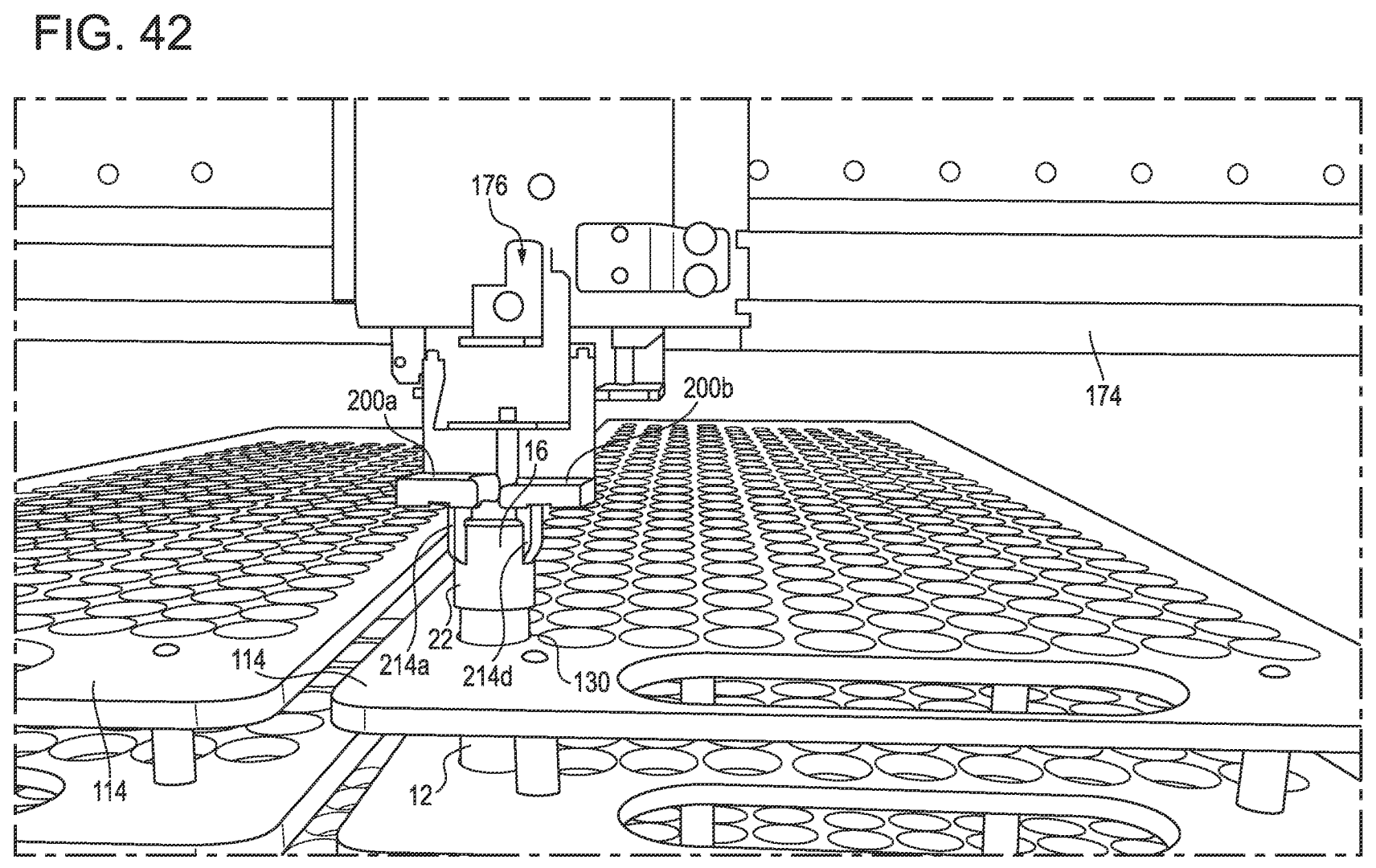

While the Jaw members 200*a*, 200*b* are in the second closed position, the pin 160 of the receptacle insertion stop assembly 148 is lowered to the second position beneath the base plate 124*c* of the receptacle rack 114, thereby removing the depth insertion stop from the selected receptacle slot 130 (step 522). The gripper apparatus 176 is then lowered until the grasped receptacle 12 is seated within the selected receptacle slot 130; i.e., until the bottom end 20 of the receptacle 12 contacts the tapered opening 128*c* of the base plate 124*c* of the receptacle rack 114, as illustrated in FIG. 42 (step 524). In the illustrated embodiment, the fingers 214*a*-214*d* are configured (i.e., sized and arranged), such that each of the fingers 214*a*-214*d* is situated in the interstitial space 230 at least partially defined by a pair of neighboring receptacles 12 when the grasped receptacle 12 is in the seated position, as illustrated in FIG. 3011. To avoid cross-contamination between receptacles 12, it is preferable that the fingers 214*a*-214*d* not contact the closures 16 of neighboring receptacles 12, especially the top surfaces 24 of the closures 16, during steps 514-524. It should be appreciated that although the method 500 has been described as removing the depth insertion stop from the selected receptacle slot 130 at step 522, either of the depth insertion stop steps 502 or 504 can be performed at any time prior to releasing the partially inserted receptacle 12 at step 516.

Figure 43:
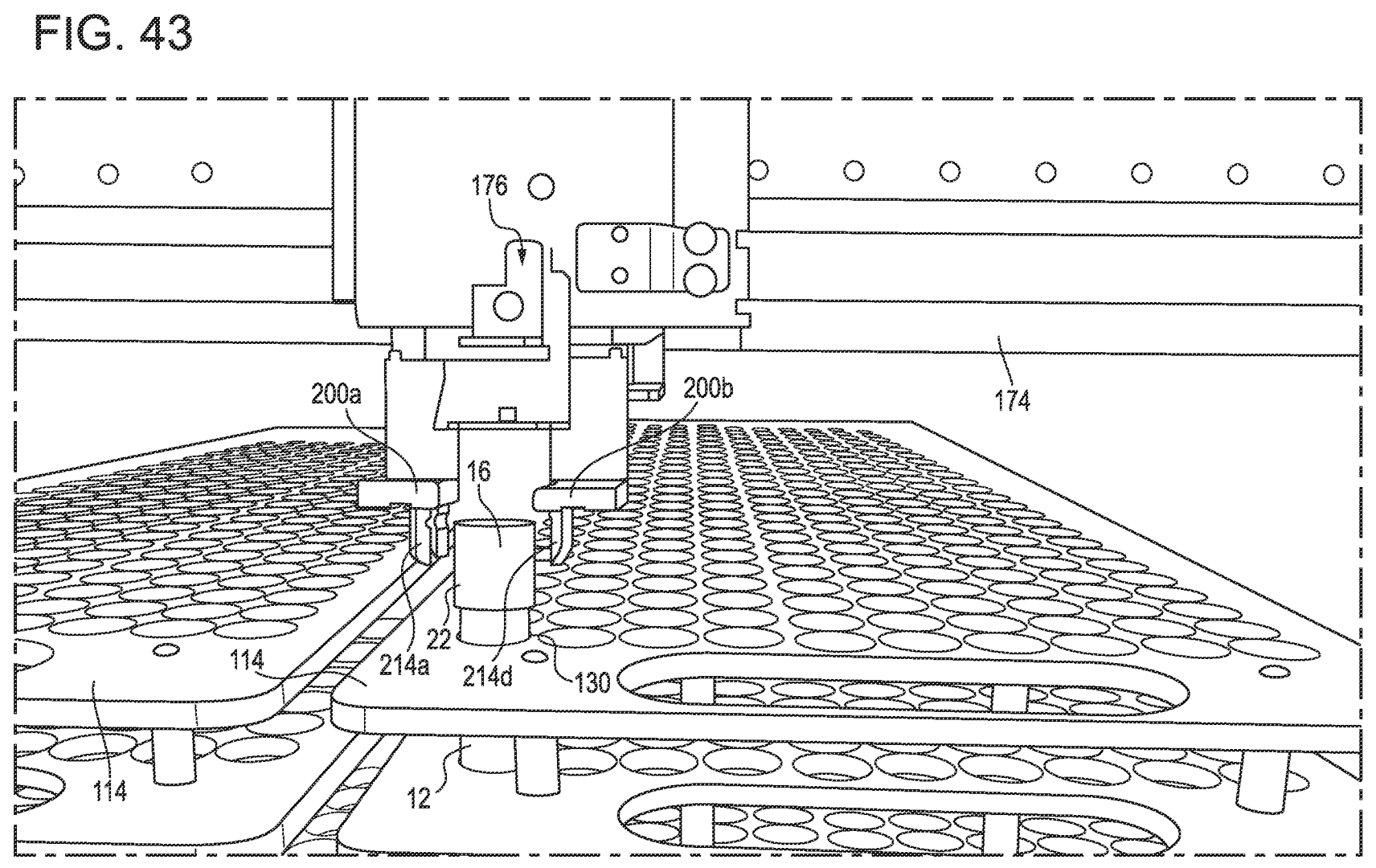
Figure 44:
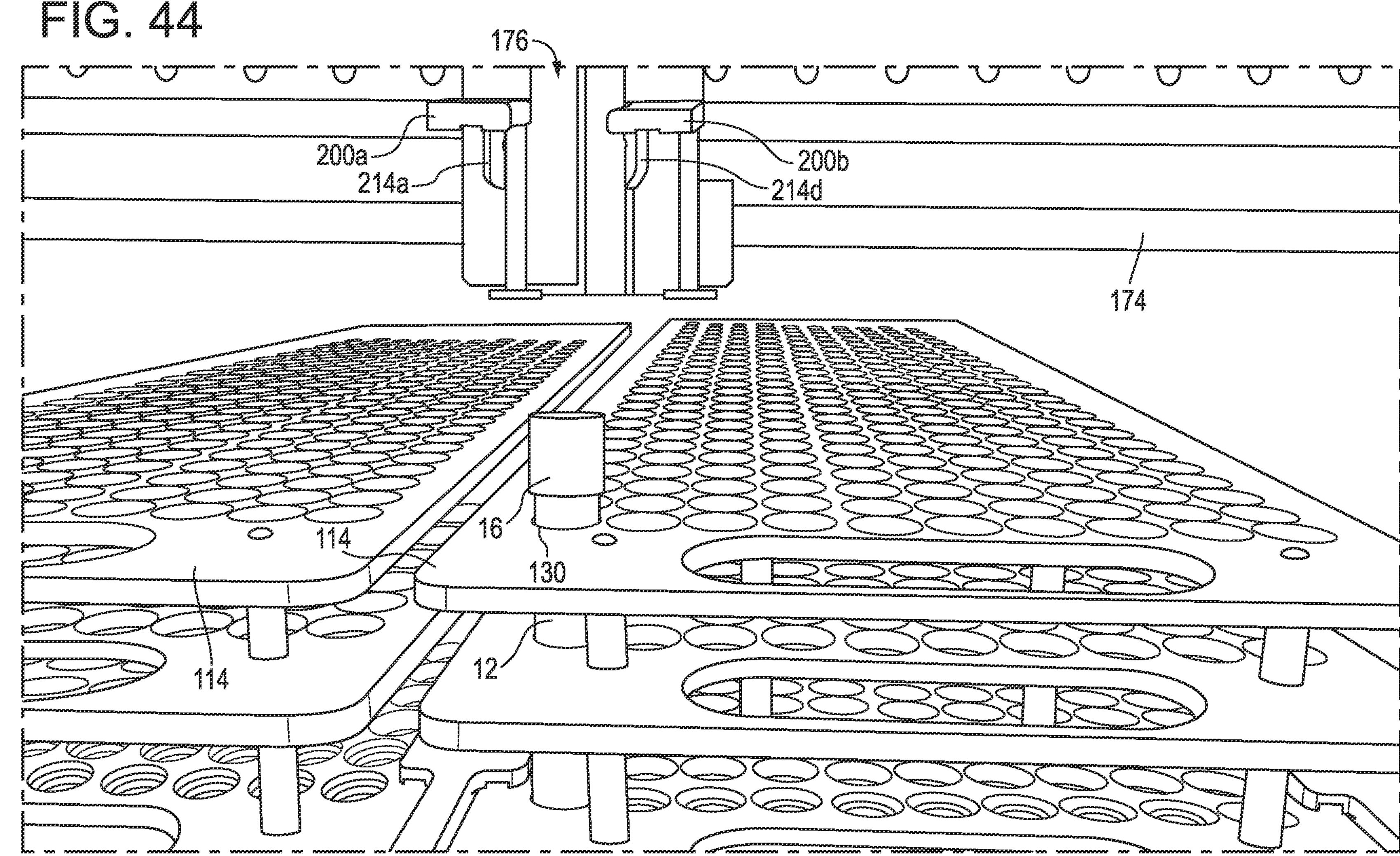
FIG. 44 is a perspective view of gripper apparatus of FIG. 21, particularly showing the fingers of the gripper apparatus above the cap of the receptacle while seated within the selected receptacle slot of the receptacle rack.

Once the closed receptacle 12 is seated in the selected receptacle slot 130, the gripper apparatus 176 can be moved back to the home position. During this process, (i) the jaw members 200*a*, 200*b* are moved from the second closed position to the open position, thereby releasing the seated receptacle 12, as illustrated in FIG. 43 (step 526); (ii) the gripper apparatus 176 is raised until the fingers 214*a*-214*d* are situated above the closure 16 of the seated receptacle 12, as illustrated in FIG. 44 (step 528); and (iii) the gripper apparatus 176 is laterally moved until the gripper apparatus 176 is vertically aligned with the incoming drop-off location (step 530).

Figure 45:
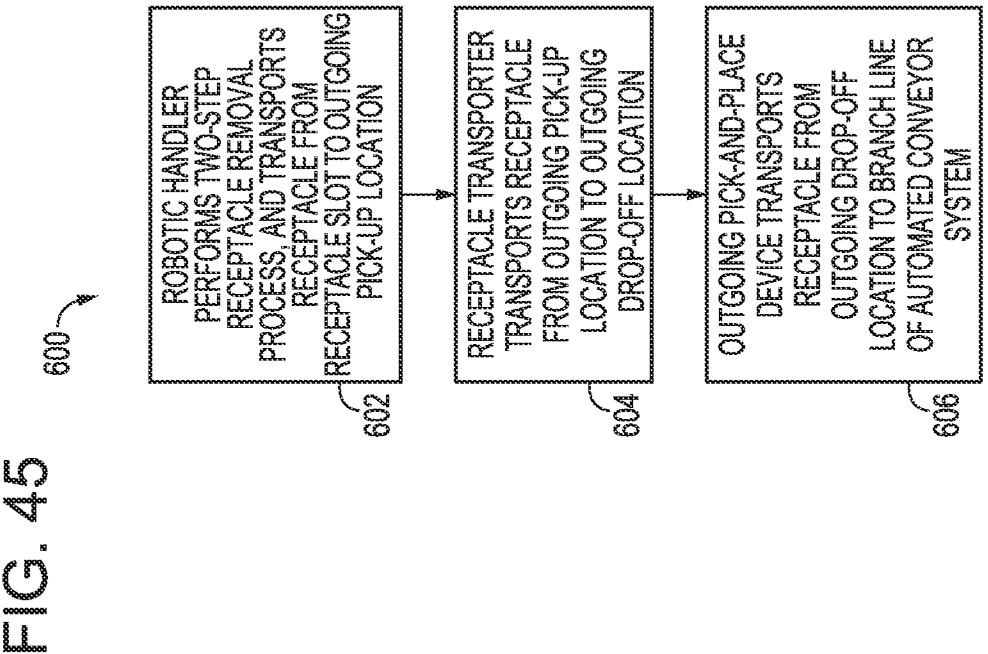
FIG. 45 is a flow diagram of one exemplary method of transporting a seated receptacle from the receptacle storage module of FIG. 9 to an automated conveyor system of the specimen processing system of FIG. 1.

Referring now to FIG. 45, an exemplary method 600 for returning a closed and seated receptacle 12 to the branch line 102 of the automated conveyor system 32 associated with the receptacle storage module 30*d* will now be described, Although the method 600 described below is with respect to one closed receptacle 12, it should be appreciated that multiple closed receptacles 12 are capable of being individually transported from the receptacle storage module 30 to the branch line 102, and thus, the method 600 can be repeated for each of a number of closed and seated receptacles 12 to be transported from the receptacle storage module 30*d* to the branch line 102. The exemplary method 600 initially assumes that the stop feature 106 has immobilized an empty receptacle carrier 62 (see FIGS. 11 and 14) in which the closed receptacle 12 will be disposed.

Using a two-step receptacle removal process, the robotic handler 154 associated with the level 112 (see FIGS. 15, 17, and 18) removes the closed receptacle 12 from the selected receptacle slot 130 of the receptacle rack 114, and transports the closed receptacle from the selected receptacle slot 130 to the outgoing pick-up location (step 602). Further details discussing the two-step receptacle removal process employed by the robotic handler 154, and the subsequent transport of the closed receptacle 12 from the selected receptacle slot 130 of the receptacle rack 114 to the outgoing pick-up location, will be described in further detail below with respect to the method 700 of FIG. 46.

Next, the receptacle transporter 152 (see FIGS. 17 and 18) moves the closed receptacle 12 from the outgoing pick-up location to the outgoing drop-off location (step 604). In the illustrated embodiment, this step is accomplished by (i) moving the outgoing holder 172*b* of the receptacle transporter 152 upward from an initial level to the second, higher level at the outgoing pick-up location; (ii) receiving the closed receptacle 12 from the robotic handler 154; (iii) moving the outgoing holder 172*b* downward from the second, higher level to the initial level; (iv) opening the door 123 associated with the outgoing opening 122*b*; and (v) laterally moving the sled 170 of the receptacle transporter 152 from the second location spaced away from the outgoing opening 122*b* to the first location proximate the outgoing opening 122*b*, such that the outgoing holder 172*b* extends through the outgoing opening 122*b* at the outgoing drop-off location.

Next, the outgoing pick-and-place device 150*b* (see FIGS. 11 and 16) transports the closed receptacle 12 from outgoing drop-off location to the main conveyor 44 of the automated conveyor system 32 (in this case, to the immobilized receptacle carrier 62 on the branch line 102) (step 606). In the illustrated embodiment, this step is accomplished by (i) grasping the receptacle 14 of the closed receptacle 12 supported by the outgoing holder 172*b* with the gripper 168 of the outgoing pick-and-place device 150*b*; (ii) moving the carriage 166 of the outgoing pick-and-place device 150*b* upward, thereby removing the grasped receptacle 12 from the outgoing holder 172*b* of the receptacle transporter 152; (iii) laterally moving the sled 104 of the receptacle transporter 152 from the first location proximate the incoming opening 122*a* to the second location, which is spaced apart from the outgoing opening 122*b*, such that the outgoing holder 172*b* of the receptacle transporter 152 is fully retracted from the outgoing opening 122*b* when the sled 170 is at the second location; (iv) closing the door 123 associated with the outgoing opening 122*b*; (v) laterally moving the carriage 166 of the outgoing pick-and-place device 150*b* to a level adjacent the branch line 104 (downward if the outgoing opening 122*b* is above the branch line 104 and upward if the outgoing opening 122*b* is below the branch line 104); (vi) rotating the gripper 168 of the outgoing pick-and-place device 150*b* outward to the second position offset from the back 120 of the housing 108, such that the gripper 168 is situated immediately above an immobilized empty receptacle carrier 62 held by the stop feature 106; (vii) moving the carriage 166 of the outgoing pick-and-place device 150*b* downward, thereby inserting the grasped receptacle 12 into the immobilized receptacle carrier 62; (viii) releasing the receptacle 12 from the grasp of the gripper 168 of the outgoing pick-and-place device 150*b*; (ix) raising the carriage 166 of the outgoing pick-and-place device 150*b* so that the gripper 168 is positioned above the released receptacle 12; and (x) returning the outgoing pick-and-place device 150*b* to its home position by rotating the carriage 166 of the outgoing pick-and-place device 150*b* inward toward a position adjacent the back 120 of the housing 108.

Referring now to FIG. 44, one exemplary method 700 performed by the robotic handler 154 to transport a closed and seated receptacle 12 from the selected receptacle slot 130 of the receptacle rack 114 to the delivery position will be described. The exemplary method 700 assumes that the robotic handler 154 is in the home position (described above with respect to the method 500). As briefly discussed above, the position control subsystem 178 of the controller 156 (see FIG. 20) controls XYZ movement of the gripper apparatus 176 via the gantry 174, and the gripper control subsystem 180 of the controller 156 (see FIG. 20) controls movement of the jaw members 200*a*, 200*b* of the gripper apparatus 176 between the open position (see FIGS. 23A, 23B, 26A, and 26B), a first closed position (see FIGS. 24A and 24B), and a second closed position (see FIGS. 27A and 27B).

The carriage 158 of the receptacle insertion stop assembly 148 is laterally moved to vertically align the pin 160 of the receptacle insertion stop assembly 148 with the selected receptacle slot 130 (step 702). The gripper apparatus 176 is laterally moved to position the fingers 214*a*-214*d* in vertical alignment with the selected receptacle slot 130 of the receptacle rack 114, such that the fingers 214*a*-214*d* are positioned above the closed and seated receptacle 12, as illustrated in FIG. 44 (step 704). With the jaw members 200*a*, 200*b* in the open position, the gripper apparatus 176 is then lowered until the fingers 214*a*-214*d* are laterally aligned with the sidewall 22 of the closure 16 of the closed and seated receptacle 12 (as indicated by the proximity sensor 191), as illustrated in FIG. 43 (step 706). In the illustrated embodiment, the fingers 214*a*-214*d* are configured (i.e., sized and arranged), such that each of the fingers 214*a*-214*d* is situated in the interstitial space 230 at least partially defined by a pair of neighboring receptacles 12 when the grasped receptacle 12 is in the seated position, as illustrated in FIG. 30B.

Next, the jaw members 200*a*, 200*b* are moved from the open position to the second closed position so that the sidewall 22 of the closure 16 of the seated receptacle 12 is grasped by the fingers 214*a*-214*d*, as illustrated in FIG. 42 (step 708). In the illustrated embodiment, the fingers 214*a*-214*d* grasp the sidewall 22 of the closure 16 of the closed receptacle 12 with the contact faces 218 of the respective fingers 214*a*-214*d* (see FIGS. 27A and 2711). The gripper apparatus 176 is raised to unseat and partially remove the grasped receptacle 12 from the selected receptacle slot 130, as illustrated in FIG. 41 (step 710). The pin 160 of the receptacle insertion stop assembly 148 is raised to the first position within the selected empty receptacle slot 130 between the base plate 124*c* and the second support plate 124*b* of the receptacle rack 114 (see FIG. 19), thereby supporting the partially removed receptacle 12 in the selected receptacle slot 130 (step 712). The jaw members 200*a*, 200*b* are then moved from the second closed position to the open position to release the partially removed receptacle 12, as illustrated in FIG. 40 (step 714). In an alternative embodiment, in lieu of steps 704-714, the pin 160 is raised to the first position within the selected receptacle slot 130 between the base plate 124*c* and the second support plate 124*b* to force the fully seated receptacle 12 upward in the selected receptacle slot 130, thereby partially removing the receptacle 12 from the selected receptacle slot 130.

In either embodiment, the gripper apparatus 176 is lowered until the jaw members 200*a*, 200*b* are laterally aligned with the sidewall 22 of the closure 16 of the partially removed receptacle 12 (as indicated by the proximity sensor 191), as illustrated in FIG. 39 (step 716). The jaw members 200*a*, 200*b* are then moved from the open position to the first closed position to grasp the sidewall 22 of the closure 16 of the closed receptacle 12, as illustrated in FIG. 38 (step 718). In the illustrated embodiment, the jaw members 200*a*, 200*b* grasp the sidewall 22 of the closure 16 of the closed receptacle 12 with the contoured engagement faces 212 of the respective jaw members 200*a*, 200*b* (see FIGS. 24A and 24B). If the gripper apparatus 176' is used, the fingers 214*a'*-214*d'* will be in contact or near contact with the receptacle 14 of the closed receptacle 12 to aid in vertically aligning the closed receptacle 12 (see FIGS. 47, 49A and 49B). While the jaw members 200*a*, 200*b* are in the first closed position (or after removal of the receptacle 12), the pin 160 of the receptacle insertion stop assembly 148 may be lowered to the second position beneath the base plate 124*c* of the receptacle rack 114 (step 720). The gripper apparatus 176 is then raised to fully remove the grasped receptacle 12 from the selected receptacle slot 130, as illustrated in FIG. 37 (step 722).

Next, the gripper apparatus 176 is laterally moved to position the grasped receptacle 12 in vertical alignment with the outgoing holder 172*b* of the receptacle transporter 152, as illustrated in FIG. 36 (step 724). The gripper apparatus is then lowered to insert the grasped receptacle 12 into the outgoing holder 172*b* of the receptacle transporter 152, as illustrated in FIG. 35 (step 726). Finally, the jaw members 200*a*, 200*b* are moved from the first closed position to the open position to release the inserted receptacle 12, as illustrated in FIG. 34 (step 728).

After releasing the inserted receptacle 12, the gripper apparatus 176 can then be moved back to the home position During this process, (i) the gripper apparatus 176 is raised until the fingers 214*a*-214*d* are situated above the closure 16 of the seated receptacle 12, as illustrated in FIG. 44 (step 730); and (ii) the gripper apparatus 176 is laterally moved until the gripper apparatus 176 is vertically aligned with the incoming drop-off location (step 732).

EMBODIMENTS

One or more of the following features and benefits may be encompassed by or achievable by embodiments described herein.

Embodiment 1. A gripper apparatus configured to grasp a closed receptacle having a receptacle and a closure affixed to an open top end of the receptacle, the gripper apparatus comprising: opposed jaw members capable of lateral movement relative to each other between an open position, a first closed position, and a second closed position, the jaw members being configured to grasp a sidewall of the closure of the closed receptacle when the closure of the closed receptacle is situated between the jaw members at the first closed position, and the jaw members being configured to release the closed receptacle at the open position; and a plurality of fingers, each of the jaw members having at least one of the plurality of fingers depending from a base thereof, wherein the plurality of fingers are configured to grasp the sidewall of the closure beneath a top surface of the closure when the closure is situated (i) between the plurality of fingers and (ii) beneath the base of each of the jaw members as the jaw members move laterally toward each other from the open position, and wherein the plurality of fingers grasp the sidewall of the closure at the second closed position.

Embodiment 2. The gripper apparatus of embodiment 1, wherein the jaw members are configured to grasp the sidewall of the closure at the first closed position.

Embodiment 3. The gripper apparatus of embodiment 2, wherein the plurality of fingers are configured to be in contact or near contact with the receptacle when the jaw members grasp the sidewall of the closure at the first closed position.

Embodiment 4. The gripper apparatus of embodiment 3, wherein the plurality of fingers are configured to be in contact with the receptacle when the jaw members grasp the sidewall of the closure at the first closed position.

Embodiment 5. The gripper apparatus of embodiment 3, wherein each of the plurality of fingers is within 0.25 mm of the receptacle when the receptacle is centered between the plurality of fingers.

Embodiment 6. The gripper apparatus of any one of embodiments 1 to 5, wherein each of the jaw members has a contoured engagement face for grasping the sidewall of the closure, and wherein the closure and the receptacle each have a cylindrical shape.

Embodiment 7. The gripper apparatus of embodiment 6, wherein the contoured engagement face of each of the jaw members is a rounded recess, and wherein the contoured engagement faces are mirror images of each other.

Embodiment 8. The gripper apparatus of embodiment 6, wherein the contoured engagement face of each of the jaw members is a V-shaped recess, and wherein the contoured engagement faces are mirror images of each other.

Embodiment 9. The gripper apparatus of any one of embodiments 6 to 8, wherein the contoured engagement face of each of the jaw members comprises a plurality of laterally oriented grooves, and wherein each adjacent pair of grooves forms a lateral edge.

Embodiment 10. The gripper apparatus of any one of embodiments 6 to 9, wherein the jaw members are capable of contacting each other in the absence of the closed receptacle being situated between the jaw members, and wherein the contoured engagement faces define an opening when the jaw members are in contact with each other.

Embodiment 11. The gripper apparatus of embodiment 10, wherein the jaw members do not contact each other when the closed receptacle is situated between the jaw members and the jaw members are at the first closed position.

Embodiment 12. The gripper apparatus of any one of embodiments 1 to 11, wherein each of the jaw members has two or more of the plurality of fingers depending from the base thereof.

Embodiment 13. The gripper apparatus of embodiment 12, wherein each of the jaw members has only two of the plurality of fingers depending from the base thereof.

Embodiment 14. The gripper apparatus of any one of embodiments 1 to 13, wherein each of the plurality of fingers comprises an inner surface having a contact face configured to engage the sidewall of the closure when the closure is situated (i) beneath the base of each of the jaw members and (ii) between the plurality of fingers at the second closed position.

Embodiment 15. The gripper apparatus of embodiment 14, wherein the contact face of each of the plurality of fingers is knurled.

Embodiment 16. The gripper apparatus of embodiment 14 or 15, wherein the contact face of each of the plurality of fingers is oriented toward an axial center of the closure when the sidewall of the closure is grasped by the plurality of fingers at the second closed position.

Embodiment 17. The gripper apparatus of any one of embodiments 14 to 16, wherein the inner surface of each of the plurality of fingers includes a recess situated adjacent to and above the contact face, the recess being configured so that there is no contact between the recess and the closure at the second closed position.

Embodiment 18. The gripper apparatus of embodiment 17, wherein an upper region of the inner surface of each of the plurality of fingers slopes inward from the recess toward the base of one of the jaw members, such that when the sidewall of the closure is grasped by the plurality of fingers at the second closed position, at least a portion of the upper region of the inner surface is situated directly above the top surface of the closure.

Embodiment 19. The gripper apparatus of any one of embodiments 1 to 18, wherein each of the plurality of fingers comprises an outer surface having a generally vertical upper region and a tapered lower region.

Embodiment 20. The gripper apparatus of any one of embodiments 1 to 19, wherein the plurality of fingers have a grasping force greater than one pound.

Embodiment 21. The gripper apparatus of any one of embodiments 1 to 20, further comprising a proximity sensor situated above the jaw members for detecting a position of the closed receptacle with respect to the jaw members.

Embodiment 22. A robotic handler, comprising: the gripper apparatus of any one of embodiments 1 to 21; and a gantry operatively supporting the gripper apparatus and configured to provide the gripper apparatus with XYZ movement.

Embodiment 23. A gripper apparatus configured to grasp a closed receptacle, comprising: a pair of opposed, translatable support members; and a plurality of fingers depending from the support members, each of the support members having at least one of the plurality of fingers depending therefrom, and each of the plurality of fingers comprising an inner surface having a generally vertical lower region and a recess situated between the generally vertical lower region and the corresponding support member.

Embodiment 24. The gripper apparatus of embodiment 23, further comprising an upper region situated between each recess and the corresponding support member, wherein the upper region is inwardly sloping.

Embodiment 25. The gripper apparatus of embodiment 24, wherein each of the support members has two or more of the plurality of fingers depending therefrom.

Embodiment 26. The gripper apparatus of embodiment 25, wherein each of the support members has only two of the plurality of fingers depending therefrom.

Embodiment 27. The gripper apparatus of any one of embodiments 23 to 26, wherein the generally vertical lower region of the inner surface of each of the plurality of fingers is knurled.

Embodiment 28. The gripper apparatus of any one of embodiments 23 to 27, wherein each of the plurality of fingers comprises an outer surface having a generally vertical tipper region and a tapered lower region.

Embodiment 29. The gripper apparatus of any one of embodiments 23 to 28, wherein the plurality of fingers are configured so that the vertical lower region of the inner surface of each of the plurality of fingers contacts a cylindrical surface of an object grasped by the plurality of fingers.

Embodiment 30. The gripper apparatus of any one of embodiments 23 to 29, wherein the plurality of fingers have a grasping force greater than one pound.

Embodiment 31. A closed receptacle grasped by the gripper apparatus of any one of embodiments 23 to 30, wherein the closed receptacle includes a receptacle and a closure affixed to an open top end of the receptacle, and wherein the closure is grasped between the plurality of fingers with the lower region of the inner surface of each finger contacting a sidewall of the closure beneath a top surface of the closure.

Embodiment 32. The closed receptacle of embodiment 31, wherein the top surface of the closure is piercable.

Embodiment 33. The closed receptacle of embodiment 32, wherein the top surface of the closure has been pierced.

Embodiment 34. A method of grasping a closed receptacle with the gripper apparatus of any one of embodiments 23 to 30, wherein the closed receptacle includes a receptacle and a closure affixed to an open top end of the receptacle, and wherein the method comprises: positioning the support members so that the lower region of the inner surface of each finger is aligned with a sidewall of the closure; and translating the support members toward each other to grasp the closure between the plurality of fingers with the lower region of the inner surface of each finger contacting the sidewall of the closure beneath a top surface of the closure.

Embodiment 35. A robotic handler, comprising: the gripper apparatus of any one of embodiments 23 to 30; and a gantry operatively supporting the gripper apparatus and configured to provide the gripper apparatus with XYZ movement.

Embodiment 36. A receptacle storage module, comprising: a housing defining a chamber; a plurality of vertically spaced levels contained within the chamber, each of the levels being configured to support one or more receptacle racks; and a plurality of robotic handlers, each of the robotic handlers being operatively associated with one of the levels, and each of the robotic handlers being the robotic handler of embodiment 22 or 35.

Embodiment 37. The receptacle storage module of embodiment 36, wherein a front of the housing comprises one or more pairs of doors for accessing the levels.

Embodiment 38. The receptacle storage module of embodiment 36 or 37, wherein a back of the housing comprises one or more openings configured to receive a receptacle therethrough.

Embodiment 39. The receptacle storage module of embodiment 38 further comprising a pick-and-place device associated with each of the one or more openings for grasping the receptacle and transporting the receptacle through the respective opening and into the housing.

Embodiment 40. The receptacle storage module of embodiment 39 further comprising a receptacle transporter associated with at least one of the openings, the receptacle transporter being configured to receive a single receptacle from the respective pick-and-place device and to transport the receptacle to multiple, different pick-up locations, each of the pick-up locations being associated with one of the plurality of levels of the receptacle storage module, and the receptacle being accessible by an associated one of the plurality of robotic handlers at each of the pick-up locations.

Embodiment 41. The receptacle storage module of any one of embodiments 36 to 40, wherein at least one of the levels supports a receptacle rack holding a plurality of receptacles in linear rows.

Embodiment 42. The receptacle storage module of any one of embodiments 36 to 41, wherein the chamber is refrigerated.

Embodiment 43. An automated specimen processing system comprising: the receptacle storage module of any one of embodiments 36 to 42; an analyzer for analyzing a specimen contained within a receptacle; and a conveyor for transporting the receptacle between the analyzer and the receptacle storage module on a carrier for supporting the receptacle in an upright orientation.

Embodiment 44. The automated specimen processing system of embodiment 43 further comprising a capping module for closing a top end of the receptacle with a closure after a specimen contained in the receptacle has been processed in the analyzer, wherein the capping module is situated along the conveyor and between the analyzer and the receptacle storage module.

Embodiment 45. The automated specimen processing system of embodiment 44 further comprising a de-capping module for removing a closure from the receptacle prior to processing the specimen in the analyzer, the de-capping module being situated along the conveyor before the analyzer.

Embodiment 46. The automated specimen processing system of any one of embodiments 43 to 45 further comprising a stop feature configured to maintain the carrier in a stationary position on the conveyor at a location adjacent the receptacle storage module.

Embodiment 47. The automated specimen processing system of any one of embodiments 43 to 46, wherein a magnetic attraction between the carrier and the conveyor is used to propel the carrier.

Embodiment 48. A method of transferring a closed receptacle from a pickup location to a receptacle rack contained within a housing of a receptacle storage module using the robotic handler of embodiment 22, the method comprising the steps of: (a) at the pickup location, moving the jaw members of the gripper apparatus from the open position to the first closed position to grasp the closed receptacle, wherein the closed receptacle is supported by a receptacle holder at the pick-up location; (b) while the jaw members are in the first closed position: (i) removing the receptacle from the receptacle holder; (ii) positioning the receptacle in vertical alignment with a receptacle slot formed in a receptacle rack contained within the receptacle storage module, the receptacle slot being configured to receive and support the closed receptacle in an upright orientation; and (iii) partially inserting the closed receptacle into the receptacle slot; (c) after step (b)(iii), moving the jaw members from the first closed position to the open position; (d) raising the jaw members until the plurality of fingers are laterally aligned with a sidewall of a closure of the closed receptacle; (e) moving the jaw members from the open position to the second closed position until the plurality of fingers engage the sidewall of the closure; and (f) while the jaw members are in the second closed position, lowering the gripper apparatus until the closed receptacle is seated in the receptacle slot.

Embodiment 49. The method of embodiment 48, further comprising, after seating the closed receptacle in the receptacle slot of the receptacle rack: (g) moving the jaw members to the open position; (h) raising the jaw members until the plurality of fingers are situated above the closed receptacle; and (i) moving the gripper apparatus to the pick-up location.

Embodiment 50. The method of embodiment 48 or 49, wherein the receptacle rack includes multiple rows of receptacle slots for receiving receptacles, and wherein, during step (f), the fingers are configured such that each of the plurality of fingers is situated in an interstitial space between a pair of neighboring receptacles when the closed receptacle is seated in the receptacle slot.

Embodiment 51. The method of any one of embodiments 48 to 50, wherein the receptacle holder is a component of a receptacle transporter.

Embodiment 52. The method of embodiment 51 further comprising, prior to step (a), the step of transporting the closed receptacle from a receptacle carrier positioned on a conveyor situated outside of the receptacle storage module to the receptacle holder, wherein the receptacle holder is situated at a drop-off location situated outside of the housing of the receptacle storage module.

Embodiment 53. The method of embodiment 52, wherein the closed receptacle is transported from the receptacle carrier to the receptacle holder using a pick-and-place device.

Embodiment 54. The method of embodiment 52 or 53 further comprising, prior to step (a), the step of moving the receptacle transporter within the receptacle storage module, such that the closed receptacle is transported from the drop-off location to the pick-up location.

Embodiment 55. The method of any one of embodiments 48 to 54, wherein each of the plurality of fingers grasps the sidewall of the closure at a position beneath a rim of the closure, such that there is no contact between any of the plurality of the fingers and the top surface of the closure during the method.

Embodiment 56. The method of any one of embodiments 48 to 55 further comprising the step of conveying the closed receptacle from an analyzer to the receptacle storage module on a track connecting the analyzer and the receptacle storage module, the closed receptacle being supported in an upright orientation by a receptacle carrier during the conveying step.

Embodiment 57. The method of embodiment 56 further comprising, in the analyzer, the steps of piercing the closure with a pipettor and removing a specimen from the closed receptacle with the pipettor.

Embodiment 58. The method of any one of embodiments 48 to 56 further comprising the step of providing a depth insertion stop to the receptacle slot, such that the depth insertion stop supports the partially inserted receptacle within the receptacle slot during step (c).

Embodiment 59. The method of embodiment 58 further comprising the step of removing the insertion stop from the receptacle slot between steps (e) and (f).

Embodiment 60. A method for seating a closed receptacle in a receptacle slot with the gripper apparatus of any one of embodiments 1 to 21, the method comprising: grasping the closure of the closed receptacle between the jaw members, with the jaw members in the first closed: extending an insertion stop pin partially into the receptacle slot from a bottom end of the receptacle slot; lowering the jaw members and the closed receptacle grasped thereby relative to the receptacle slot until the closed receptacle is partially inserted into the receptacle slot with a bottom end of the closed receptacle situated within the receptacle slot above the bottom end of the receptacle slot; moving the jaw members from the first closed position to the open position to release the closed receptacle, with the closed receptacle being retained in a partially inserted position within the receptacle slot by the insertion stop pin; raising the jaw members with respect to the partially inserted closed receptacle until the plurality of fingers are laterally aligned with the sidewall of the closure of the closed receptacle; moving the jaw members from the open position to the second closed position to grasp the closure of the closed receptacle between the fingers; withdrawing the insertion stop pin from the receptacle slot; lowering the jaw members and the closed receptacle grasped by the plurality of fingers relative to the receptacle slot until the closed receptacle is fully inserted into the receptacle slot with the bottom end of the closed receptacle situated at the bottom end of the receptacle slot; moving the jaw members from the second closed position to the open position to release the closed receptacle; and raising the jaw members and the plurality of fingers relative to receptacle slot and the closed receptacle seated therein until the jaw members and the plurality of fingers are above the top surface of the closure.

Embodiment 61. A method for removing a closed receptacle from a receptacle slot with the gripper apparatus of any one of embodiments 1 to 21, the method comprising grasping the closure of the closed receptacle between the plurality of fingers, with the jaw members in the second closed position, wherein a bottom end of the closed receptacle is situated at a bottom end of the receptacle slot, and the closure of the closed receptacle is situated at least partially above the receptacle slot; raising the jaw members and the closed receptacle grasped by the plurality of fingers relative to the receptacle slot until the closed receptacle is partially removed from the receptacle slot with the bottom end of the closed receptacle situated within the receptacle slot above the bottom end of the receptacle slot; extending an insertion stop pin partially into the receptacle slot from the bottom end of the receptacle slot; moving the jaw members from the second closed position to the open position to release the closed receptacle, with the closed receptacle being retained in a partially removed position within the receptacle slot by the insertion stop pin; lowering the jaw members with respect to the partially removed closed receptacle until the jaw members are laterally aligned with the sidewall of the closure of the closed receptacle; moving the jaw members from the open position to the first closed position to grasp the closure of the closed receptacle between the jaw members; and raising the jaw members and the closed receptacle grasped thereby relative to the receptacle slot until the bottom end the closed receptacle is above the receptacle slot.

The present disclosure has been described and shown in considerable detail with reference to certain illustrative embodiments. Those skilled in the art will readily appreciate that other embodiments and variations and modifications of the disclosed embodiments are encompassed within the scope of the present disclosure. The description of the disclosed embodiments, combinations, and sub-combinations is not intended to convey that the disclosure requires features or combinations of features other than those expressly recited in the claims. Accordingly, the present disclosure is deemed to include all modifications and variations encompassed within the spirit and scope of the following appended claims.

What is claimed is:

1. A gripper apparatus configured to grasp a closed receptacle having a receptacle and a closure affixed to an open top end of the receptacle, the gripper apparatus comprising:

opposed jaw members configured for vertical movement between a first vertical position and a second vertical position above the first vertical position and for lateral movement between an open position and a first closed position when the jaw members are at the second vertical position, the jaw members being configured to grasp the closed receptacle when the jaw members are at the first vertical position and the closure of the closed receptacle is situated between the jaw members at the first closed position, and the jaw members being configured to release the closed receptacle at the open position; and a plurality of fingers, each of the jaw members having at least one of the plurality of fingers depending downwardly from a base thereof and movable with the associated jaw member, wherein the plurality of fingers are configured to grasp a sidewall of the closure beneath a top surface of the closure when the jaw members are at the second vertical position and the closure is situated (i) between the plurality of fingers and (ii) beneath the base of each of the jaw members as the jaw members move laterally toward each other from the open position, and wherein the plurality of fingers grasp the sidewall of the closure when the jaw members are at a second closed position.

2. The gripper apparatus of claim 1, wherein the plurality of fingers are configured to be in contact or near contact with the receptacle when the jaw members grasp the sidewall of the closure at the first closed position.

3. The gripper apparatus of claim 1, wherein each of the jaw members has a contoured engagement face for grasping the sidewall of the closure, and wherein the closure and the receptacle each have a cylindrical shape.

4. The gripper apparatus of claim 3, wherein the jaw members are capable of contacting each other in the absence of the closed receptacle being situated between the jaw members, and wherein the contoured engagement faces define an opening when the jaw members are in contact with each other.

5. The gripper apparatus of claim 4, wherein the jaw members do not contact each other when the closed receptacle is situated between the jaw members and the jaw members are at the first closed position.

6. The gripper apparatus of claim 1, wherein each of the jaw members has two or more of the plurality of fingers depending from the base thereof.

7. The gripper apparatus of claim 1, wherein each of the plurality of fingers comprises an inner surface having a contact face configured to engage the sidewall of the closure when the closure is situated (i) beneath the base of each of the jaw members and (ii) between the plurality of fingers at the second closed position.

8. The gripper apparatus of claim 7, wherein the inner surface of each of the plurality of fingers includes a recess situated adjacent to and above the contact face, the recess being configured so that there is no contact between the recess and the closure at the second closed position.

9. The gripper apparatus of claim 8, wherein an upper region of the inner surface of each of the plurality of fingers slopes inward from the recess toward the base of one of the jaw members, such that when the sidewall of the closure is grasped by the plurality of fingers at the second closed position, at least a portion of the upper region of the inner surface is situated directly above the top surface of the closure.

10. A robotic handler, comprising:

the gripper apparatus of claim 1; and a gantry operatively supporting the gripper apparatus and configured to provide the gripper apparatus with XYZ movement.

11. A method of transferring a closed receptacle from a pickup location to a receptacle rack contained within a housing of a receptacle storage module using a robotic handler comprising a gripper apparatus and a gantry operatively supporting the gripper apparatus and configured to provide the gripper apparatus with XYZ movement, wherein the gripper apparatus is configured to grasp a closed receptacle having a receptacle and a closure affixed to an open top end of the receptacle and comprises:

opposed jaw members capable of lateral movement between an open position and a first closed position, the jaw members being configured to grasp the closed receptacle when the closed receptacle is situated between the jaw members at the first closed position, and the jaw members being configured to release the closed receptacle at the open position; and a plurality of fingers, each of the jaw members having at least one of the plurality of fingers depending from a base thereof, wherein the plurality of fingers are configured to grasp a sidewall of the closure beneath a top surface of the closure when the closure is situated (i) between the plurality of fingers and (ii) beneath the base of each of the jaw members as the jaw members move laterally toward each other from the open position, and wherein the plurality of fingers grasp the sidewall of the closure at a second closed position, wherein the method comprises the steps of:

(a) at the pickup location, moving the jaw members of the gripper apparatus from the open position to the first closed position to grasp the closed receptacle, wherein the closed receptacle is supported by a receptacle holder at the pick-up location;

(b) while the jaw members are in the first closed position:

(i) removing the receptacle from the receptacle holder;

(ii) positioning the receptacle in vertical alignment with a receptacle slot formed in a receptacle rack contained within the receptacle storage module, the receptacle slot being configured to receive and support the closed receptacle in an upright orientation; and (iii) partially inserting the closed receptacle into the receptacle slot;

(c) after step (b)(iii), moving the jaw members from the first closed position to the open position;

(d) raising the jaw members until the plurality of fingers are laterally aligned with a sidewall of a closure of the closed receptacle;

(e) moving the jaw members from the open position to the second closed position until the plurality of fingers engage the sidewall of the closure; and (f) while the jaw members are in the second closed position, lowering the gripper apparatus until the closed receptacle is seated in the receptacle slot.

12. The method of claim 11, further comprising, after seating the closed receptacle in the receptacle slot of the receptacle rack:

(g) moving the jaw members to the open position;

(h) raising the jaw members until the plurality of fingers are situated above the closed receptacle; and (i) moving the gripper apparatus to the pick-up location.

13. The method of claim 11, wherein the receptacle rack includes multiple rows of receptacle slots for receiving receptacles, and wherein, during step (f), the fingers are configured such that each of the plurality of fingers is situated between a pair of neighboring receptacles when the closed receptacle is seated in the receptacle slot.

14. The method of claim 11, wherein the receptacle holder is a component of a receptacle transporter, and further comprising, prior to step (a), the step of transporting the closed receptacle from a receptacle carrier positioned on a conveyor situated outside of the receptacle storage module to the receptacle holder, wherein the receptacle holder is situated at a drop-off location situated outside of the housing of the receptacle storage module.

15. The method of claim 14 further comprising, prior to step (a), the step of moving the receptacle transporter within the receptacle storage module, such that the closed receptacle is transported from the drop-off location to the pick-up location.

16. The method of claim 11, wherein each of the plurality of fingers grasps the sidewall of the closure at a position beneath a rim of the closure, such that there is no contact between any of the plurality of the fingers and the top surface of the closure during the method.

17. The method of claim 11 further comprising the steps of:

(g) providing a depth insertion stop to the receptacle slot, such that the depth insertion stop supports the partially inserted receptacle within the receptacle slot when the jaw members are moved from the first closed position to the open position; and (h) removing the insertion stop from the receptacle slot between steps (e) and (f).

18. A method for seating a closed receptacle in a receptacle slot with a gripper apparatus configured to grasp a closed receptacle having a receptacle and a closure affixed to an open top end of the receptacle and comprising:

opposed jaw members capable of lateral movement between an open position and a first closed position, the jaw members being configured to grasp the closed receptacle when the closed receptacle is situated between the jaw members at the first closed position, and the jaw members being configured to release the closed receptacle at the open position; and a plurality of fingers, each of the jaw members having at least one of the plurality of fingers depending from a base thereof, wherein the plurality of fingers are configured to grasp a sidewall of the closure beneath a top surface of the closure when the closure is situated (i) between the plurality of fingers and (ii) beneath the base of each of the jaw members as the jaw members move laterally toward each other from the open position, and wherein the plurality of fingers grasp the sidewall of the closure at a second closed position, wherein the method comprises:

(a) grasping the closure of the closed receptacle between the jaw members, with the jaw members in the first closed;

(b) extending an insertion stop pin partially into the receptacle slot from a bottom end of the receptacle slot;

(c) lowering the jaw members and the closed receptacle grasped thereby relative to the receptacle slot until the closed receptacle is partially inserted into the receptacle slot with a bottom end of the closed receptacle situated within the receptacle slot above the bottom end of the receptacle slot;

(d) moving the jaw members from the first closed position to the open position to release the closed receptacle, with the closed receptacle being retained in a partially inserted position within the receptacle slot by the insertion stop pin;

(e) raising the jaw members with respect to the partially inserted closed receptacle until the plurality of fingers are laterally aligned with the sidewall of the closure of the closed receptacle;

(f) moving the jaw members from the open position to the second closed position to grasp the closure of the closed receptacle between the fingers;

(g) withdrawing the insertion stop pin from the receptacle slot;

(h) lowering the jaw members and the closed receptacle grasped by the plurality of fingers relative to the receptacle slot until the closed receptacle is fully inserted into the receptacle slot with the bottom end of the closed receptacle situated at the bottom end of the receptacle slot;

(i) moving the jaw members from the second closed position to the open position to release the closed receptacle; and (j) raising the jaw members and the plurality of fingers relative to receptacle slot and the closed receptacle seated therein until the jaw members and the plurality of fingers are above the top surface of the closure.

19. A method for removing a closed receptacle from a receptacle slot with a gripper apparatus configured to grasp a closed receptacle having a receptacle and a closure affixed to an open top end of the receptacle and comprising:

opposed jaw members capable of lateral movement between an open position and a first closed position, the jaw members being configured to grasp the closed receptacle when the closed receptacle is situated between the jaw members at the first closed position, and the jaw members being configured to release the closed receptacle at the open position; and a plurality of fingers, each of the jaw members having at least one of the plurality of fingers depending from a base thereof, wherein the plurality of fingers are configured to grasp a sidewall of the closure beneath a top surface of the closure when the closure is situated (i) between the plurality of fingers and (ii) beneath the base of each of the jaw members as the jaw members move laterally toward each other from the open position, and wherein the plurality of fingers grasp the sidewall of the closure at a second closed position, wherein the method comprises the steps of:

(a) grasping the closure of the closed receptacle between the plurality of fingers, with the jaw members in the second closed position, wherein a bottom end of the closed receptacle is situated at a bottom end of the receptacle slot, and the closure of the closed receptacle is situated at least partially above the receptacle slot;

(b) raising the jaw members and the closed receptacle grasped by the plurality of fingers relative to the receptacle slot until the closed receptacle is partially removed from the receptacle slot with the bottom end of the closed receptacle situated within the receptacle slot above the bottom end of the receptacle slot;

(c) extending an insertion stop pin partially into the receptacle slot from the bottom end of the receptacle slot;

(d) moving the jaw members from the second closed position to the open position to release the closed receptacle, with the closed receptacle being retained in a partially removed position within the receptacle slot by the insertion stop pin;

(e) lowering the jaw members with respect to the partially removed closed receptacle until the jaw members are laterally aligned with the sidewall of the closure of the closed receptacle;

moving the jaw members from the open position to the first closed position to grasp the closure of the closed receptacle between the jaw members; and (f) raising the jaw members and the closed receptacle grasped thereby relative to the receptacle slot until the bottom end of the closed receptacle is above the receptacle slot.

* * * * *